(12) United States Patent
Carnahan et al.

(10) Patent No.: US 8,053,529 B2
(45) Date of Patent: Nov. 8, 2011

(54) CATALYTIC OLEFIN BLOCK COPOLYMERS WITH CONTROLLED BLOCK SEQUENCE DISTRIBUTION

(75) Inventors: Edmund M. Carnahan, Fresno, TX (US); Phillip D. Hustad, Manvel, TX (US); Roger L. Kuhlman, Lake Jackson, TX (US); Timothy T. Wenzel, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 571 days.

(21) Appl. No.: 12/066,879

(22) PCT Filed: Sep. 14, 2006

(86) PCT No.: PCT/US2006/036038
§ 371 (c)(1), (2), (4) Date: Jul. 7, 2008

(87) PCT Pub. No.: WO2007/035485
PCT Pub. Date: Mar. 29, 2007

(65) Prior Publication Data
US 2008/0269412 A1 Oct. 30, 2008

Related U.S. Application Data

(60) Provisional application No. 60/717,545, filed on Sep. 15, 2005.

(51) Int. Cl.
C08F 297/00 (2006.01)
C08F 2/00 (2006.01)
C08L 23/00 (2006.01)
C08F 4/643 (2006.01)

(52) U.S. Cl. .......... 525/269; 525/53; 525/268; 525/321; 526/65; 526/88; 526/348; 526/348.2

(58) Field of Classification Search ................ 525/53, 525/268, 269, 321; 526/65, 88, 348, 2, 348.4
See application file for complete search history.

(56) References Cited

U.S. PATENT DOCUMENTS

| | | | | |
|---|---|---|---|---|
| 4,297,445 A | * | 10/1981 | Short et al. | 525/52 |
| 6,177,377 B1 | * | 1/2001 | Chien | 502/113 |
| 2001/0039314 A1 | * | 11/2001 | Mehta et al. | 525/240 |
| 2003/0114623 A1 | * | 6/2003 | Mitani et al. | 526/352 |
| 2004/0220050 A1 | * | 11/2004 | Frazier et al. | 502/150 |

FOREIGN PATENT DOCUMENTS

| | | |
|---|---|---|
| EP | 1197500 A1 | 4/2002 |
| WO | WO-2005090425 A1 | 9/2005 |
| WO | WO-2005090426 A1 | 9/2005 |
| WO | WO-2005090427 A2 | 9/2005 |

OTHER PUBLICATIONS

64308A EP Prosecution as of Sep. 2010.
64010A US Prosecution as of Sep. 23, 2010.

* cited by examiner

Primary Examiner — Fred M Teskin

(57) ABSTRACT

A process for the polymerization of one or more addition polymerizable monomers and the resulting polymer products, said process comprising: 1) contacting an addition polymerizable monomer or mixture of monomers under addition polymerization conditions in a reactor or reactor zone with a composition comprising at least one olefin polymerization catalyst and a cocatalyst and characterized by the formation of polymer chains from said monomer or monomers; 2) transferring the reaction mixture to a second reactor or reactor zone and optionally adding one or more additional reactants, catalysts, monomers or other compounds prior to, commensurate with, or after said transfer; and 3) causing polymerization to occur in said second reactor or reactor zone to form polymer chains that are differentiated from the polymer chains formed in step 1); said process being characterized by addition of a chain shuttling agent to the reaction mixture prior to, during, or subsequent to step 1) such that at least some of the resulting polymer molecules from step 3) comprise two or more chemically or physically distinguishable blocks or segments.

11 Claims, 9 Drawing Sheets

DSC Example 2, Run A

CRYSTAF Example 2, Run A

ANALYSIS DATA

|  | Peak1 | Peak2 | Peak3 | Peak4 | Soluble Fraction |
|---|---|---|---|---|---|
| T°C | 75.3 | 80.5 | 0.0 | 0.0 | 30.0 |
| Area | 0.9 | 35.0 | 0.0 | 0.0 | 59.9 |

ATREF Example 2, Run A

| PEAK AREAS | | | | | SF (%) |
|---|---|---|---|---|---|
| Peak °C | 43.9 | 64.8 | 96.4 | 0.0 | |
| Area % | 2.3 | 3.2 | 38.7 | 0.0 | 55.9 |

GPC Example 2, Run A

CRYSTAF Example 2, Run 1

ANALYSIS DATA

|  | Peak1 | Peak2 | Peak3 | Peak4 | Soluble Fraction |
|---|---|---|---|---|---|
| T°C | 30.0 | 42.9 | 54.3 | 75.6 | 30.0 |
| Area | 8.0 | 7.1 | 2.1 | 36.5 | 46.3 |

GPC Example 2, Run 1

CATALYTIC OLEFIN BLOCK COPOLYMERS WITH CONTROLLED BLOCK SEQUENCE DISTRIBUTION

CROSS REFERENCE STATEMENT

This application claims the benefit of U.S. Provisional Application No. 60/717,545, filed Sep. 15, 2005. For purposes of United States patent practice, the contents of this provisional application are herein incorporated by reference.

BACKGROUND OF THE INVENTION

The present invention relates to a process for polymerizing a monomer or mixtures of two or more monomers such as mixtures of ethylene and one or more comonomers, to form an interpolymer product having unique physical properties, to a process for preparing such interpolymers, and to the resulting polymer products. In another aspect, the invention relates to the articles prepared from these polymers. The inventive polymers comprise two or more differing regions or segments (blocks), each block being characterized by a generally uniform chemical composition, causing the polymer to possess unique physical properties. These pseudo-block copolymers and polymeric blends comprising the same are usefully employed in the preparation of solid articles such as moldings, films, sheets, and foamed objects by molding, extruding, or other processes, and are useful as components or ingredients in adhesives, laminates, polymeric blends, and other end uses. The resulting products are used in the manufacture of components for automobiles, such as profiles, bumpers and trim parts; packaging materials; electric cable insulation, and other applications.

It has long been known that polymers containing a block-type structure often have superior properties compared to random copolymers and blends. For example, triblock copolymers of styrene and butadiene (SBS) and hydrogenated versions of the same (SEBS) have an excellent combination of heat resistance and elasticity. Other block copolymers are also known in the art. Generally, block copolymers known as thermoplastic elastomers (TPE) have desirable properties due to the presence of "soft" or elastomeric block segments connecting "hard" either crystallizable or glassy blocks in the same polymer. At temperatures up to the melt temperature or glass transition temperature of the hard segments, the polymers demonstrate elastomeric character. At higher temperatures, the polymers become flowable, exhibiting thermoplastic behavior. Known methods of preparing block copolymers include anionic polymerization and controlled free radical polymerization. Unfortunately, these methods of preparing block copolymers require sequential monomer addition with polymerization to relative completeness and the types of monomers that can styrene and butadiene to form a SBS type block copolymer, each polymer chain requires a stoichiometric amount of initiator and the resulting polymers have extremely narrow molecular weight distribution, Mw/Mn, preferably from 1.0 to 1.3. That is, the polymer block lengths are substantially identical. Additionally, anionic and free-radical processes are relatively slow, resulting in poor process economics, and not readily adapted to polymerization of $\alpha$-olefins.

It would be desirable to produce block copolymers catalytically, that is, in a process wherein more than one polymer molecule is produced for each catalyst or initiator molecule. In addition, it would be highly desirable to produce copolymers having properties resembling block copolymers from olefin monomers such as ethylene, propylene, and higher alpha-olefins that are generally unsuited for use in anionic or free-radical polymerizations. In certain of these polymers, it is highly desirable that some or all of the polymer blocks comprise amorphous polymers such as a copolymer of ethylene and a comonomer, especially amorphous random copolymers comprising ethylene and an $\alpha$-olefin having 3 or more carbon atoms. Finally, it would be desirable to prepare pseudo-block copolymers wherein a substantial fraction of the polymer molecules are of a controlled block number, especially diblocks or triblocks, but wherein the block lengths are a most probable distribution, rather than identical or nearly identical block lengths.

Previous researchers have stated that certain homogeneous coordination polymerization catalysts can be used to prepare polymers having a substantially "block-like" structure by suppressing chain-transfer during the polymerization, for example, by conducting the polymerization process in the absence of a chain transfer agent and at a sufficiently low temperature such that chain transfer by $\beta$-hydride elimination or other chain transfer processes is essentially eliminated. Under such conditions, the sequential addition of different monomers coupled with high conversion was said to result in formation of polymers having sequences or segments of different monomer content. Several examples of such catalyst compositions and processes are reviewed by Coates, Hustad, and Reinartz in *Angew. Chem., Int. Ed.*, 41, 2236-2257 (2002) as well as US-A-2003/0114623.

Disadvantageously, such processes require sequential monomer addition and result in the production of only one polymer chain per active catalyst center, which limits catalyst productivity. In addition, the requirement of relatively low process temperatures but high conversion increases the process operating costs, making such processes unsuited for commercial implementation. Moreover, the catalyst cannot be optimized for formation of each respective polymer type, and therefore the entire process results in production of polymer blocks or segments of less than maximal efficiency and/or quality. For example, formation of a certain quantity of prematurely terminated polymer is generally unavoidable, resulting in the forming of blends having inferior block copolymers having Mw/Mn of 1.5 or greater, the resulting distribution of block lengths is relatively inhomogeneous, not a most probable distribution.

For these reasons, it would be highly desirable to provide a process for producing olefin copolymers comprising at least some quantity of blocks or segments having differing physical properties in a process using coordination polymerization catalysts capable of operation at high catalytic efficiencies and high reactor temperatures. In addition, it would be desirable to provide a process and resulting copolymers wherein insertion of terminal blocks or sequencing of blocks within the polymer can be influenced by appropriate selection of process conditions. Finally, if would be highly desirable to be able to use a continuous process for production of pseudo-block copolymers.

The use of certain metal alkyl compounds and other compounds, such as hydrogen, as chain transfer agents to interrupt chain growth in olefin polymerizations is well known in the art. In addition, it is known to employ such compounds, especially aluminum alkyl compounds, as scavengers or as cocatalysts in olefin polymerizations. In Macromolecules, 33, 9192-9199 (2000) the use of certain aluminum trialkyl compounds as chain transfer agents in combination with certain paired zirconocene catalyst compositions resulted in polypropylene mixtures containing small quantities of polymer fractions containing both isotactic and atactic chain segments. In Liu and Rytter, *Macromolecular Rapid Comm.*, 22, 952-956 (2001) and Bruaseth and Rytter, Macromolecules, 36, 3026-3034 (2003) mixtures of ethylene and 1-hexene were polymerized by a similar catalyst composition containing trimethylaluminum chain transfer agent. In the latter reference, the authors summarized the prior art studies in the following manner (some citations omitted):

"Mixing of two metallocenes with known polymerization behavior can be used to control polymer microstructure. Several studies have been performed of ethene polymerization by mixing two metallocenes. Common observations were that, by combining catalysts which separately give polyethene with different Mw, polyethene with broader and in some cases bimodal MWD can be obtained. [S]oares and Kim (*J. Polym. Sci., Part A: Polym. Chem.*, 38, 1408-1432 (2000)) developed a criterion in order to test the MWD bimodality of polymers made by dual single-site catalysts, as exemplified by ethene/1-hexene copolymerization of the mixtures $Et(Ind)_2ZrCl_2/Cp_2HfCl_2$ and $Et(Ind)_2ZrCl_2/CGC$ (constrained geometry catalyst) supported on silica. Heiland and Kaminsky (*Makromol. Chem.*, 193, 601-610 (1992)) studied a mixture of $Et-(Ind)_2ZrCl_2$ and the hafnium analogue in copolymerization of ethene and 1-butene.

These studies do not contain any indication of interaction between the two different sites, for example, by readsorption of a terminated chain at the alternative site. Such reports have been issued, however, for polymerization of propene. Chien et al. (*J. Polym. Sci., Part A: Polym. Chem.*, 37, 2439-2445 (1999), *Makromol.*, 30, 3447-3458 (1997)) studied propene polymerization by homogeneous binary zirconocene catalysts. A blend of isotactic polypropylene (i-PP), atactic polypropylene (a-PP), and a stereoblock fraction (i-PP-b-a-PP) was obtained with a binary system comprising an isospecific and an aspecific precursor with a borate and TIBA as cocatalyst. By using a binary mixture of isospecific and syndiospecific zirconocenes, a blend of isotactic polypropylene (i-PP), syndiotactic polypropylene (s-PP), and a stereoblock fraction (i-PP-b-s-PP) was obtained. The mechanism for formation of the stereoblock fraction was proposed to involve the exchange of propagating chains between the two different catalytic sites. Przybyla and Fink (*Acta Polym.*, 50, 77-83 (1999)) used two different types of metallocenes (isospecific and syndiospecific) supported on the same silica for propene polymerization. They reported that, with a certain type of silica support, chain transfer between the active species in the catalyst system occurred, and stereoblock PP was obtained. Lieber and Brintzinger (*Macromol.* 3, 9192-9199 (2000)) have proposed a more detailed explanation of how the transfer of a growing polymer chain from one type of metallocene to another occurs. They studied propene polymerization by catalyst mixtures of two different ansa-zirconocenes. The different catalysts were first studied individually with regard to their tendency toward alkyl-polymeryl exchange with the alkylaluminum activator and then pairwise with respect to their capability to produce polymers with a stereoblock structure. They reported that formation of stereoblock polymers by a mixture of zirconocene catalysts with different stereoselectivities is contingent upon an efficient polymeryl exchange between the Zr catalyst centers and the Al centers of the cocatalyst."

Brusath and Rytter then disclosed their own observations using paired zirconocene catalysts to polymerize mixtures of ethylene/1-hexene and reported the effects of the influence of the dual site catalyst on polymerization activity, incorporation of comonomer, and polymer microstructure using methylalumoxane cocatalyst.

Analysis of the foregoing results indicate that Rytter and coworkers likely failed to utilize combinations of catalyst, cocatalyst, and third components that were capable of readsorption of the polymer chain from the chain transfer agent onto both of the active catalytic sites, i.e., two-way readsorption. While indicating that chain termination due to the presence of trimethylaluminum comonomer, and thereafter that polymeryl exchange with the more open catalytic site followed by continued polymerization likely occurred, evidence of the reverse flow of polymer ligands appeared to be lacking in the reference. In fact, in a later communication, Rytter, et. al., *Polymer,* 45, 7853-7861 (2004), it was reported that no chain transfer between the catalyst sites actually took place in the earlier experiments. Similar polymerizations were reported in WO98/34970.

In U.S. Pat. Nos. 6,380,341 and 6,169,151, use of a "fluxional" metallocene catalyst, that is a metallocene capable of relatively facile conversion between two stereoisomeric forms having differing polymerization characteristics such as differing reactivity ratios was said to result in production of olefin copolymers having a "blocky" structure. Disadvantageously, the respective stereoisomers of such metallocenes generally fail to possess significant difference in polymer formation properties and are incapable of forming both highly crystalline and amorphous block copolymer segments, for example, from a given monomer mixture under fixed reaction conditions. Moreover, because the relative ratio of the two "fluxional" forms of the catalyst cannot be varied, there is no ability, using "fluxional" catalysts, to vary polymer block composition or to vary the ratio of the respective blocks. For certain applications, it is desirable to produce polymers having terminal blocks that are highly crystalline, functionalized or more readily functionalized, or that possess other distinguishing properties. For example, it is believed that polymers wherein the terminal segments or blocks are crystalline or glassy, rather than amorphous, possess improved abrasion resistance. In addition, polymers wherein the blocks having amorphous properties are internal or primarily connected between crystalline or glassy blocks, have improved elastomeric properties, such as improved retractive force and recovery, particularly at elevated temperatures.

In *JACS*, 2004, 126, 10701-10712, Gibson, et al discuss the effects of "catalyzed living polymerization" on molecular weight distribution. The authors define catalyzed living polymerization in this manner:

" . . . if chain transfer to aluminum constitutes the sole transfer mechanism and the exchange of the growing polymer chain between the transition metal and the aluminum centers is very fast and reversible, the polymer chains will appear to be growing on the aluminum centers. This can then reasonably be described as a catalyzed chain growth reaction on aluminum . . . . An attractive manifestation of this type of chain growth reaction is a Poisson distribution of product molecular weights, as opposed to the Schulz-Flory distribution that arises when β-H transfer accompanies propagation."

The authors reported the results for the catalyzed living homopolymerization of ethylene using an iron containing catalyst in combination with $ZnEt_2$, $ZnMe_2$, or $Zn(i-Pr)_2$. Homoleptic alkyls of aluminum, boron, tin, lithium, magnesium and lead did not induce catalyzed chain growth. distribution. However, after analysis of time-dependent product distribution, the authors concluded this reaction was, "not a simple catalyzed chain growth reaction." Accordingly, the product would not have constituted a pseudo-block copolymer. Similar processes employing single catalysts have been described in U.S. Pat. Nos. 5,210,338, 5,276,220, and 6,444,867.

Earlier workers had made similar claims to forming block copolymers using a single Ziegler-Natta type catalyst in multiple reactors arranged in series. Examples of such teachings include U.S. Pat. Nos. 3,970,719 and 4,039,632. It is now known that no substantial block copolymer formation takes place under these reaction conditions.

In U.S. Pat. Nos. 6,319,989 and 6,683,149, the use of two loop reactors connected in series and operating under differing polymerization conditions to prepare either broad or narrow molecular weight polymer products was disclosed. The references fail to disclose the use of chain shuttling agents and the formation of pseudo-block copolymer products.

Accordingly, there remains a need in the art for a polymerization process that is capable of preparing copolymers having properties approximating those of linear multi-block copolymers, in a high yield process adapted for commercial utilization. Moreover, it would be desirable if there were provided an improved process for preparing polymers, especially copolymers of two or more comonomers such as ethylene and one or more comonomers, by the use of a chain shuttling agent (CSA) to introduce block-like properties in the resulting polymer (pseudo-block copolymers). In addition it would be desirable to provide such an improved process operating at elevated temperatures that is capable of economically preparing diblock, triblock or higher multiblock copolymers having a most probable distribution of chain lengths. Finally, it would be desirable to provide an improved process for preparing the foregoing pseudo-block copolymer products in a continuous process.

SUMMARY OF THE INVENTION

According to the present invention there are now provided a process for the polymerization of one or more addition polymerizable monomers, preferably of two or more addition polymerizable monomers, especially ethylene and at least one copolymerizable comonomer, propylene and at least one copolymerizable comonomer, or 4-methyl-1-pentene and at least one copolymerizable comonomer, to form a copolymer comprising multiple blocks or segments of differentiated polymer composition or properties, especially blocks or segments comprising differing comonomer incorporation levels, said process comprising contacting an addition polymerizable monomer or mixture of monomers under addition polymerization conditions with a composition comprising at least one addition polymerization catalyst, a cocatalyst and a chain shuttling agent, said process differentiated process conditions in two or more reactors operating under steady state polymerization conditions or in two or more zones of a reactor operating under plug flow polymerization conditions.

Because the polymer is comprised of two or more blocks or segments, preferably two or three block or segments, which are joined to form a single polymer, and each block or segment is chemically or physically distinguishable (other than by molecular weight or molecular weight distribution) from adjoining blocks or segments, the resulting pseudo-block copolymer possesses unique physical and chemical properties compared to random copolymers of the same gross chemical composition.

In another embodiment of the invention there is provided a copolymer, especially such a copolymer comprising in polymerized form ethylene and a copolymerizable comonomer, propylene and at least one copolymerizable comonomer, or 4-methyl-1-pentene and at least one copolymerizable comonomer, said copolymer comprising two or more, preferably two or three intramolecular regions comprising differing chemical or physical properties, especially regions of differentiated comonomer incorporation. Highly preferably the copolymer possesses a molecular weight distribution, Mw/Mn, of less than 3.0, preferably less than 2.8.

In yet another embodiment of the invention there is provided a process and the resulting pseudo-block copolymer, said process comprising:

polymerizing one or more olefin monomers in the presence of an olefin polymerization catalyst and a chain shuttling agent (CSA) in a polymerization reactor or zone operating under substantially steady state polymerization conditions resulting in the formation of at least some quantity of an initial polymer segment terminated with chain shuttling agent within the reactor or zone;

discharging the reaction product from the first reactor or zone to a second polymerization reactor or zone operating under polymerization conditions that are distinguishable from those of the first polymerization reactor or zone;

transferring at least some of the initial polymer segment terminated with chain shuttling agent to an active catalyst site in the second polymerization reactor or zone; and conducting polymerization in the second polymerization reactor or zone so as to form a second polymer segment bonded to said initial polymer segment and having distinguishable polymer properties from the initial polymer segment.

Highly desirably, the polymer products herein comprise at least some quantity of a polymer containing two distinguishable blocks or segments characterized by a most probable distribution of block sizes. The polymer recovered from the second reactor or zone of a two reactor or two zone coupling agent to form a triblock- or a multiblock copolymer, including dendrimers, or functionalized by conversion of terminal chain shuttling agent into vinyl-, hydroxyl-, amine-, silane, carboxylic acid-, carboxylic acid ester, ionomeric, or other functional group, according to known techniques.

In yet another embodiment of the invention, the shuttling agent employed in the foregoing processes possesses multiple sites for undergoing polymer exchange, that is, it is multi-centered, especially two centered, which uniquely causes the formation of a polymer product comprising copolymers according to the invention containing three or more distinct polymer segments after undergoing sequential polymerization in two reactors or zones connected in series.

Highly desirably, the pseudoblock copolymers formed according to the present invention are characterized by terminal blocks or segments of polymer having higher tacticity or crystallinity from the central block or segment. Even more preferably, the central polymer block or segment is relatively amorphous or even elastomeric.

In a still further embodiment of the present invention, there is provided a polymer mixture comprising: (1) an organic or inorganic polymer, preferably a homopolymer of ethylene or of propylene and/or a copolymer of ethylene or propylene with one or more copolymerizable comonomers, and (2) a pseudo-block copolymer according to the present invention or prepared according to the process of the present invention. In a desirable embodiment component (1) is a matrix polymer comprising high density polyethylene or isotactic polypropylene and component (2) is an elastomeric pseudo-block copolymer containing two or three distinct regions of differentiated comonomer incorporation. In a preferred embodiment, component (2) comprises occlusions of the matrix polymer formed during compounding of components (1) and (2).

While the foregoing process has been described as preferably forming a diblock product, it is an additional object of the invention to prepare multi-block copolymers, including hyper-branched or dendrimeric copolymers, through coupling of polymer terminated with a chain shuttling agent exiting the second reactor or zone (or any subsequent reactor or zone) using a difunctional or polyfunctional coupling agent. In addition, if more than two reactors are employed, the product resembles that made by living polymerization in more than one reactor, with the difference that each block of the present polymers possesses a most probable distribution of molecular weights and composition. In particular, the polydispersity of the present polymers is generally less than 2.0 and approaches 1.5 for product made in two reactors. The theoretical limit of Mw/Mn generally equals the value of (1+1/n), where n is the number of reactors employed in the polymer's production, in accordance with the calculations of *J. Appl. Poly. Sci.*, 92, 539-542 (2004). In general, the average number of blocks in the absence of coupling of the present polymers will be equal to the number of polymerization will normally include quantities of conventional polymer depending on the efficiency of the particular shuttling agent employed under the conditions of the polymerization.

DETAILED DESCRIPTION OF THE INVENTION

Figure 1:
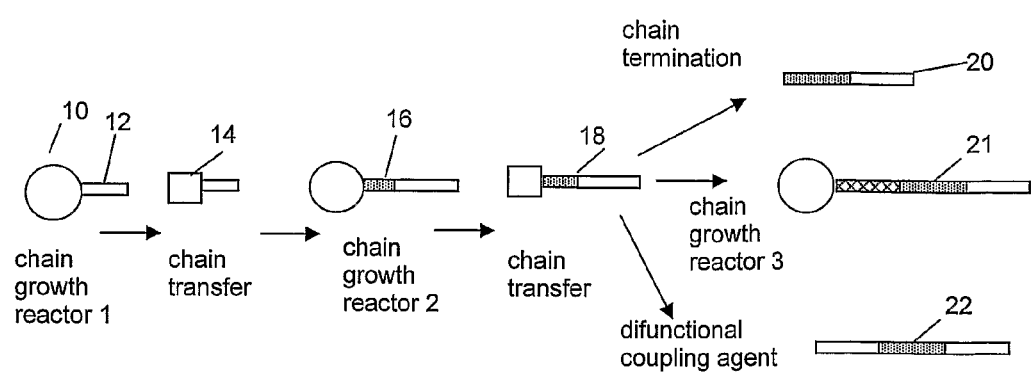
FIG. 1 is a schematic representation of the process of copolymer formation according to the present invention in two or more different reactors.
Figure 2:
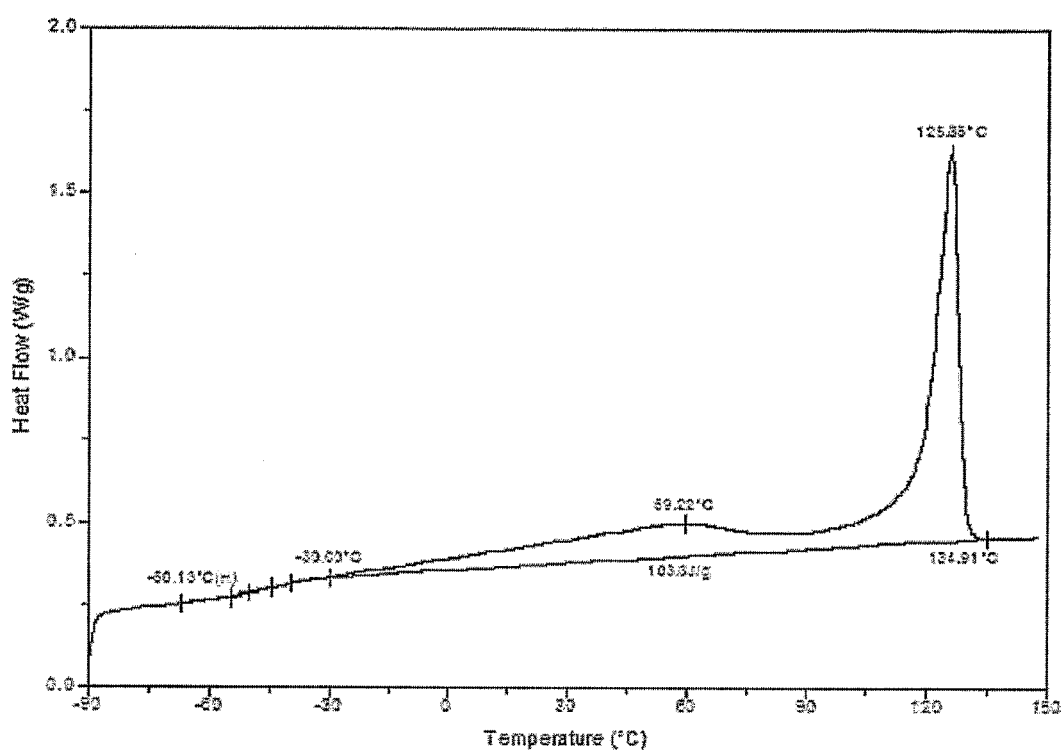
Figure 3:
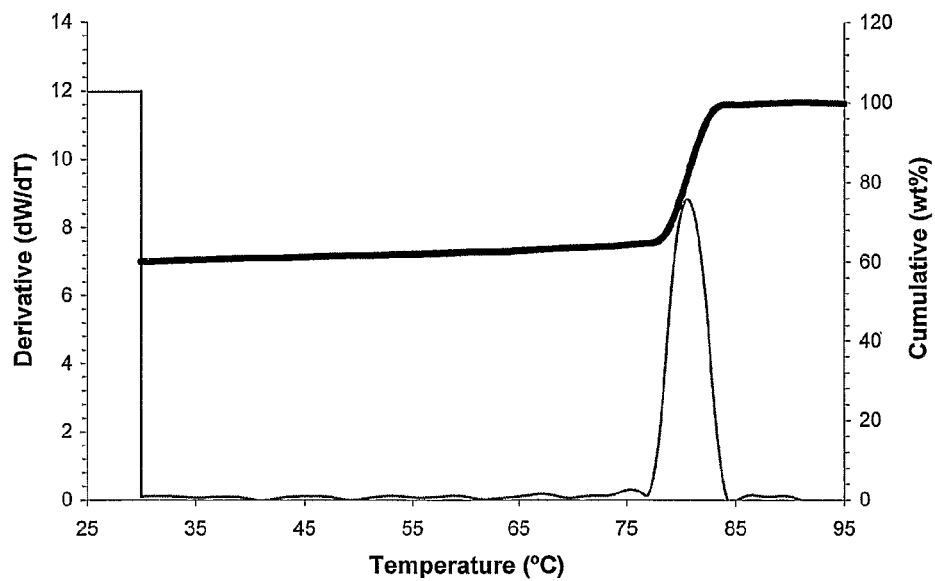
FIGS. 3-5 are test results for the polymer of Example 1, run A.
Figure 4:
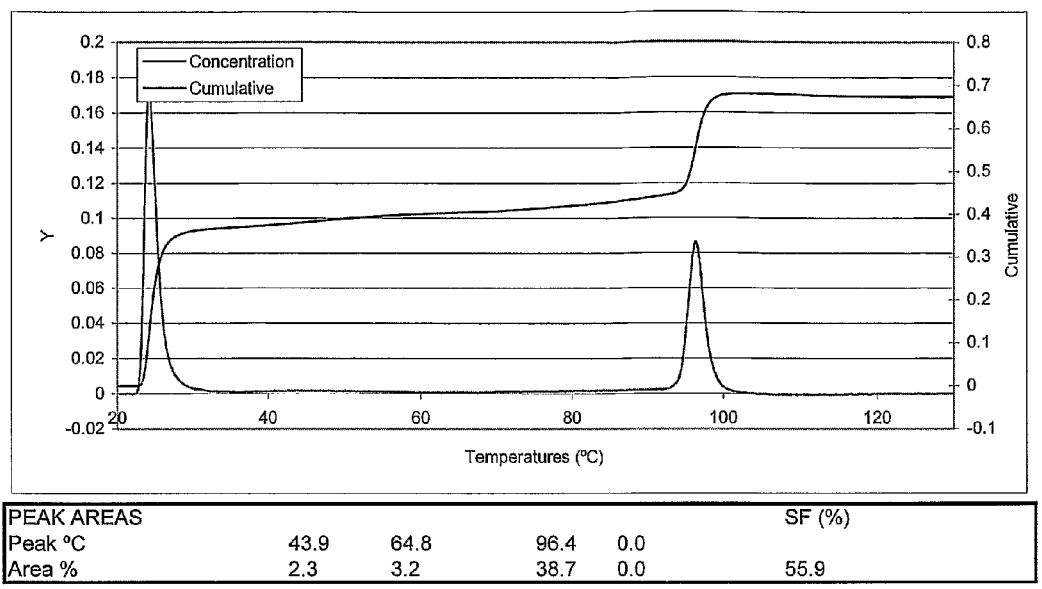
Figure 5:
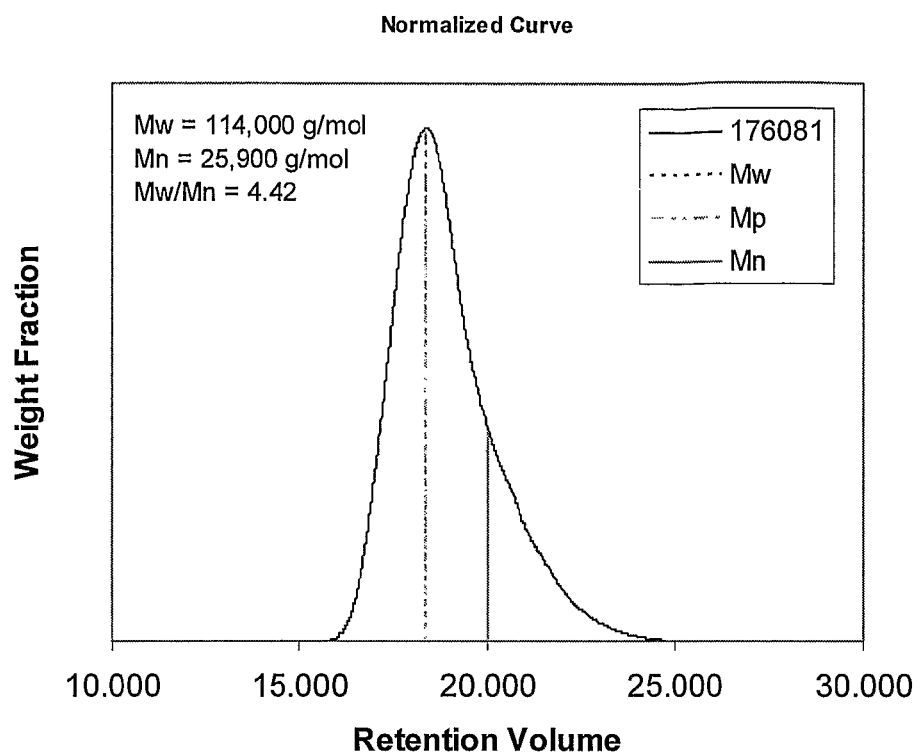
Figure 6:
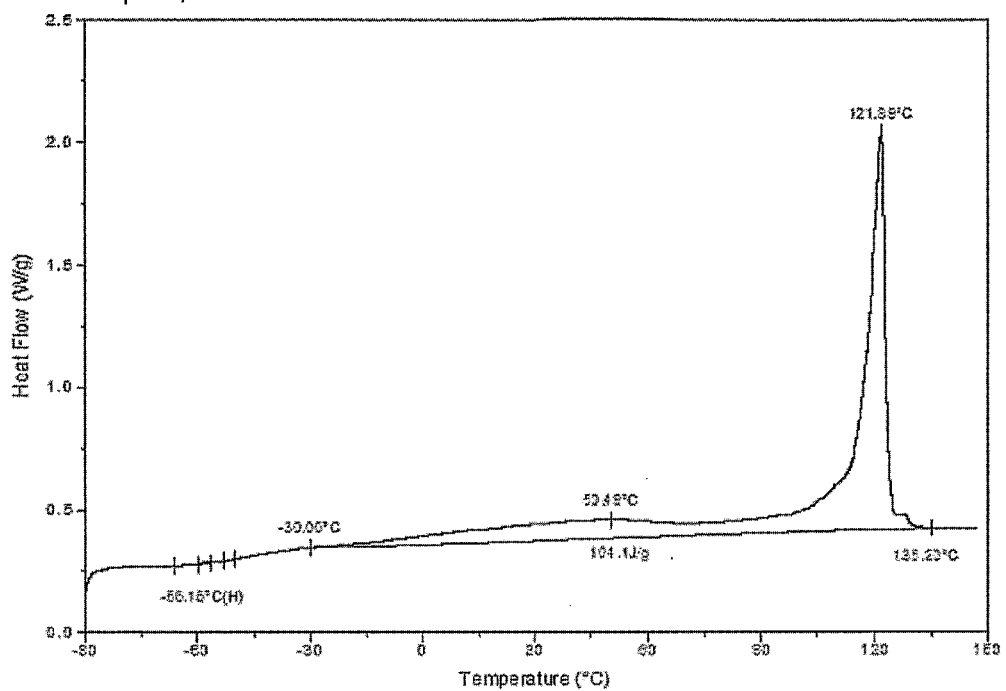
FIGS. 6-9 are test results for the polymer of Example 1, run 1.
Figure 7:
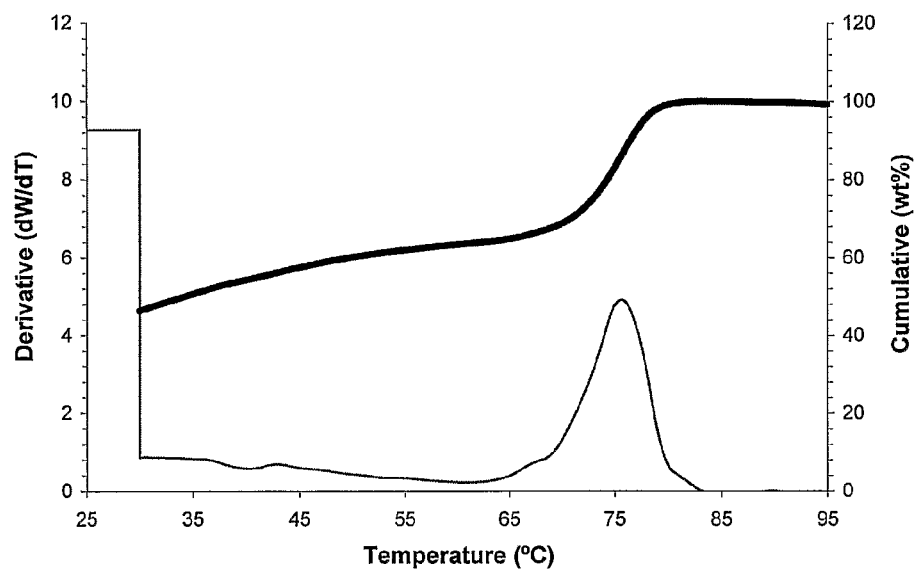
Figure 8:
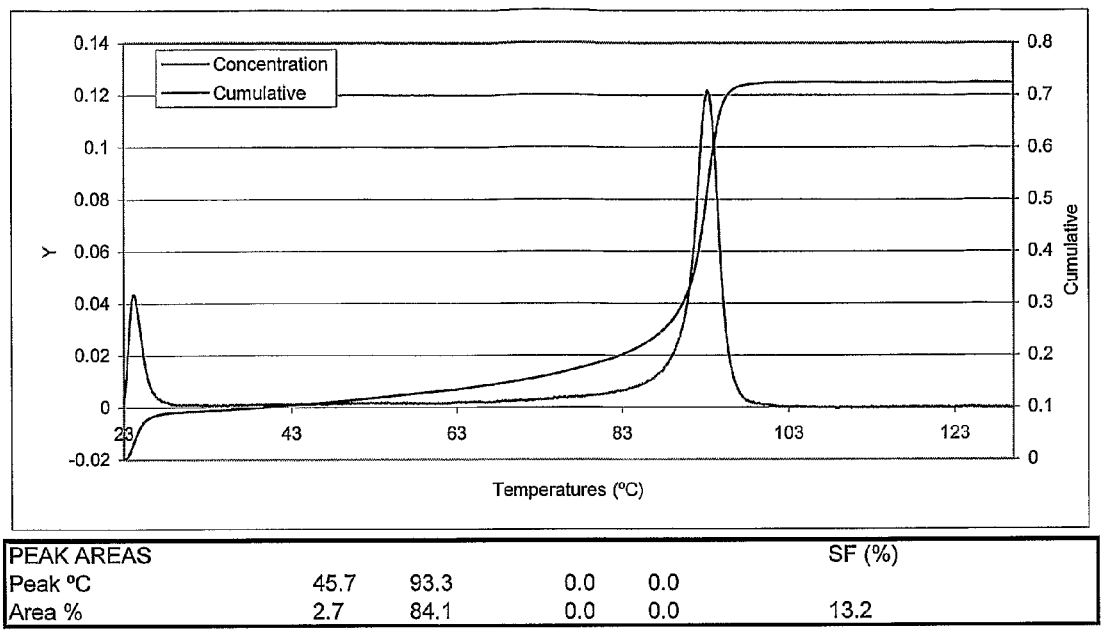
Figure 9:
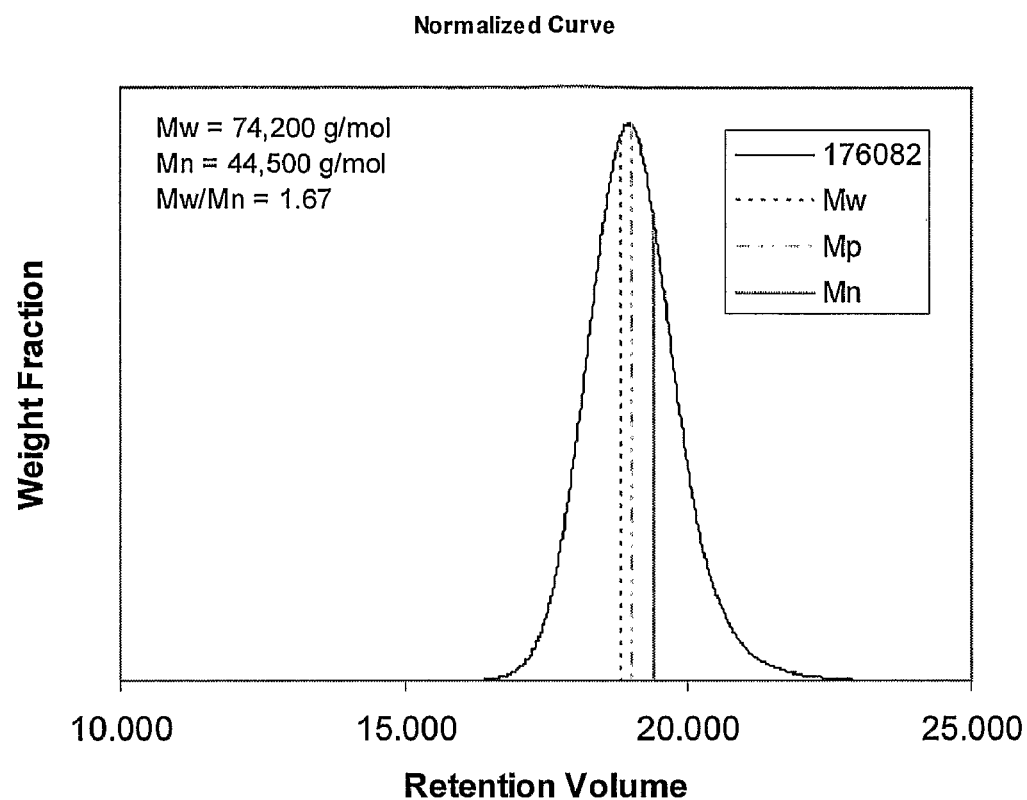

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

The term "comprising" and derivatives thereof is not intended to exclude the presence of any additional portion, component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other portion, component, step or procedure, excepting those that are not essential to operability. The term "consisting of" excludes any portion, component, step or procedure not specifically delineated or listed. The term "or", unless stated otherwise, refers to the listed members individually as well as in any combination.

The term "polymer", includes both homopolymers, that is, homogeneous polymers prepared from a single monomer, and copolymers (interchangeably referred to herein as interpolymers), meaning polymers prepared by reaction of at least two monomers or otherwise containing chemically differentiated segments or blocks therein even if formed from a single monomer. More specifically, the term "polyethylene" includes homopolymers of ethylene and copolymers of that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point. The term "elastomer" refers to a polymer or polymer segment having Tg less than 0° C., more preferably less than −15° C., most preferably less than −25° C.

The term "pseudo-block copolymer" refers to a copolymer comprising two or more blocks or segments of differing chemical or physical property, such as variable comonomer content, crystallinity, density, tacticity, regio-error, or other property. Non-adjacent blocks are not necessarily of identical chemical composition, but may vary in one or more of the foregoing respects, from the composition of all other blocks or regions. Compared to random copolymers, pseudo-block copolymers possess sufficient differences in chemical properties, especially crystallinity, between blocks or segments, and sufficient block length to the respective blocks to achieve one or more of the desired properties of true block copolymers, such as thermoplastic/elastomeric properties, while at the same time being amenable to preparation in conventional olefin polymerization processes, especially continuous solution polymerization processes employing catalytic quantities of polymerization catalysts.

Compared to block copolymers of the prior art, including copolymers produced by sequential monomer addition, fluxional catalysts, or anionic polymerization techniques, the copolymers of the invention are characterized by unique distributions of polymer polydispersity (PDI or Mw/Mn) and block length distribution, with two or three, preferably two different block compositions. This is due, in a preferred embodiment, to the effect of the use of one or more shuttling agents in combination with a high activity metal complex based polymerization catalyst in two or more polymerization reactors or zones operating under differing polymerization conditions. More specifically, the copolymers of the invention desirably possess PDI from 1.5 to 20, preferably from 1.7 to 15, and most preferably 1.8 to 10.

The respective blocks of a pseudo-block copolymer desirably possess a PDI fitting a Schulz-Flory distribution rather than a Poisson distribution. The use of the present polymerization process results in a product having a number of distinguishable blocks per polymer equal to the number of reactors or distinct reaction zones employed in the process, with a polydisperse distribution of block sizes. This ultimates in the formation of polymer products having improved and distinguishable physical properties. Moreover, the foregoing novel products may be formed in the presence of random copolymer or homopolymer formed in one or more of the associated polymerization processes due to early or intentional chain termination without chain transfer to the CSA. In this manner, a polymer blend containing in situ prepared rubbery impact modifier or It may be readily appreciated by the skilled artisan that in one embodiment of the present invented process the CSA may be added once, more than once (intermittently) or added continuously to each polymerization reactor or zone, preferably the initial one. Although the CSA may be added at a point immediately prior to discharge from the first reactor or zone, or even in an intervening conduit or conductor connecting the respective reactors or zones, it is preferably that the CSA be added to the reaction mixture prior to initiation of polymerization, at the same time as polymerization is initiated, or at least during a significant portion of the time in which polymerization is conducted in the first reactor. Thorough mixing of CSA and reaction mixture may be occasioned by active or static mixing devices or by use of any stirring or pumping device employed in mixing or transferring the reaction mixture.

As used herein with respect to a chemical compound, unless specifically indicated otherwise, the singular includes all isomeric forms and vice versa (for example, "hexane", includes all isomers of hexane individually or collectively). The terms "compound" and "complex" are used interchangeably herein to refer to organic-, inorganic- and organometal compounds. The term, "atom" refers to the smallest constituent of an element regardless of ionic state, that is, whether or not the same bears a charge or partial charge or is bonded to another atom. The term "heteroatom" refers to an atom other than carbon or hydrogen. Preferred heteroatoms include: F, Cl, Br, N, O, P, B, S, Si, Sb, Al, Sn, As, Se and Ge.

The term, "hydrocarbyl" refers to univalent substituents containing only hydrogen and carbon atoms, including branched or unbranched, saturated or unsaturated, cyclic or noncyclic species. Examples include alkyl-, cycloalkyl-, alkenyl-, alkadienyl-, cycloalkenyl-, cycloalkadienyl-, aryl-, and alkynyl-groups. "Substituted hydrocarbyl" refers to a hydrocarbyl group that is substituted with one or more nonhydrocarbyl substituent groups. The terms, "heteroatom containing hydrocarbyl" or "heterohydrocarbyl" refer to univalent groups in which at least one atom other than hydrogen or carbon is present along with one or more carbon atom and one or more hydrogen atoms. The term "heterocarbyl" refers to groups containing one or more carbon atoms and one or more heteroatoms and no hydrogen atoms. The bond between the carbon atom and any heteroatom as well as the bonds between any two heteroatoms, may be saturated or unsaturated. Thus, an alkyl group substituted with a heterocycloalkyl-, substituted heterocycloalkyl-, heteroaryl-, substituted heteroaryl-, alkoxy-, aryloxy-, dihydrocarbylboryl-, dihydrocarbylphosphino-, dihydrocarbylamino-, trihydrocarbylsilyl-, hydrocarbylthio-, or hydrocarbylseleno-group is within the scope of the term heteroalkyl. Examples of suitable heteroalkyl groups include cyano-, benzoyl-, (2-pyridyl)methyl-, and trifluoromethyl-groups.

As used herein the term "aromatic" refers to a polyatomic, cyclic, conjugated ring system as used herein with respect to a ring system containing two or more polyatomic, cyclic rings means that with respect to at least two rings thereof, at least one pair of adjacent atoms is included in both rings. The term "aryl" refers to a monovalent aromatic substituent which may be a single aromatic ring or multiple aromatic rings which are fused together, linked covalently, or linked to a common group such as a methylene or ethylene moiety. The aromatic ring(s) may include phenyl, naphthyl, anthracenyl, and biphenyl, among others.

"Substituted aryl" refers to an aryl group in which one or more hydrogen atoms bound to any carbon is replaced by one or more functional groups such as alkyl, substituted alkyl, cycloalkyl, substituted cycloalkyl, heterocycloalkyl, substituted heterocycloalkyl, halogen, alkylhalos (e.g., $CF_3$), hydroxy, amino, phosphido, alkoxy, amino, thio, nitro, and both saturated and unsaturated cyclic hydrocarbons which are fused to the aromatic ring(s), linked covalently or linked to a common group such as a methylene or ethylene moiety. The common linking group may also be a carbonyl as in benzophenone or oxygen as in diphenylether or nitrogen in diphenylamine.

The term, "comonomer incorporation index", refers to the percent comonomer incorporated into a copolymer prepared by the catalyst under consideration. The selection of metal complexes or catalyst compositions having the greatest difference in comonomer incorporation indices under different polymerization conditions, in one embodiment of the present invention, results in copolymers from two or more monomers having the largest difference in block or segment properties, such as density, for the same comonomer composition distribution. Comonomer incorporation index is generally determined by the use of NMR spectroscopic techniques. It may also be estimated based on monomer reactivities and reactor kinetics according to known theoretical techniques.

In a very highly preferred embodiment, the polymers of the invention possess a most probable distribution of block lengths. Preferred polymers according to the invention are pseudo-block copolymers containing 2 or 3 blocks or segments. In a polymer containing three or more segments (that is blocks separated by a distinguishable block) each block may be the same or chemically different and generally characterized by a distribution of properties. The invention involves the concept of using chain shuttling as a way to prolong the lifetime of a polymer chain such that a substantial fraction of the polymer chains exit at least the first reactor of a multiple reactor series or the first reactor zone in a multiple zoned reactor operating substantially under plug flow conditions in the form of polymer terminated with a chain shuttling agent, and the polymer chain experiences different polymerization conditions in the next reactor or polymerization zone. Different polymerization conditions in the respective reactors or zones include the use of different monomers, comonomers, or monomer/comonomer(s) ratio, different polymerization temperatures, gradients, or any other difference leading to formation of a distinguishable polymer segment. Thus, at least a portion of the polymer resulting from the present process comprises two, three, or more, preferably two or three, differentiated polymer segments arranged intramolecularly. Because the various reactors or zones form a distribution of polymers rather than a single specific polymer composition, the resulting product approximates the physical properties of a block copolymer and is referred to as a pseudo-block copolymer.

In contrast with the previously discussed sequential polymerization techniques wherein no chain shuttling agent is utilized, polymer products can now be obtained according to the present invention by selecting highly active catalyst compositions capable of rapid transfer of polymer segments both to and from a suitable chain shuttling agent such that polymer blocks or regions of the resulting catalyst possess distinguishable polymer properties. Due to the use of chain shuttling agents and catalysts capable of rapid and efficient exchange of growing polymer chains, the growing polymer experiences discontinuous polymer growth, such that intramolecular regions of the polymer are formed under two or more different polymerization conditions.

The following mathematical treatment of the resulting polymers is based on theoretically derived parameters that are believed to apply to the present invented polymers and demonstrate that, especially in two or more steady-state, continuous reactors or zones connected in series, having differing polymerization conditions to which the growing polymer is exposed, the block lengths of the polymer being formed in each reactor or zone will conform to a most probable distribution, derived in the following manner, wherein $p_i$ is the probability of polymer propagation in a reactor with respect to block sequences from catalyst i. The theoretical treatment is based on standard assumptions and methods known in the art and used in predicting the effects of polymerization kinetics on molecular architecture, including the use of mass action reaction rate expressions that are not affected by chain or block lengths, and the assumption that polymer chain growth is completed in a very short time compared to the mean reactor residence time. Such methods have been previously disclosed in W. H. Ray, *J. Macromol. Sci., Rev. Macromol. Chem.*, C8, 1 (1972) and A. E. Hamielec and J. F. MacGregor, "Polymer Reaction Engineering", K. H. Reichert and W. Geisler, Eds., Hanser, Munich, 1983. In addition, it is assumed that each incidence of the chain shuttling reaction in a given reactor results in the formation of a single polymer block, whereas transfer of the chain shuttling agent terminated polymer to a different reactor or zone and exposure to different polymerization conditions results in formation of a different block. For catalyst i, the fraction of sequences of length n being produced in a reactor is given by $X_i[n]$, where n is an integer from 1 to infinity representing the total number of monomer units in the block.

$$X_i[n]=(1-p_i) p_i^{(n-1)} \text{ most probable distribution of block lengths}$$

If more than one catalyst is present in a reactor or zone, each catalyst has a probability of propagation ($p_i$) and therefore has a unique average block length and distribution for polymer being made in that reactor or zone. In a most preferred embodiment the probability of propagation is defined as:

$$p_i = \frac{Rp[i]}{Rp[i] + Rt[i] + Rs[i] + [C_i]}$$

for each catalyst i={1, 2 . . . }, where,
Rp[i]=Local rate of monomer consumption by catalyst i, (moles/L/time),
Rt[i]=Total rate of chain transfer and termination for catalyst i, (moles/L/time), and
Rs[i]=Local rate of chain shuttling with dormant polymer, (moles/L/time).

For a given reactor the polymer propagation rate, Rp[i], is defined using an apparent rate constant, $\overline{k_{pi}}$, multiplied by a total monomer concentration, [M], and multiplied by the local concentration of catalyst i, [Ci], as follows:

$$Rp[i]=\overline{k_{pi}}[M][C_i]$$

The chain transfer, termination, and shuttling rate is determined as a function of chain transfer to hydrogen ($H_2$), beta hydride elimination, and chain transfer to chain shuttling agent (CSA). The quantities [$H_2$] and [CSA] are molar concentrations and each subscripted k value is a rate constant for the reactor or zone:

$$Rt[i]=k_{H2i}[H_2][C_i]+k_{\beta i}[C_i]+k_{ai}[CSA][C_i]$$

Dormant polymer chains are created when a polymer moiety transfers to a CSA and all CSA moieties that react are assumed to each be paired with a dormant polymer chain. The rate of chain shuttling of dormant polymer with catalyst i is given as follows, where [$CSA_f$] is the feed concentration of CSA, and the quantity ([$CSA_f$]−[CSA]) represents the concentration of dormant polymer chains:

$$Rs[i]=k_{ai}[C_i]([CSA_f]-[CSA])$$

As a result of the foregoing theoretical treatment, it may be seen that the overall block length distribution for each block of the resulting pseudo-block copolymer is a sum of the block length distribution given previously by $X_i[n]$, weighted by the local polymer production rate for catalyst i. This means that a polymer made under at least two different polymer forming conditions will have at least two distinguishable blocks or segments each possessing a most probable block length distribution.

Monomers

Suitable monomers for use in preparing the copolymers of the present invention include any α-olefin, and most preferably ethylene and at least one copolymerizable comonomer, propylene and at least one copolymerizable comonomer having from 4 to 20 carbons, or 4-methyl-1-pentene and at least one different copolymerizable comonomer having from 4 to 20 carbons. Examples of suitable monomers include straight-chain or branched α-olefins of 2 to 30, preferably 2 to 20 carbon atoms, such as ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cycloolefins of 3 to 30, preferably 3 to 20 carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and poly-olefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene, dicyclopentadiene, 7-methyl-1,6-octadiene, 4-ethylidene-8-methyl-1,7-nonadiene, and 5,9-dimethyl-1,4,8-decatriene; aromatic vinyl compounds such as mono- or poly-alkylstyrenes (including styrene, o-methylstyrene, m-methylstyrene, p-methylstyrene, o,p-dimethylstyrene, o-ethylstyrene, m-ethylstyrene and p-ethylstyrene), and functional group-containing derivatives, such as methoxystyrene, ethoxystyrene, vinylbenzoic acid, methyl vinylbenzoate, vinylbenzyl acetate, hydroxystyrene, o-chlorostyrene, p-chlorostyrene, divinylbenzene, 3-phenylpropene, 4-phenylpropene and α-methylstyrene, vinylchloride, 1,2-difluoroethylene, 1,2-dichloroethylene, tetrafluoroethylene, and 3,3,3-trifluoro-1-propene, provided the monomer is polymerizable under the conditions employed.

Preferred monomers or mixtures of monomers for use in combination with at least one CSA herein include ethylene; propylene; mixtures of ethylene with one or more monomers selected from the group consisting of propylene, 1-butene, 1-hexene, 4-methyl-1-pentene, 1-octene, and styrene; and mixtures of ethylene, propylene and a conjugated or non-conjugated diene.

Chain Shuttling Agents

The term, "shuttling agent" or "chain shuttling agent", refers to a compound or mixture of compounds that is capable of causing polymeryl transfer between the various active catalyst sites under the conditions of the polymerization. That is, transfer of a polymer fragment occurs both to and from an active catalyst site in a facile manner. In contrast to a shuttling agent, a "chain transfer agent" causes termination of polymer chain growth and amounts to a one-time transfer of growing polymer from the catalyst to the transfer agent. Desirably, the intermediate formed between the chain shuttling agent and the polymeryl chain is sufficiently stable that chain termination is relatively rare. Desirably, less than 10 percent, preferably less than 50 percent, more preferably less than 75 percent and most desirably less than 90 percent of shuttling agent-polymeryl products are terminated prior to attaining 2 distinguishable, intramolecular polymer segments or blocks.

While attached to the growing polymer chain, the shuttling agent desirably does not alter the polymer structure or incorporate additional monomer. That is, the shuttling agent does not also possess significant catalytic properties for the polymerization of interest. Rather, the shuttling agent forms a metal-alkyl or other type interaction with the polymer moiety, for a time period such that transfer of the polymer moiety to an active polymerization catalyst site in a subsequent reactor may occur. As a consequence, the subsequently formed polymer region possesses a distinguishable physical or chemical property, such as a different monomer or comonomer identity, a difference in comonomer composition distribution, crystallinity, density, tacticity, regio-error, or other property. Subsequent repetitions of the foregoing process can result in formation of segments or blocks having differing properties, or a repetition of a previously formed polymer composition, depending on the rates of polymeryl exchange, number of reactors or zones within a reactor, and transport between the reactors or zones. The polymers of the invention desirably are characterized by at least two individual blocks or segments having a difference in composition and a most probable block length distribution. That is, adjacent blocks have altered composition within the polymer and a size distribution (Mw/Mn) greater than 1.0, preferably greater than 1.2.

The process of the invention employing a catalyst one or more cocatalysts and chain shuttling agent may be further elucidated by reference to FIG. 1, where there is illustrated an activated catalyst, 10, which in a first reactor operating under steady state polymerization conditions or in a first polymerization zone operating under plug flow polymerization conditions forms a polymer chain, 12. A chain shuttling agent, 14, added along with the initial charge of reactants or later in the polymerization process, including just prior to or during transfer to a second reactor or zone, attaches to the polymer chain produced by an active catalyst site thereby preventing termination of the polymer chain prior to entering the second reactor or zone. In the presence of modified polymerization conditions, the polymer block attached to the chain shuttling agent is transferred back to a catalyst site, and a new polymer segment, 16, which preferably is distinguishable from polymer segment 12, is produced. The resulting diblock copolymer may also attach to an available chain shuttling agent forming the combination of a chain shuttling agent with the diblock copolymer, 18 prior to exiting the second reactor or zone. Transfer of the growing polymer multiple times to an active catalyst site may occur with continued growth of the polymer segment. Under uniform polymerization conditions, the growing polymer chain is substantially homogeneous, although individual molecules may differ in size. The first and second polymer segments formed in the process are distinguishable because the polymerization conditions in shuttling agent is able to prolong the polymer life time (that is the time during which further polymer growth may occur) until two or more different polymerization environments are experienced. The diblock copolymer chains, 20, may be recovered by termination, such as by reaction with water or other proton source, or functionalized, if desired, forming vinyl, hydroxyl, silane, carboxylic acid, carboxylic acid ester, ionomeric, or other functional terminal groups to replace the chain shuttling agent. Alternatively, the diblock polymer segment may be coupled with a polyfunctional coupling agent, especially a difunctional coupling agent such as dichlorodimethylsilane or ethylenedichloride, and recovered as a triblock copolymer, 22. It is also possible to continue polymerization in a third reactor or zone under conditions differing from those in the second reactor or zone, and recovering the resulting triblock copolymer, 21. If the third reactor's conditions are substantially identical to those of the initial reactor or zone, the product will be substantially similar to a conventional triblock copolymer, but with block lengths that are a most probable distribution.

Ideally, the rate of chain shuttling is equivalent to or faster than the rate of polymer termination, even up to 10 or even 100 times faster than the rate of polymer termination and significant with respect to the rate of polymerization. This permits formation of distinct polymer blocks in the first reactor or zone and discharge from said reactor or zone into a subsequent reactor or zone of a reaction mixture containing significant quantities of polymer chains terminated with chain shuttling agents and capable of continued monomer insertion under distinguishable polymerization conditions.

By selecting different shuttling agents or mixtures of agents with a catalyst, by altering the comonomer composition, temperature, pressure, optional chain terminating agent such as $H_2$, or other reaction conditions in separate reactors or zones of a reactor operating under plug flow conditions, polymer products having segments of varying density or comonomer concentration, monomer content, and/or other distinguishing property can be prepared. For example, in a typical process employing two continuous solution polymerization reactors connected in series and operating under differing polymerization conditions, the resulting polymer segments will each have a relatively broad molecular weight distribution characteristic of typical olefin coordination polymerization catalysts, preferably a Mw/Mn from 1.7 to 15, more preferably from 1.8 to 10, but will reflect the polymer formed under the differing polymerization conditions. In addition, certain quantities of a conventional random copolymer may also be formed coincident with formation of the pseudo-diblock copolymer of the present invention, resulting in a resin blend. The average block lengths in the resulting polymers may be controlled by the chain shuttling rate of the CSA, the amount of CSA added, and other process variables, such as polymer production rate, and the amount of optional chain termination agent, such as hydrogen, employed. Average block lengths of each block type can be individually controlled by altering process variables in each reactor.

Highly desired copolymers comprise at least one block or segment that is highly crystalline polyethylene or polypropylene, especially highly isotactic polypropylene, joined intramolecularly with one or more separate blocks comprising an amorphous polymer, especially a copolymer of ethylene and a $C_{3-8}$ comonomer, or a copolymer of propylene with ethylene and/or a $C_{4-8}$ comonomer. Desirably the foregoing polymer is a pseudo-diblock copolymer. Additional desirable copolymers are pseudo-triblock copolymers comprising a central, relatively amorphous polymer block bonded between two relatively crystalline polyolefin polymer blocks.

A suitable composition comprising catalyst, cocatalyst, and a chain shuttling agent especially adapted for use herein can be selected by means of the following multi-step procedure:

I. One or more addition polymerizable, preferably olefin monomers are polymerized using a mixture comprising a potential catalyst and a potential chain shuttling agent. This polymerization test is desirably performed using a batch or semi-batch reactor (that is, without resupply of catalyst or shuttling agent), preferably with relatively constant monomer concentration, operating under solution polymerization conditions, typically using a molar ratio of catalyst to chain shuttling agent from 1:5 to 1:500. After forming a suitable quantity of polymer, the reaction is terminated by addition of a catalyst poison and the polymer's properties (Mw, Mn, and Mw/Mn or PDI) measured.

II. The foregoing polymerization and polymer testing are repeated for several different reaction times, providing a series of polymers having a range of yields and PDI values.

III. Catalyst/chain shuttling agent pairs demonstrating significant polymer transfer both to and from the chain shuttling agent are characterized by a polymer series wherein the minimum PDI is less than 2.0, more preferably less than 1.5, and most preferably less than 1.3. Furthermore, if chain shuttling is occurring, the Mn of the polymer will increase, preferably nearly linearly, as conversion is increased. Most preferred catalyst/shuttling agent pairs are those giving polymer Mn as a function of conversion (or polymer yield) fitting a line with a statistical precision ($R^2$) of greater than 0.95, preferably greater than 0.99.

Steps I-III are then carried out for one or more additional pairings of potential catalysts and/or putative shuttling agents.

In addition, it is preferable that the chain shuttling agent does not reduce the catalyst activity (measured in weight of polymer produced per weight of catalyst per unit time) by more than 60 percent, more preferably such catalyst activity is not reduced by more than 20 percent, and most preferably catalyst activity of the catalyst is increased compared to the catalyst activity in the absence of a chain shuttling agent. A further consideration from a process viewpoint is that the producing a homogeneous reaction mixture or conveying the reaction mixture. In this regard, a monofunctional shuttling agent is preferred to a difunctional agent which in turn is preferred to a trifunctional agent.

The foregoing test is readily adapted to rapid throughput screening techniques using automated reactors and analytic probes and to formation of polymer blocks having different distinguishing properties. For example, a number of potential chain shuttling agent candidates can be pre-identified or synthesized in situ by combination of various organometal compounds with various proton sources and the compound or reaction product added to a polymerization reaction employing an olefin polymerization catalyst composition. Several polymerizations are conducted at varying molar ratios of shuttling agent to catalyst. As a minimum requirement, suitable shuttling agents are those that produce a PDI of less than 2.0 in variable yield experiments as described above, while not significantly adversely affecting catalyst activity, and preferably improving catalyst activity, as above described.

Alternatively, it is also possible to detect desirable catalyst/shuttling agent pairs by performing a series of polymerizations under standard batch reaction conditions and measuring the resulting number average molecular weights, PDI and polymer yield or production rate. Suitable shuttling agents are characterized by lowering of the resultant Mn without significant broadening of PDI or loss of activity (reduction in yield or rate).

Regardless of the method for identifying, a priori, a shuttling agent, the term is meant to refer to a compound that is capable of preparing the presently identified pseudo-block copolymers under the polymerization conditions herein disclosed.

Suitable shuttling agents for use herein include Group 1, 2, 12 or 13 metal compounds or complexes containing at least one $C_{1-20}$ hydrocarbyl group, preferably hydrocarbyl substituted aluminum, gallium or zinc compounds containing from 1 to 12 carbons in each hydrocarbyl group, and reaction products thereof with a proton source. Preferred hydrocarbyl groups are alkyl groups, preferably linear or branched, $C_{2-8}$ alkyl groups. Most preferred shuttling agents for use in the present invention are trialkyl aluminum and dialkyl zinc compounds, especially triethylaluminum, tri(i-propyl) aluminum, tri(i-butyl)aluminum, tri(n-hexyl)aluminum, tri(n-octyl)aluminum, triethylgallium, or diethylzinc. Additional suitable shuffling agents include the reaction product or mixture formed by combining the foregoing organometal compound, preferably a tri($C_{1-8}$) alkyl aluminum or di($C_{1-8}$) alkyl zinc compound, especially triethylaluminum, tri(i-propyl)aluminum, tri(i-butyl)aluminum, tri(n-hexyl)aluminum, tri(n-octyl)aluminum, or diethylzinc, with less than a stoichiometric quantity (relative to the number of hydrocarbyl groups) of a secondary amine or a hydroxyl compound, especially bis (trimethylsilyl)amine, t-butyl(dimethyl)siloxane, 2-bis(2,3,6,7-dibenzo-1-azacycloheptaneamine), or 2,6-diphenylphenol. Desirably, sufficient amine or hydroxyl reagent is used such that one hydrocarbyl group remains per metal atom. The primary reaction products of the foregoing combinations most desired for use in the present invention as shuttling agents are n-octylaluminum di(bis(trimethylsilyl)amide), i-propylaluminum bis(dimethyl(t-butyl)siloxide), and n-octylaluminum di(pyridinyl-2-methoxide), i-butylaluminum bis(dimethyl(t-butyl)siloxane), i-butylaluminum bis(di(trimethylsilyl)amide), n-octylaluminum di(pyridine-2-methoxide), i-butylaluminum bis(di(n-pentyl)amide), n-octylaluminum bis(2,6-di-t-butylphenoxide), n-octylaluminum di(ethyl (1-naphthyl)amide), ethylaluminum bis(t-butyldimethylsiloxide), ethylaluminum di(bis (trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis (dimethyl(t-butyl)siloxide, ethylzinc (2,6-diphenylphenoxide), and ethylzinc (t-butoxide).

Preferred shuttling agents possess the highest transfer rates of polymer transfer as well as the highest transfer efficiencies (reduced incidences of chain termination). Such shuttling agents may be used in reduced concentrations and still achieve the desired degree of shuttling. Highly desirably, chain shuttling agents with a single exchange site are employed due to, the fact that the effective molecular weight of the polymer in the reactor is lowered, thereby reducing viscosity of the reaction mixture and consequently reducing operating costs.

Catalysts

Suitable catalysts for use herein include any compound or combination of compounds that is adapted for preparing polymers of the desired composition or type. Both heterogeneous and homogeneous catalysts may be employed. Examples of heterogeneous catalysts include the well known Ziegler-Natta compositions, especially Group 4 metal halides supported on Group 2 metal halides or mixed halides and alkoxides and the well known chromium or vanadium based catalysts. Preferably however, for ease of use and for production of narrow molecular weight polymer segments in solution, the catalysts for use herein are homogeneous catalysts comprising a relatively pure organometallic compound or metal complex, especially compounds or complexes based on metals selected from Groups 3-15 or the Lanthanide series of the Periodic Table of the Elements.

Preferred metal complexes for use herein include complexes of metals selected from Groups 3 to 15 of the Periodic Table of the Elements containing one or more delocalized, π-bonded ligands or polyvalent Lewis base ligands. Examples include metallocene, half-metallocene, constrained geometry, and polyvalent pyridylamine, or other polychelating base complexes. The complexes are generically depicted by the formula: $MK_kX_xZ_z$, or a dimer thereof, wherein M is a metal selected from Groups 3-15, preferably 3-10, more preferably 4-10, and most preferably Group 4 of the Periodic Table of the Elements;

K independently each occurrence is a group containing delocalized π-electrons or one or more electron pairs through which K is bound to M, said K group containing up to 50 atoms not counting hydrogen atoms, optionally two or more K groups may be joined together forming a bridged structure, and further optionally one or more K groups may be bound to Z, to X or to both Z and X;

X independently each occurrence is a monovalent, anionic moiety having up to 40 non-hydrogen atoms, optionally one or more X groups may be bonded together thereby forming a divalent or polyvalent anionic group, and, further optionally, one or more X groups and one or more Z groups may be bonded together thereby forming a moiety that is both covalently bound to M and coordinated thereto;

Z independently each occurrence is a neutral, Lewis base donor ligand of up to 50 non-hydrogen atoms containing at least one unshared electron pair through which Z is coordinated to M;

k is an integer from 0 to 3;

x is an integer from 1 to 4;

z is a number from 0 to 3; and the sum, k+x, is equal to the formal oxidation state of M.

Suitable metal complexes include those containing from 1 to 3 π-bonded anionic or neutral ligand groups, which may be cyclic or non-cyclic delocalized π-bonded anionic ligand groups. Exemplary of such π-bonded groups are conjugated or nonconjugated, cyclic or non-cyclic diene and dienyl groups, allyl groups, boratabenzene groups, phosphole, and arene groups. By the term "π-bonded" is meant that the ligand group is bonded to the transition metal by a sharing of electrons from a partially delocalized π-bond.

Each atom in the delocalized π-bonded group may independently be substituted with a radical selected from the group consisting of hydrogen, halogen, hydrocarbyl, halohydrocarbyl, hydrocarbyl-substituted heteroatoms wherein the heteroatom is selected from Group 14-16 of the Periodic Table of the Elements, and such hydrocarbyl-substituted heteroatom radicals further substituted with a Group 15 or 16 hetero atom containing moiety. In addition two or more such radicals may together form a fused ring system, including partially or fully hydrogenated fused ring systems, or they may form a metallocycle with the metal. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. Suitable hydrocarbyl-substituted heteroatom radicals include mono-, di- and tri-substituted radicals of boron, silicon, germanium, nitrogen, phosphorus or oxygen wherein each of the hydrocarbyl groups contains from 1 to 20 carbon atoms. Examples include N,N-dimethylamino, pyrrolidinyl, trimethylsilyl, triethylsilyl, t-butyldimethylsilyl, methyldi(t-butyl)silyl, triphenylgermyl, and trimethylgermyl groups. Examples of Group 15 or 16 hetero atom containing moieties include amino, phosphino, alkoxy, or alkylthio moieties or divalent derivatives thereof, for example, amide, phosphide, alkyleneoxy or alkylenethio groups bonded to the transition metal or Lanthanide metal, and bonded to the hydrocarbyl group, π-bonded group, or hydrocarbyl-substituted heteroatom.

Examples of suitable anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, decahydroanthracenyl groups, phosphole, and boratabenzyl groups, as well as inertly substituted derivatives thereof, especially $C_{1-10}$ hydrocarbyl-substituted or tris($C_{1-10}$ hydrocarbyl)silyl-substituted derivatives thereof. Preferred anionic delocalized π-bonded groups are cyclopentadienyl, pentamethylcyclopentadienyl, tetramethylcyclopentadienyl, tetramethylsilylcyclopentadienyl, indenyl, 2,3-dimethylindenyl, fluorenyl, 2-methylindenyl, 2-methyl-4-phenylindenyl, tetrahydrofluorenyl, octahydrofluorenyl, 1-indacenyl, 3-pyrrolidinoinden-1-yl, 3,4-(cyclopenta(1)phenanthren-1-yl, and tetrahydroindenyl.

The boratabenzenyl ligands are anionic ligands which are boron containing analogues to benzene. They are previously known in the art having been described by G. Herberich, et al., in *Organometallics*, 14, 1, 471-480 (1995). Preferred boratabenzenyl ligands correspond to the formula:

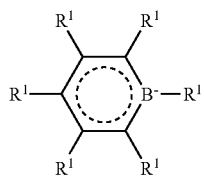

wherein $R^1$ is an inert substituent, preferably selected from the group consisting of hydrogen, hydrocarbyl, silyl, halo or germyl, said $R^1$ having up to 20 atoms not counting hydrogen, and optionally two adjacent $R^1$ groups may be joined together. In complexes involving divalent derivatives of such delocalized π-bonded groups one atom thereof is bonded by means of a covalent bond or a covalently bonded divalent group to another atom of the complex thereby forming a bridged system.

Phospholes are anionic ligands that are phosphorus containing analogues to a cyclopentadienyl group. They are previously known in the art having been described by WO 98/50392, and elsewhere. Preferred phosphole ligands correspond to the formula:

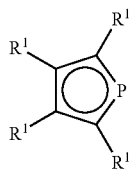

wherein $R^1$ is as previously defined.

Preferred transition metal complexes for use herein correspond to the formula: $MK_kX_xZ_z$, or a dimer thereof, wherein:

M is a Group 4 metal;

K is a group containing delocalized π-electrons through which K is bound to M, said K group containing up to 50 atoms not counting hydrogen atoms, optionally two K groups may be joined together forming a bridged structure, and further optionally one K may be bound to X or Z;

X each occurrence is a monovalent, anionic moiety having up to 40 non-hydrogen atoms, optionally one or more X and one or more K groups are bonded together to form a metallocycle, and further optionally one or more X and one or more Z groups are bonded together thereby forming a moiety that is both covalently bound to M and coordinated thereto;

Z independently each occurrence is a neutral, Lewis base donor ligand of up to 50 non-hydrogen atoms containing at least one unshared electron pair through which Z is coordinated to M;

k is an integer from 0 to 3;

x is an integer from 1 to 4;

z is a number from 0 to 3; and the sum, k+x, is equal to the formal oxidation state of M.

Preferred complexes include those containing either one or two K groups. The latter complexes include those containing a bridging group linking the two K groups. Preferred bridging groups are those corresponding to the formula $(ER'_2)_e$ wherein E is silicon, germanium, tin, or carbon, R' independently each occurrence is hydrogen or a group selected from silyl, hydrocarbyl, hydrocarbyloxy and combinations thereof, said R' having up to 30 carbon or silicon atoms, and e is 1 to 8. Preferably, R' independently each occurrence is methyl, ethyl, propyl, benzyl, tert-butyl, phenyl, methoxy, ethoxy or phenoxy.

Examples of the complexes containing two K groups are compounds corresponding to the formula:

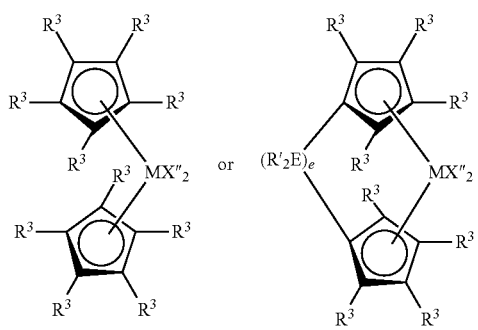

wherein:

M is titanium, zirconium or hafnium, preferably zirconium or hafnium, in the +2 or +4 formal oxidation state;

$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system, and X" independently each occurrence is an anionic ligand group of up to 40 non-hydrogen atoms, or two X" groups together form a divalent anionic ligand group of up to 40 non-hydrogen atoms or together are a conjugated diene having from 4 to 30 non-hydrogen atoms bound by means of delocalized π-electrons to M, whereupon M is in the +2 formal oxidation state, and R', E and e are as previously defined.

Exemplary bridged ligands containing two 1-bonded groups are: dimethylbis(cyclopentadienyl)silane, dimethylbis(tetramethylcyclopentadienyl)silane, dimethylbis(2-ethylcyclopentadien-1-yl)silane, dimethylbis(2-t-butylcyclopentadien-1-yl)silane, 2,2-bis(tetramethylcyclopentadienyl) propane, dimethylbis(inden-1-yl)silane, dimethylbis(tetrahydroinden-1-yl)silane, dimethylbis(fluoren-1-yl)silane, dimethylbis(tetrahydrofluoren-1-yl)silane, dimethylbis(2-methyl-4-phenylinden-1-yl)-silane, dimethylbis(2-methylinden-1-yl)silane, dimethyl(cyclopentadienyl) (fluoren-1-yl)silane, dimethyl(cyclopentadienyl)(octahydrofluoren-1-yl)silane, dimethyl(cyclopentadienyl) (tetrahydrofluoren-1-yl)silane, (1,1,2,2-tetramethy)-1,2-bis (cyclopentadienyl)disilane, (1,2-bis(cyclopentadienyl) ethane, and dimethyl(cyclopentadienyl)-1-(fluoren-1-yl) methane.

Preferred X" groups are selected from hydride, hydrocarbyl, silyl, germyl, halohydrocarbyl, halosilyl, silylhydrocarbyl and aminohydrocarbyl groups, or two X" groups together form a divalent derivative of a conjugated diene or else together they form a neutral, π-bonded, conjugated diene. Most preferred X" groups are $C_{1-20}$ hydrocarbyl groups.

Examples of metal complexes of the foregoing formula suitable for use in the present invention include:
bis(cyclopentadienyl)zirconiumdimethyl,
bis(cyclopentadienyl)zirconium dibenzyl,
bis(cyclopentadienyl)zirconium methyl benzyl,
bis(cyclopentadienyl)zirconium methyl phenyl,
bis(cyclopentadienyl)zirconiumdiphenyl,
bis(cyclopentadienyl)titanium-allyl,
bis(cyclopentadienyl)zirconiummethylmethoxide,
bis(cyclopentadienyl)zirconiummethylchloride,
bis(pentamethylcyclopentadienyl)zirconiumdimethyl,
bis(pentamethylcyclopentadienyl)titaniumdimethyl,
bis(indenyl)zirconiumdimethyl,
indenylfluorenylzirconiumdimethyl,
bis(indenyl)zirconiummethyl(2-(dimethylamino)benzyl),
bis(indenyl)zirconiummethyltrimethylsilyl,
bis(tetrahydroindenyl)zirconiummethyltrimethylsilyl,
bis(pentamethylcyclopentadienyl)zirconiummethylbenzyl,
bis(pentamethylcyclopentadienyl)zirconiumdibenzyl,
bis(pentamethylcyclopentadienyl)zirconiummethylmethoxide,
bis(pentamethylcyclopentadienyl)zirconiummethylchloride,
bis(methylethylcyclopentadienyl)zirconiumdimethyl,
bis(butylcyclopentadienyl)zirconiumdibenzyl,
bis(t-butylcyclopentadienyl)zirconiumdimethyl,
bis(ethyltetramethylcyclopentadienyl)zirconiumdimethyl,
bis(methylpropylcyclopentadienyl)zirconiumdibenzyl,
bis(trimethylsilylcyclopentadienyl)zirconiumdibenzyl,
dimethylsilylbis(cyclopentadienyl)zirconiumdimethyl,
dimethylsilylbis(tetramethylcyclopentadienyl)titanium (III) allyl
dimethylsilylbis(t-butylcyclopentadienyl)zirconiumdichloride,
dimethylsilylbis(n-butylcyclopentadienyl)zirconiumdichloride,
(methylenebis(tetramethylcyclopentadienyl)titanium(III) 2-(dimethylamino)benzyl,
(methylenebis(n-butylcyclopentadienyl)titanium(III) 2-(dimethylamino)benzyl,
dimethylsilylbis(indenyl)zirconiumbenzylchloride,
dimethylsilylbis(2-methyl-4-phenylindenyl)zirconiumdimethyl,
dimethylsilylbis(2-methylindenyl)zirconium-1,4-diphenyl-1,3-butadiene,
dimethylsilylbis(2-methyl-4-phenylindenyl)zirconium (II) 1,4-diphenyl-1,3-butadiene,
dimethylsilylbis(tetrahydroindenyl)zirconium(II) 1,4-diphenyl-1,3-butadiene,
dimethylsilylbis(tetramethylcyclopentadienyl)zirconium dimethyl
dimethylsilylbis(fluorenyl)zirconiumdimethyl,
dimethylsilyl-bis(tetrahydrofluorenyl)zirconium bis(trimethylsilyl),
(isopropylidene)(cyclopentadienyl)(fluorenyl)zirconiumdibenzyl, and
dimethylsilyl(tetramethylcyclopentadienyl)(fluorenyl)zirconium dimethyl.

A further class of metal complexes utilized in the present invention corresponds to the preceding formula: $MKZ_zX_x$, or a dimer thereof, wherein M, K, X, x and z are as previously defined, and Z is a substituent of up to 50 non-hydrogen atoms that together with K forms a metallocycle with M.

Preferred Z substituents include groups containing up to 30 non-hydrogen atoms comprising at least one atom that is oxygen, sulfur, boron or a member of Group 14 of the Periodic Table of the Elements directly attached to K, and a different atom, selected from the group consisting of nitrogen, phosphorus, oxygen or sulfur that is covalently bonded to M.

More specifically this class of Group 4 metal complexes used according to the present invention includes "constrained geometry catalysts" corresponding to the formula:

wherein:

M is titanium or zirconium, preferably titanium in the +2, +3, or +4 formal oxidation state;

$R^2$ is a delocalized, π-bonded ligand group optionally substituted with from 1 to 5 $R^2$ groups, $R^2$ in each occurrence independently is selected from the group consisting of hydrogen, hydrocarbyl, silyl, germyl, cyano, halo and combinations thereof, said $R^2$ having up to 20 non-hydrogen atoms, or adjacent $R^2$ groups together form a divalent derivative (that is, a hydrocarbadiyl, siladiyl or germadiyl group) thereby forming a fused ring system, each X is a halo, hydrocarbyl, hydrocarbyloxy or silyl group, said group having up to 20 non-hydrogen atoms, or two X groups together form a neutral $C_{5-30}$ conjugated diene or a divalent derivative thereof;

x is 1 or 2;

X' is $SiR'_2$, $CR'_2$, $SiR'_2SiR'_2$, $CR'_2CR'_2$, $CR'=CR'$, $CR'_2SiR'_2$, or $GeR'_2$, wherein R' independently each occurrence is hydrogen or a group selected from silyl, hydrocarbyl, hydrocarbyloxy and combinations thereof, said R' having up to 30 carbon or silicon atoms.

Specific examples of the foregoing constrained geometry metal complexes include compounds corresponding to the formula:

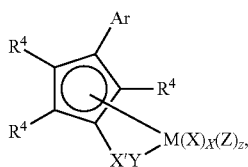

wherein,

Ar is an aryl group of from 6 to 30 atoms not counting hydrogen;

$R^4$ independently each occurrence is hydrogen, Ar, or a group other than Ar selected from hydrocarbyl, trihydrocarbylsilyl, trihydrocarbylgermyl, halide, hydrocarbyloxy, trihydrocarbylsiloxy, bis(trihydrocarbylsilyl)amino, di(hydrocarbyl)amino, hydrocarbadiylamino, hydrocarbylimino, di(hydrocarbyl)phosphino, hydrocarbadiylphosphino, hydrocarbylsulfido, halo-substituted hydrocarbyl, hydrocarbyloxy-substituted hydrocarbyl, trihydrocarbylsilyl-substituted hydrocarbyl, trihydrocarbylsiloxy-substituted hydrocarbyl, bis(trihydrocarbylsilyl)amino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylenephosphino-substituted hydrocarbyl, or hydrocarbylsulfido-substituted hydrocarbyl, said R group having up to 40 atoms not counting hydrogen atoms, and optionally two adjacent $R^4$ groups may be joined together forming a polycyclic fused ring group;

M is titanium;

X' is $SiR^6_2$, $CR^6_2$, $SiR^6_2SiR^6_2$, $CR^6_2CR^6_2$, $CR^6=CR^6$, $CR^6_2SiR^6_2$, $BR^6$, $BR^6L"$, or $GeR^6_2$;

Y is —O—, —S—, —NR$^5$—, —PR$^5$—; —NR$^2$, or —PR$^5_2$;

$R^5$, independently each occurrence, is hydrocarbyl, trihydrocarbylsilyl, or trihydrocarbylsilylhydrocarbyl, said $R^5$ having up to 20 atoms other than hydrogen, and optionally two $R^5$ groups or $R^5$ together with Y or Z form a ring system;

$R^6$, independently each occurrence, is hydrogen, or a member selected from hydrocarbyl, hydrocarbyloxy, silyl, halogenated alkyl, halogenated aryl, —NR$^5_2$, and combinations thereof, said $R^6$ having up to 20 non-hydrogen atoms, and optionally, two $R^6$ groups or $R^6$ together with Z forms a ring system;

Z is a neutral diene or a monodentate or polydentate Lewis base optionally bonded to $R^5$, X is hydrogen, a monovalent anionic ligand group having up to 60 atoms not counting hydrogen, or two X groups are joined together thereby forming a divalent ligand group;

x is 1 or 2; and z is 0, 1 or 2.

Preferred examples of the foregoing metal complexes are substituted at both the 3- and 4-positions of a cyclopentadienyl or indenyl group with an Ar group.

Examples of the foregoing metal complexes include:
(3-phenylcyclopentadien-1-yl)dimethyl(t-butylamido)silanetitanium dichloride,
(3-phenylcyclopentadien-1-yl)dimethyl(t-butylamido)silanetitanium dimethyl,
(3-phenylcyclopentadien-1-yl)dimethyl(t-butylamido)silanetitanium (II) 1,3-diphenyl-1,3-butadiene;
(3-(pyrrol-1-yl)cyclopentadien-1-yl)dimethyl(t-butylamido)silanetitanium dichloride,
(3-(pyrrol-1-yl)cyclopentadien-1-yl)dimethyl(t-butylamido)silanetitanium dimethyl,
(3-(pyrrol-1-yl)cyclopentadien-1-yl))dimethyl(t-butylamido)silanetitanium (II) 1,4-diphenyl-1,3-butadiene;
(3-(1-methylpyrrol-3-yl)cyclopentadien-1-yl)dimethyl(t-butylamido)silanetitanium dichloride,
(3-(1-methylpyrrol-3-yl)cyclopentadien-1-yl)dimethyl(t-butylamido)silanetitanium dimethyl,
(3-(1-methylpyrrol-3-yl)cyclopentadien-1-yl)dimethyl(t-butylamido)silanetitanium (II) 1,4-diphenyl-1,3-butadiene;
(3,4-diphenylcyclopentadien-1-yl)dimethyl(t-butylamido) silanetitanium dichloride,
(3,4-diphenylcyclopentadien-1-yl)dimethyl(t-butylamido) silanetitanium dimethyl,
(3,4-diphenylcyclopentadien-1-yl)dimethyl(t-butylamido) silanetitanium (II) 1,3-pentadiene;
(3-(3-N,N-dimethylamino)phenyl)cyclopentadien-1-yl)dimethyl(t-butylamido)silanetitanium dichloride,
(3-(3-N,N-dimethylamino)phenylcyclopentadien-1-yl)dimethyl(t-butylamido)silanetitanium dimethyl,
(3-(3-N,N-dimethylamino)phenylcyclopentadien-1-yl)dimethyl(t-butylamido)silanetitanium (II) 1,4-diphenyl-1,3-butadiene;
(3-(4-methoxyphenyl)-4-methylcyclopentadien-1-yl)dimethyl(t-butylamido)silanetitanium dichloride,
(3-(4-methoxyphenyl)-4-phenylcyclopentadien-1-yl)dimethyl(t-butylamido)silanetitanium dimethyl,
(3-4-methoxyphenyl)-4-phenylcyclopentadien-1-yl)dimethyl(t-butylamido)silanetitanium (II) 1,4-diphenyl-1,3-butadiene;
(3-phenyl-4-methoxycyclopentadien-1-yl)dimethyl(t-butylamido)silanetitanium dimethyl,
(3-phenyl-4-methoxycyclopentadien-1-yl)dimethyl(t-butylamido)silanetitanium (II) 1,4-diphenyl-1,3-butadiene;

(3-phenyl-4-(N,N-dimethylamino)cyclopentadien-1-yl)dimethyl(t-butylamido)silanetitanium dichloride,
(3-phenyl-4-(N,N-dimethylamino)cyclopentadien-1-yl)dimethyl(t-butylamido)silanetitanium dimethyl,
(3-phenyl-4-(N,N-dimethylamino)cyclopentadien-1-yl)dimethyl(t-butylamido)silanetitanium (II) 1,4-diphenyl-1,3-butadiene;
2-methyl-(3,4-di(4-methylphenyl)cyclopentadien-1-yl)dimethyl(t-butylamido)silanetitanium dichloride,
2-methyl-(3,4-di(4-methylphenyl)cyclopentadien-1-yl)dimethyl(t-butylamido)silanetitanium dimethyl,
2-methyl-(3,4-di(4-methylphenyl)cyclopentadien-1-yl)dimethyl(t-butylamido)silanetitanium (II) 1,4-diphenyl-1,3-butadiene;
((2,3-diphenyl)-4-(N,N-dimethylamino)cyclopentadien-1-yl)dimethyl(t-butylamido)silane titanium dichloride,
((2,3-diphenyl)-4-(N,N-dimethylamino)cyclopentadien-1-yl)dimethyl(t-butylamido)silane titanium dimethyl,
((2,3-diphenyl)-4-(N,N-dimethylamino)cyclopentadien-1-yl)dimethyl(t-butylamido)silanetitanium (II) 1,4-diphenyl-1,3-butadiene;
(2,3,4-triphenyl-5-methylcyclopentadien-1-yl)dimethyl(t-butylamido)silanetitanium dichloride,
(2,3,4-triphenyl-5-methylcyclopentadien-1-yl)dimethyl(t-butylamido)silanetitanium dimethyl,
(2,3,4-triphenyl-5-methylcyclopentadien-1-yl)dimethyl(t-butylamido)silanetitanium (II) 1,4-diphenyl-1,3-butadiene;
(3-phenyl-4-methoxycyclopentadien-1-yl)dimethyl(t-butylamido)silanetitanium dichloride,
(3-phenyl-4-methoxycyclopentadien-1-yl)dimethyl(t-butylamido)silanetitanium dimethyl,
(3-phenyl-4-methoxycyclopentadien-1-yl)dimethyl(t-butylamido)silanetitanium (II) 1,4-diphenyl-1,3-butadiene;
(2,3-diphenyl-4-(n-butyl)cyclopentadien-1-yl)dimethyl(t-butylamido)silanetitanium dichloride,
(2,3-diphenyl-4-(n-butyl)cyclopentadien-1-yl)dimethyl(t-butylamido)silanetitanium dimethyl,
(2,3-diphenyl-4-(n-butyl)cyclopentadien-1-yl)dimethyl(t-butylamido)silanetitanium (II) 1,4-diphenyl-1,3-butadiene;
(2,3,4,5-tetraphenylcyclopentadien-1-yl)dimethyl(t-butylamido)silanetitanium dichloride,
(2,3,4,5-tetraphenylcyclopentadien-1-yl)dimethyl(t-butylamido)silanetitanium (I) 1,4-diphenyl-1,3-butadiene.

Additional examples of suitable metal complexes for use herein are polycyclic complexes corresponding to the formula:

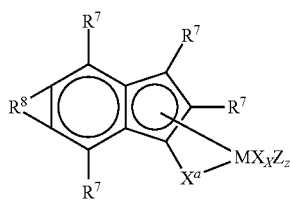

where M is titanium in the +2, +3 or +4 formal oxidation state;
$R^7$ independently each occurrence is hydride, hydrocarbyl, silyl, germyl, halide, hydrocarbyloxy, hydrocarbylsiloxy, hydrocarbylsilylamino, di(hydrocarbyl)amino, hydrocarbyleneamino, di(hydrocarbyl)phosphino, hydrocarbylenephosphino, hydrocarbylsulfido, halo-substituted hydrocarbyl, hydrocarbyloxy-substituted hydrocarbyl, silyl-substituted hydrocarbyl, hydrocarbylsiloxy-substituted hydrocarbyl, hydrocarbylsilylamino-substituted hydrocarbyl, di(hydrocarbyl)amino-substituted hydrocarbyl, hydrocarbyleneamino-substituted hydrocarbyl, di(hydrocarbyl) phosphino-substituted hydrocarbyl, hydrocarbylenephosphino-substituted hydrocarbyl, or hydrocarbylsulfido-substituted hydrocarbyl, said $R^7$ group having up to 40 atoms not counting hydrogen, and optionally two or more of the foregoing groups may together form a divalent derivative;

$R^8$ is a divalent hydrocarbylene- or substituted hydrocarbylene group forming a fused system with the remainder of the metal complex, said $R^8$ containing from 1 to 30 atoms not counting hydrogen;

$X^a$ is a divalent moiety, or a moiety comprising one σ-bond and a neutral two electron pair able to form a coordinate-covalent bond to M, said $X^a$ comprising boron, or a member of Group 14 of the Periodic Table of the Elements, and also comprising nitrogen, phosphorus, sulfur or oxygen;

X is a monovalent anionic ligand group having up to 60 atoms exclusive of the class of ligands that are cyclic, delocalized, π-bound ligand groups and optionally two X groups together form a divalent ligand group;

Z independently each occurrence is a neutral ligating compound having up to 20 atoms;

x is 0, 1 or 2; and z is zero or 1.

Preferred examples of such complexes are 3-phenyl-substituted s-indecenyl complexes corresponding to the formula:

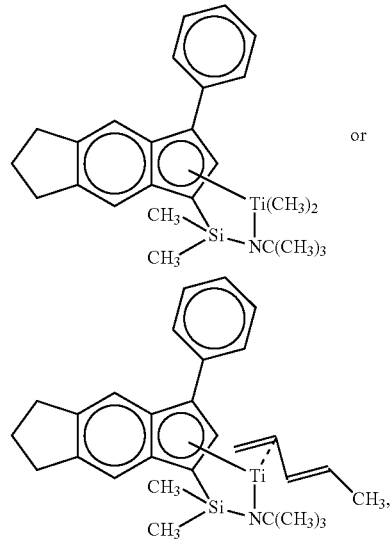

2,3-dimethyl-substituted s-indecenyl complexes corresponding to the formulas:

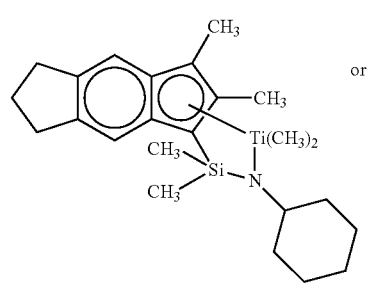

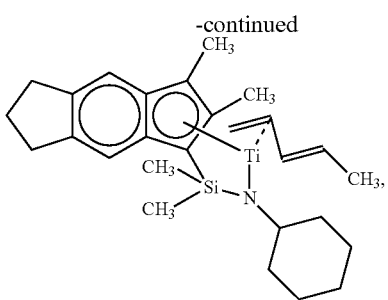

or 2-methyl-substituted s-indecenyl complexes corresponding to the formula:

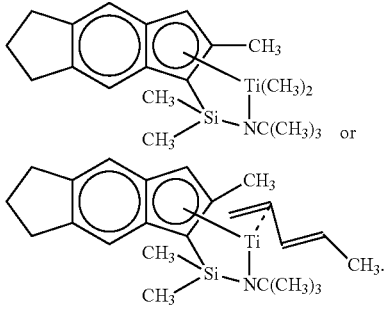

Additional examples of metal complexes that are usefully employed according to the present invention include those of the formula:

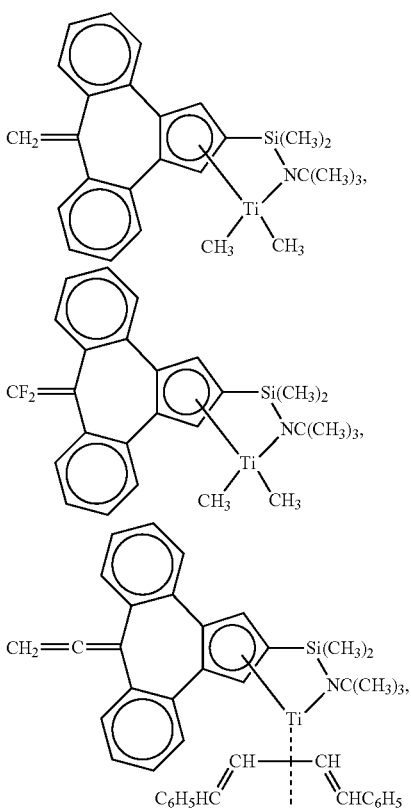

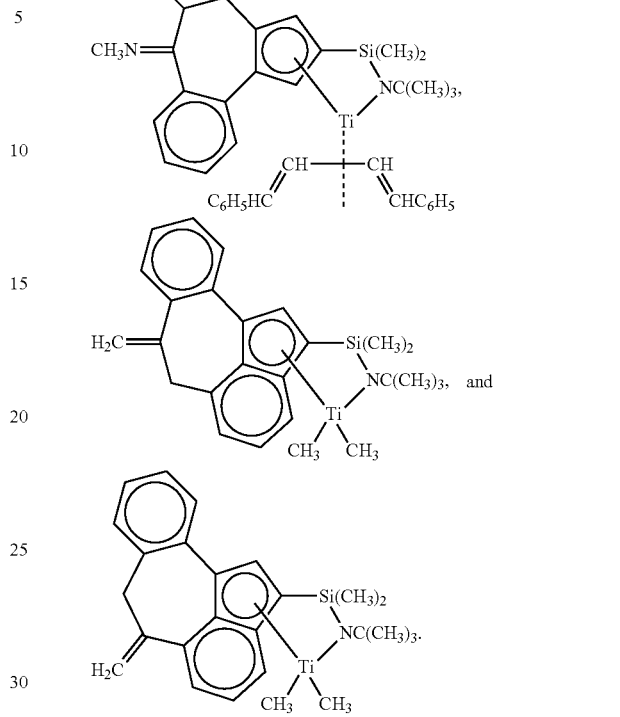

Specific metal complexes include:
(8-methylene-1,8-dihydrodibenzo[e,h]azulen-1-yl)-N-(1,1-dimethylethyl)dimethylsilanamide titanium (II) 1,4-diphenyl-1,3-butadiene,
(8-methylene-1,8-dihydrodibenzo[e,h]azulen-1-yl)-N-(1,1-dimethylethyl)dimethylsilanamide titanium (II) 1,3-pentadiene,
(8-methylene-1,8-dihydrodibenzo[e,h]azulen-1-yl)-N-(1,1-dimethylethyl)dimethylsilanamide titanium (III) 2-(N,N-dimethylamino)benzyl,
(8-methylene-1,8-dihydrodibenzo[e,h]azulen-1-yl)-N-(1,1-dimethylethyl)dimethylsilanamide titanium (IV) dichloride,
(8-methylene-1,8-dihydrodibenzo[e,h]azulen-1-yl)-N-(1,1-dimethylethyl)dimethylsilanamide titanium (IV) dimethyl,
(8-methylene-1,8-dihydrodibenzo[e,h]azulen-1-yl)-N-(1,1-dimethylethyl)dimethylsilanamide titanium (IV) dibenzyl,
(8-difluoromethylene-1,8-dihydrodibenzo[e,h]azulen-1-yl)-N-(1,1-dimethylethyl)dimethylsilanamide titanium (II) 1,4-diphenyl-1,3-butadiene,
(8-difluoromethylene-1,8-dihydrodibenzo[e,h]azulen-1-yl)-N-(1,1-dimethylethyl)dimethylsilanamide titanium (II) 1,3-pentadiene,
(8-difluoromethylene-1,8-dihydrodibenzo[e,h]azulen-1-yl)-N-(1,1-dimethylethyl)dimethylsilanamide titanium (III) 2-(N,N-dimethylamino)benzyl,
(8-difluoromethylene-1,8-dihydrodibenzo[e,h]azulen-1-yl)-N-(1,1-dimethylethyl)dimethylsilanamide titanium (IV) dichloride,
(8-difluoromethylene-1,8-dihydrodibenzo[e,h]azulen-1-yl)-N-(1,1-dimethylethyl)dimethylsilanamide titanium (IV) dimethyl,
(8-difluoromethylene-1,8-dihydrodibenzo[e,h]azulen-1-yl)-N-(1,1-dimethylethyl)dimethylsilanamide titanium (IV) dibenzyl,
(8-methylene-1,8-dihydrodibenzo[e,h]azulen-2-yl)-N-(1,1-dimethylethyl)dimethylsilanamide titanium (II) 1,4-diphenyl-1,3-butadiene, (8-methylene-1,8-dihydrodibenzo[e,h]azulen-2-yl)-N-(1,1-dimethylethyl)dimethylsilanamide titanium (II) 1,3-pentadiene,
(8-methylene-1,8-dihydrodibenzo[e,h]azulen-2-yl)-N-(1,1-dimethylethyl)dimethylsilanamide titanium (III) 2-(N,N-dimethylamino)benzyl,
(8-methylene-1,8-dihydrodibenzo[e,h]azulen-2-yl)-N-(1,1-dimethylethyl)dimethylsilanamide titanium (IV) dichloride,
(8-methylene-1,8-dihydrodibenzo[e,h]azulen-2-yl)-N-(1,1-dimethylethyl)dimethylsilanamide titanium (IV) dimethyl,
(8-methylene-1,8-dihydrodibenzo[e,h]azulen-2-yl)-N-(1,1-dimethylethyl)dimethylsilanamide titanium (IV) dibenzyl,
(8-difluoromethylene-1,8-dihydrodibenzo[e,h]azulen-2-yl)-N-(1,1-dimethylethyl)dimethylsilanamide titanium (II) 1,4-diphenyl-1,3-butadiene,
(8-difluoromethylene-1,8-dihydrodibenzo[e,h]azulen-2-yl)-N-(1,1-dimethylethyl)dimethylsilanamide titanium (II) 1,3-pentadiene,
(8-difluoromethylene-1,8-dihydrodibenzo[e,h]azulen-2-yl)-N-(1,1-dimethylethyl)dimethylsilanamide titanium (III) 2-(N,N-dimethylamino)benzyl,
(8-difluoromethylene-1,8-dihydrodibenzo[e,h]azulen-2-yl)-N-(1,1-dimethylethyl)dimethylsilanamide titanium (IV) dichloride,
(8-difluoromethylene-1,8-dihydrodibenzo[e,h]azulen-2-yl)-N-(1,1-dimethylethyl)dimethylsilanamide titanium (IV) dimethyl,
(8-difluoromethylene-1,8-dihydrodibenzo[e,h]azulen-2-yl)-N-(1,1-dimethylethyl)dimethylsilanamide titanium (IV) dibenzyl, and mixtures thereof, especially mixtures of positional isomers.

Further illustrative examples of metal complexes for use according to the present invention correspond to the formula:

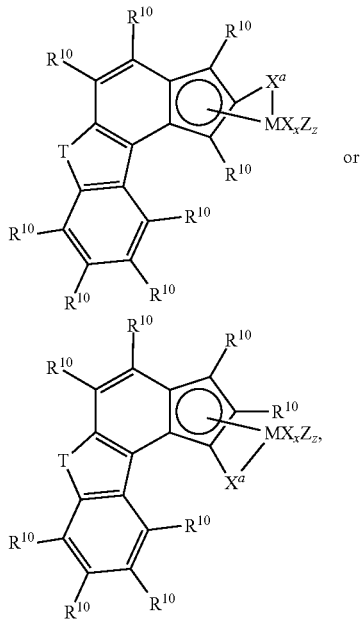

where M is titanium in the +2, +3 or +4 formal oxidation state;
T is —$NR^9$— or —O—;
$R^9$ is hydrocarbyl, silyl, germyl, dihydrocarbylboryl, or halohydrocarbyl or up to 10 atoms not counting hydrogen;

$R^{10}$ independently each occurrence is hydrogen, hydrocarbyl, trihydrocarbylsilyl, trihydrocarbylsilylhydrocarbyl, germyl, halide, hydrocarbyloxy, hydrocarbylsiloxy, hydrocarbylsilylamino, di(hydrocarbyl)amino, hydrocarbyleneamino, di(hydrocarbyl)phosphino, hydrocarbylene-phosphino, hydrocarbylsulfido, halo-substituted hydrocarbyl, hydrocarbyloxy-substituted hydrocarbyl, silyl-substituted hydrocarbyl, hydrocarbylsiloxy-substituted hydrocarbyl, hydrocarbylsilylamino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylenephosphino-substituted hydrocarbyl, or hydrocarbylsulfido-substituted hydrocarbyl, said $R^{10}$ group having up to 40 atoms not counting hydrogen atoms, and optionally two or more of the foregoing adjacent $R^{10}$- groups may together form a divalent derivative thereby forming a saturated or unsaturated fused ring;

$X^a$ is a divalent moiety lacking in delocalized π-electrons, or such a moiety comprising one σ-bond and a neutral two electron pair able to form a coordinate-covalent bond to M, said X' comprising boron, or a member of Group 14 of the Periodic Table of the Elements, and also comprising nitrogen, phosphorus, sulfur or oxygen;

X is a monovalent anionic ligand group having up to 60 atoms exclusive of the class of ligands that are cyclic ligand groups bound to M through delocalized π-electrons or two X groups together are a divalent anionic ligand group;

Z independently each occurrence is a neutral ligating compound having up to 20 atoms;

x is 0, 1, 2, or 3; and
z is 0 or 1.

Highly preferably T is =$N(CH_3)$, X is halo or hydrocarbyl, x is 2, X' is dimethylsilane, z is 0, and $R^{10}$ each occurrence is hydrogen, a hydrocarbyl, hydrocarbyloxy, dihydrocarbylamino, hydrocarbyleneamino, dihydrocarbylamino-substituted hydrocarbyl group, or hydrocarbyleneamino-substituted hydrocarbyl group of up to 20 atoms not counting hydrogen, and optionally two $R^{10}$ groups may be joined together.

Illustrative metal complexes of the foregoing formula that may be employed in the practice of the present invention further include the following compounds:
(t-butylamido)dimethyl-[6,7]benzo-[4,5:2',3'](1-methylisoindol)-(3H)-indene-2-yl)silanetitanium (II) 1,4-diphenyl-1,3-butadiene,
(t-butylamido)dimethyl-[6,7]benzo-[4,5:2',3'](1-methylisoindol)-(3H)-indene-2-yl)silanetitanium (II) 1,3-pentadiene,
(t-butylamido)dimethyl-[6,7]benzo-[4,5:2',3'](1-methylisoindol)-(3H)-indene-2-yl)silanetitanium (III) 2-(N,N-dimethylamino)benzyl,
(t-butylamido)dimethyl-[6,7]benzo-[4,5:2',3'](1-methylisoindol)-(3H)-indene-2-yl)silanetitanium (IV) dichloride,
(t-butylamido)dimethyl-[6,7]benzo-[4,5:2',3'](1-methylisoindol)-(3H)-indene-2-yl)silanetitanium (IV) dimethyl,
(t-butylamido)dimethyl-[6,7]benzo-[4,5:2',3'](1-methylisoindol)-(3H)-indene-2-yl)silanetitanium (IV) dibenzyl,
(t-butylamido)dimethyl-[6,7]benzo-[4,5:2',3'](1-methylisoindol)-(3H)-indene-2-yl)silanetitanium (IV) bis(trimethylsilyl),
(cyclohexylamido)dimethyl-[6,7]benzo-[4,5:2',3'](1-methylisoindol)-(3H)-indene-2-yl)silanetitanium (II) 1,4-diphenyl-1,3-butadiene,
(cyclohexylamido)dimethyl-[6,7]benzo-[4,5:2',3'](1-methylisoindol)-(3H)-indene-2-yl)silanetitanium (II) 1,3-pentadiene, (cyclohexylamido)dimethyl-[6,7]benzo-[4,5:2',3'](1-methylisoindol)-(3H)-indene-2-yl)silanetitanium (III) 2-(N,N-dimethylamino)benzyl,
(cyclohexylamido)dimethyl-[6,7]benzo-[4,5:2',3'](1-methylisoindol)-(3H)-indene-2-yl)silanetitanium (IV) dichloride,
(cyclohexylamido)dimethyl-[6,7]benzo-[4,5:2',3'](1-methylisoindol)-(3H)-indene-2-yl)silanetitanium (IV) dimethyl,
(cyclohexylamido)dimethyl-[6,7]benzo-[4,5:2',3'](1-methylisoindol)-(3H)-indene-2-yl)silanetitanium (IV) dibenzyl,
(cyclohexylamido)dimethyl-[6,7]benzo-[4,5:2',3'](1-methylisoindol)-(3H)-indene-2-yl)silanetitanium (IV) bis(trimethylsilyl),
(t-butylamido)di(p-methylphenyl)-[6,7]benzo-[4,5:2',3'](1-methylisoindol)-(3H)-indene-2-yl)silanetitanium (II) 1,4-diphenyl-1,3-butadiene,
(t-butylamido)di(p-methylphenyl)-[6,7]benzo-[4,5:2',3'](1-methylisoindol)-(3H)-indene-2-yl)silanetitanium (II) 1,3-pentadiene,
(t-butylamido)di(p-methylphenyl)-[6,7]benzo-[4,5:2',3'](1-methylisoindol)-(3H)-indene-2-yl)silanetitanium (III) 2-(N,N-dimethylamino)benzyl,
(t-butylamido)di(p-methylphenyl)-[6,7]benzo-[4,5:2',3'](1-methylisoindol)-(3H)-indene-2-yl)silanetitanium (IV) dichloride,
(t-butylamido)di(p-methylphenyl)-[6,7]benzo-[4,5:2',3'](1-methylisoindol)-(3H)-indene-2-yl)silanetitanium (IV) dimethyl,
(t-butylamido)di(p-methylphenyl)-[6,7]benzo-[4,5:2',3'](1-methylisoindol)-(3H)-indene-2-yl)silanetitanium (IV) dibenzyl,
(t-butylamido)di(p-methylphenyl)-[6,7]benzo-[4,5:2',3'](1-methylisoindol)-(3H)-indene-2-yl)silanetitanium (IV) bis(trimethylsilyl),
(cyclohexylamido)di(p-methylphenyl)-[6,7]benzo-[4,5:2',3'](1-methylisoindol)-(3H)-indene-2-yl)silanetitanium (II) 1,4-diphenyl-1,3-butadiene,
(cyclohexylamido)di(p-methylphenyl)-[6,7]benzo-[4,5:2',3'](1-methylisoindol)-(3H)-indene-2-yl)silanetitanium (II) 1,3-pentadiene,
(cyclohexylamido)di(p-methylphenyl)-[6,7]benzo-[4,5:2',3'](1-methylisoindol)-(3H)-indene-2-yl)silanetitanium (III) 2-(N,N-dimethylamino)benzyl,
(cyclohexylamido)di(p-methylphenyl)-[6,7]benzo-[4,5:2',3'](1-methylisoindol)-(3H)-indene-2-yl)silanetitanium (IV) dichloride,
(cyclohexylamido)di(p-methylphenyl)-[6,7]benzo-[4,5:2',3'](1-methylisoindol)-(3H)-indene-2-yl)silanetitanium (IV) dimethyl,
(cyclohexylamido)di(p-methylphenyl)-[6,7]benzo-[4,5:2',3'](1-methylisoindol)-(3H)-indene-2-yl)silanetitanium (IV) dibenzyl; and
(cyclohexylamido)di(p-methylphenyl)-[6,7]benzo-[4,5:2',3'](1-methylisoindol)-(3H)-indene-2-yl)silanetitanium (IV) bis(trimethylsilyl).

Illustrative Group 4 metal complexes that may be employed in the practice of the present invention further include:
(tert-butylamido)(1,1-dimethyl-2,3,4,9,10-η-1,4,5,6,7,8-hexahydronaphthalenyl)dimethylsilanetitaniumdimethyl,
(tert-butylamido)(1,1,2,3-tetramethyl-2,3,4,9,10-η-1,4,5,6,7,8-hexahydronaphthalenyl)dimethylsilanetitaniumdimethyl,
(tert-butylamido)(tetramethyl-η$^5$-cyclopentadienyl)dimethylsilanetitanium dibenzyl,
(tert-butylamido)(tetramethyl-η$^5$-cyclopentadienyl)dimethylsilanetitanium dimethyl,
(tert-butylamido)(tetramethyl-η$^5$-cyclopentadienyl)-1,2-ethanediyltitanium dimethyl,
(tert-butylamido)(tetramethyl-η$^5$-indenyl)dimethylsilanetitanium dimethyl,
(tert-butylamido)(tetramethyl-η$^5$-cyclopentadienyl)dimethylsilane titanium (III) 2-(dimethylamino)benzyl;
(tert-butylamido)(tetramethyl-η$^5$-cyclopentadienyl)dimethylsilanetitanium (III) allyl,
(tert-butylamido)(tetramethyl-η$^5$-cyclopentadienyl)dimethylsilanetitanium (III) 2,4-dimethylpentadienyl,
(tert-butylamido)(tetramethyl-η$^5$-cyclopentadienyl)dimethylsilanetitanium (II) 1,4-diphenyl-1,3-butadiene,
(tert-butylamido)(tetramethyl-η$^5$-cyclopentadienyl)dimethylsilanetitanium (II) 1,3-pentadiene,
(tert-butylamido)(2-methylindenyl)dimethylsilanetitanium (II) 1,4-diphenyl-1,3-butadiene,
(tert-butylamido)(2-methylindenyl)dimethylsilanetitanium (II) 2,4-hexadiene,
(tert-butylamido)(2-methylindenyl)dimethylsilanetitanium (IV) 2,3-dimethyl-1,3-butadiene,
(tert-butylamido)(2-methylindenyl)dimethylsilanetitanium (IV) isoprene,
(tert-butylamido)(2-methylindenyl)dimethylsilanetitanium (IV) 1,3-butadiene,
(tert-butylamido)(2,3-dimethylindenyl)dimethylsilanetitanium (IV) 2,3-dimethyl-1,3-butadiene,
(tert-butylamido)(2,3-dimethylindenyl)dimethylsilanetitanium (IV)
(tert-butylamido)(2,3-dimethylindenyl)dimethylsilanetitanium (IV) dibenzyl
(tert-butylamido)(2,3-dimethylindenyl)dimethylsilanetitanium (UV) 1,3-butadiene,
(tert-butylamido)(2,3-dimethylindenyl)dimethylsilaiietitanium (II) 1,3-pentadiene,
(tert-butylamido)(2,3-dimethylindenyl)dimethylsilaiietitanium (II) 1,4-diphenyl-1,3-butadiene,
(tert-butylamido)(2-methylindenyl)dimethylsilanetitanium (II) 1,3-pentadiene,
(tert-butylamido)(2-methylindenyl)dimethylsilanetitanium (IV) dimethyl,
(tert-butylamido)(2-methylindenyl)dimethylsilanetitanium (IV) dibenzyl,
(tert-butylamido)(2-methyl-4-phenylindenyl)dimethylsilanetitanium (II) 1,4-diphenyl-1,3-butadiene,
(tert-butylamido)(2-methyl-4-phenylindenyl)dimethylsilanetitanium (II) 1,3-pentadiene,
(tert-butylamido)(2-methyl-4-phenylindenyl)dimethylsilanetitanium (II) 2,4-hexadiene,
(tert-butylamido)(tetramethyl-η$^5$-cyclopentadienyl)dimethyl-silanetitanium (IV) 1,3-butadiene,
(tert-butylamido)(tetramethyl-η$^5$-cyclopentadienyl)dimethylsilanetitanium (IV) 2,3-dimethyl-1,3-butadiene,
(tert-butylamido)(tetramethyl-η$^5$-cyclopentadienyl)dimethylsilanetitanium (IV) isoprene,
(tert-butylamido)(tetramethyl-η$^5$-cyclopentadienyl)dimethyl-silanetitanium (II) 1,4-dibenzyl-1,3-butadiene,
(tert-butylamido)(tetramethyl-η$^5$-cyclopentadienyl)dimethylsilanetitanium (II) 2,4-hexadiene,
(tert-butylamido)(tetramethyl-η$^5$-cyclopentadienyl)dimethyl-silanetitanium (II) 3-methyl-1,3-pentadiene,
(tert-butylamido)(2,4-dimethylpentadien-3-yl)dimethylsilanetitaniumdimethyl,
(tert-butylamido)(6,6-dimethylcyclohexadienyl)dimethylsilanetitaniumdimethyl, (tert-butylamido)(1,1-dimethyl-2,3,4,9,10-η-1,4,5,6,7,8-hexahydronaphthalen-4-yl)dimethylsilanetitaniumdimethyl, (tert-butylamido)(1,1,2,3-tetramethyl-2,3,4,9,10-η-1,4,5,6,7,8-hexahydronaphthalen-4-yl)dimethylsilanetitaniumdimethyl (tert-butylamido)(tetramethyl-η⁵-cyclopentadienyl) methylphenylsilanetitanium (IV) dimethyl, (tert-butylamido)(tetramethyl-η⁵-cyclopentadienyl) methylphenylsilanetitanium (II) 1,4-diphenyl-1,3-butadiene. dimethyl, and 1-(tert-butylamido)-2-(tetramethyl-η⁵-cyclopentadienyl) ethanediyl-titanium (II) 1,4-diphenyl-1,3-butadiene.

Other delocalized, π-bonded complexes, especially those containing other Group 4 metals, will, of course, be apparent to those skilled in the art, and are disclosed among other places in: WO 03/78480, WO 03/78483, WO 02/92610, WO 02/02577, US 2003/0004286 and U.S. Pat. Nos. 6,515,155, 6,555,634, 6,150,297, 6,034,022, 6,268,444, 6,015,868, 5,866,704, and 5,470,993.

Additional examples of metal complexes that are usefully employed herein include polyvalent Lewis base compounds corresponding to the formula:

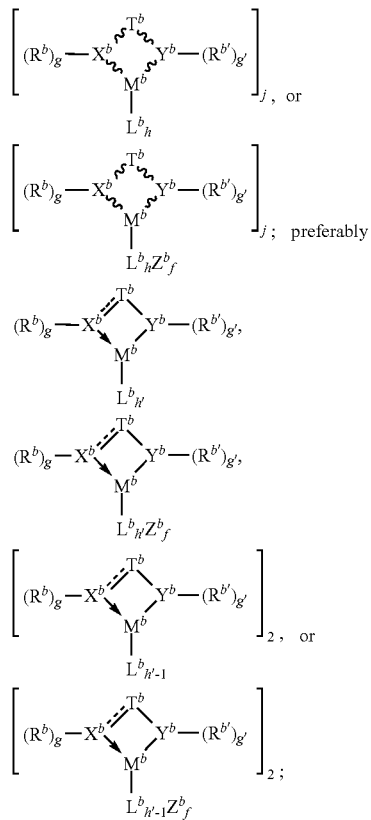

wherein $T^b$ is a bridging group, preferably containing 2 or more atoms other than hydrogen, $X^b$ and $Y^b$ are each independently selected from the group consisting of nitrogen, sulfur, oxygen and phosphorus; more preferably both $X^b$ and $Y^b$ are nitrogen, $R^b$ and $R^{b\prime}$ independently each occurrence are hydrogen or $C_{1-50}$ hydrocarbyl groups optionally containing one or more heteroatoms or inertly substituted derivative thereof. Non-limiting examples of suitable $R^b$ and $R^{b\prime}$ groups include alkyl, alkenyl, aryl, aralkyl, (poly)alkylaryl and cycloalkyl groups, as well as nitrogen, phosphorus, oxygen and halogen substituted derivatives thereof. Specific examples of suitable Rb and Rb' groups include methyl, ethyl, isopropyl, octyl, phenyl, 2,6-dimethylphenyl, 2,6-di(isopropyl)phenyl, 2,4,6-trimethylphenyl, pentafluorophenyl, 3,5-trifluoromethylphenyl, and benzyl;

g is 0 or 1;

$M^b$ is a metallic element selected from Groups 3 to 15, or the Lanthanide series of the Periodic Table of the Elements. Preferably, Mb is a Group 3-13 metal, more preferably Mb is a Group 4-10 metal;

$L^b$ is a monovalent, divalent, or trivalent anionic ligand containing from 1 to 50 atoms, not counting hydrogen. Examples of suitable $L^b$ groups include halide; hydride; hydrocarbyl, hydrocarbyloxy; di(hydrocarbyl)amido, hydrocarbyleneamido, di(hydrocarbyl)phosphido; hydrocarbylsulfido; hydrocarbyloxy, tri(hydrocarbylsilyl)alkyl; and carboxylates. More preferred L groups are $C_{1-20}$ alkyl, $C_{7-20}$ aralkyl, and chloride;

h is an integer from 1 to 6, preferably from 1 to 4, more preferably from 1 to 3, and j is 1 or 2, with the value h×j selected to provide charge balance;

$Z^b$ is a neutral ligand group coordinated to Mb, and containing up to 50 atoms not counting hydrogen Preferred $Z^b$ groups include aliphatic and aromatic amines, phosphines, and ethers, alkenes, alkadienes, and inertly substituted derivatives thereof. Suitable inert substituents include halogen, alkoxy, aryloxy, alkoxycarbonyl, aryloxycarbonyl, di(hydrocarbyl)amine, tri(hydrocarbyl)silyl, and nitrile groups. Preferred $Z^b$ groups include triphenylphosphine, tetrahydrofuran, pyridine, and 1,4-diphenylbutadiene;

f is an integer from 1 to 3;

two or three of $T^b$, $R^b$ and $R^{b\prime}$ may be joined together to form a single or multiple ring structure;

h is an integer from 1 to 6, preferably from 1 to 4, more preferably from 1 to 3;

⁓⁓⁓ indicates any form of electronic interaction comprising a net coulombic attraction, especially coordinate or covalent bonds, including multiple bonds;

arrows signify coordinate bonds; and dotted lines indicate optional double bonds.

In one embodiment, it is preferred that $R^b$ have relatively low steric hindrance with respect to $X^b$. In this embodiment, most preferred $R^b$ groups are straight chain alkyl groups, straight chain alkenyl groups, branched chain alkyl groups wherein the closest branching point is at least 3 atoms removed from $X^b$, and halo, dihydrocarbylamino, alkoxy or trihydrocarbylsilyl substituted derivatives thereof. Highly preferred Rb groups in this embodiment are $C_{1-8}$ straight chain alkyl groups.

At the same time, in this embodiment $R^{b\prime}$ preferably has relatively high steric hindrance with respect to $Y^b$, Non-limiting examples of suitable $R^{b\prime}$ groups for this embodiment include alkyl or alkenyl groups containing one or more secondary or tertiary carbon centers, cycloalkyl, aryl, alkaryl, aliphatic or aromatic heterocyclic groups, organic or inorganic oligomeric, polymeric or cyclic groups, and halo, dihydrocarbylamino, alkoxy or trihydrocarbylsilyl substituted derivatives thereof. Preferred $R^{b\prime}$ groups in this embodiment contain from 3 to 40, more preferably from 3 to 30, and most preferably from 4 to 20 atoms not counting hydrogen and are branched or cyclic.

Examples of preferred $T^b$ groups are structures corresponding to the following formulas:

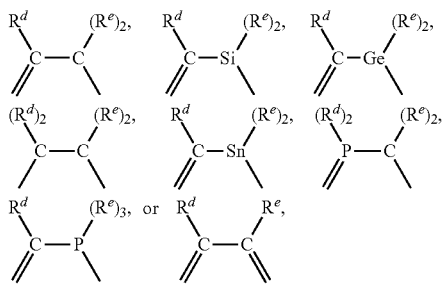

wherein

Each $R^d$ is $C_{1-10}$ hydrocarbyl group, preferably methyl, ethyl, n-propyl, i-propyl, t-butyl, phenyl, 2,6-dimethylphenyl, benzyl, or tolyl. Each $R^e$ is $C_{1-10}$ hydrocarbyl, preferably methyl, ethyl, n-propyl, i-propyl, t-butyl, phenyl, 2,6-dimethylphenyl, benzyl, or tolyl. In addition, two or more $R^d$ or $R^e$ groups, or mixtures of Rd and Re groups may together form a polyvalent derivative of a hydrocarbyl group, such as, 1,4-butylene, 1,5-pentylene, or a multicyclic, fused ring, polyvalent hydrocarbyl- or heterohydrocarbyl-group, such as naphthalene-1,8-diyl.

Preferred examples of the foregoing polyvalent Lewis base complexes include:

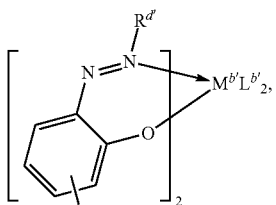

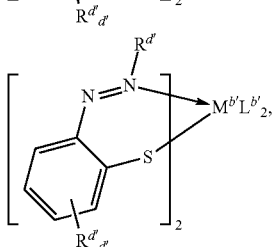

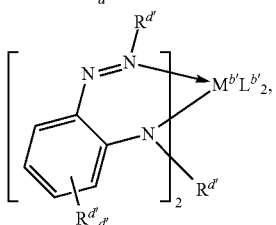

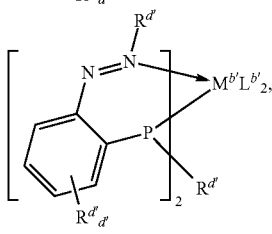

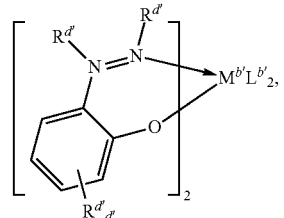

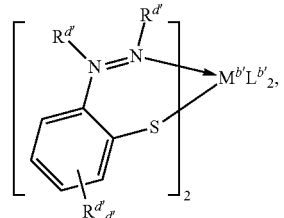

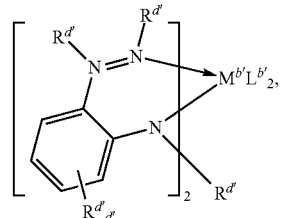

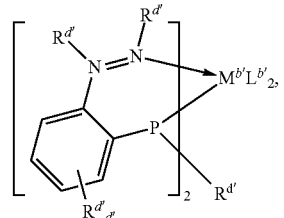

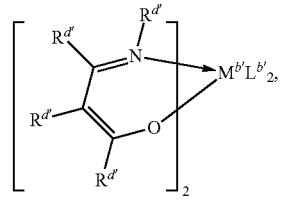

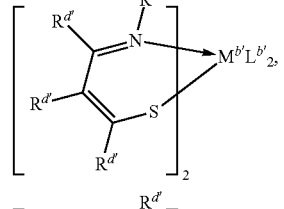

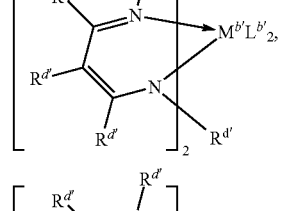

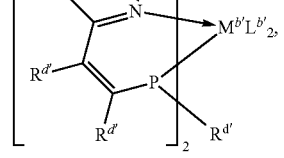

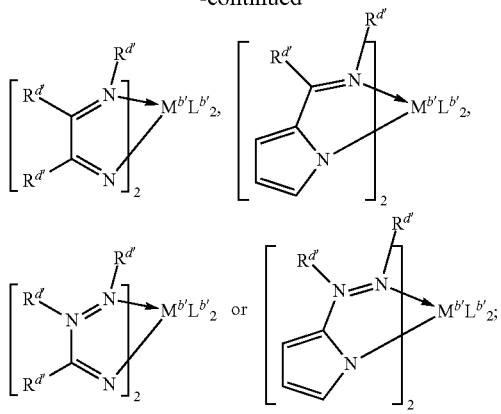

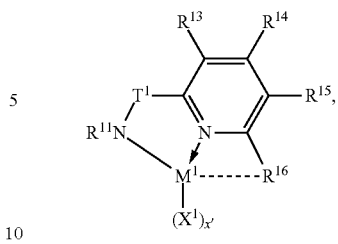

wherein $R^{d'}$ each occurrence is independently selected from the group consisting of hydrogen and $C_{1-50}$ hydrocarbyl groups optionally containing one or more heteroatoms, or inertly substituted derivative thereof, or further optionally, two adjacent $R^{d'}$ groups may together form a divalent bridging group;

d' is 4;

$M^{b'}$ is a group 4 metal, preferably titanium or hafnium or a Group 10 metal, preferably Ni or Pd;

$L^{b'}$ is a monovalent ligand of up to 50 atoms not counting hydrogen, preferably halide or hydrocarbyl, or two $L^{b'}$ groups together are a divalent or neutral ligand group, preferably a $C_{2-50}$ hydrocarbylene, hydrocarbadiyl or diene group.

The polyvalent Lewis base complexes for use in the present invention especially include Group 4 metal derivatives, especially hafnium derivatives of hydrocarbylamine substituted heteroaryl compounds corresponding to the formula:

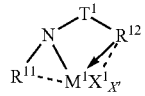

wherein:

$R^{11}$ is selected from alkyl, cycloalkyl, heteroalkyl, cycloheteroalkyl, aryl, and inertly substituted derivatives thereof containing from 1 to 30 atoms not counting hydrogen or a divalent derivative thereof;

$T^1$ is a divalent bridging group of from 1 to 41 atoms other than hydrogen, preferably 1 to 20 atoms other than hydrogen, and most preferably a mono- or di-$C_{1-20}$ hydrocarbyl substituted $R^{12}$ is a $C_{5-20}$ heteroaryl group containing Lewis base functionality, especially a pyridin-2-yl- or substituted pyridin-2-yl group or a divalent derivative thereof;

$M^1$ is a Group 4 metal, preferably hafnium;

$X^1$ is an anionic, neutral or dianionic ligand group;

x' is a number from 0 to 5 indicating the number of such $X^1$ groups; and bonds, optional bonds and electron donative interactions are represented by lines, dotted lines and arrows respectively.

Preferred complexes are those wherein ligand formation results from hydrogen elimination from the amine group and optionally from the loss of one or more additional groups, especially from $R^2$. In addition, electron donation from the Lewis base functionality, preferably an electron pair, provides additional stability to the metal center. Preferred metal complexes correspond to the formula:

wherein $M^1$, $X^1$, x', $R^{11}$ and $T^1$ are as previously defined, $R^{13}$, $R^{14}$, $R^{15}$ and $R^{16}$ are hydrogen, halo, or an alkyl, cycloalkyl, heteroalkyl, heterocycloalkyl, aryl, or silyl group of up to 20 atoms not counting hydrogen, or adjacent $R^3$, $R^{14}$, $R^{15}$ or $R^{16}$ groups may be joined together thereby forming fused ring derivatives, and bonds, optional bonds and electron pair donative interactions are represented by lines, dotted lines and arrows respectively.

More preferred examples of the foregoing metal complexes correspond to the formula:

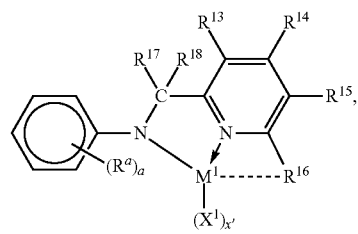

wherein $M^1$, $X^1$, and x' are as previously defined, $R^{13}$, $R^{14}$, $R^{15}$ and $R^{16}$ are as previously defined, preferably $R^{13}$, $R^{14}$, and $R^{15}$ are hydrogen, or $C_{1-4}$ alkyl, and $R^{16}$ is $C_{6-20}$ aryl, most preferably naphthalenyl;

$R^a$ independently each occurrence is $C_{1-4}$ alkyl, and a is 1-5, most preferably $R^a$ in two ortho-positions to the nitrogen is isopropyl or t-butyl;

$R^{17}$ and $R^{18}$ independently each occurrence are hydrogen, halogen, or a $C_{1-20}$ alkyl or aryl group, most preferably one of $R^{17}$ and $R^{18}$ is hydrogen and the other is a $C_{6-20}$ aryl group, especially 2-isopropyl, phenyl or a fused polycyclic aryl group, most preferably an anthracenyl group, and bonds, optional bonds and electron pair donative interactions are represented by lines, dotted lines and arrows respectively.

Highly preferred metal complexes for use herein correspond to the formula:

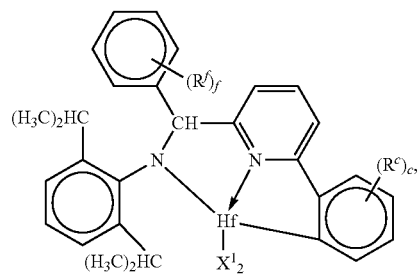

wherein $X^1$ each occurrence is halide, N,N-dimethylamido, or $C_{1-4}$ alkyl, and preferably each occurrence $X^1$ is methyl;

$R^f$ independently each occurrence is hydrogen, halogen, $C_{1-20}$ alkyl, or $C_{6-20}$ aryl, or two adjacent $R^f$ groups are joined together thereby forming a ring, and f is 1-5; and $R^e$ independently each occurrence is hydrogen, halogen, $C_{1-20}$ alkyl, or $C_{6-20}$ aryl, or two adjacent $R^e$ groups are joined together thereby forming a ring, and c is 1-5.

Most highly preferred examples of metal complexes for use according to the present invention are complexes of the following formulas:

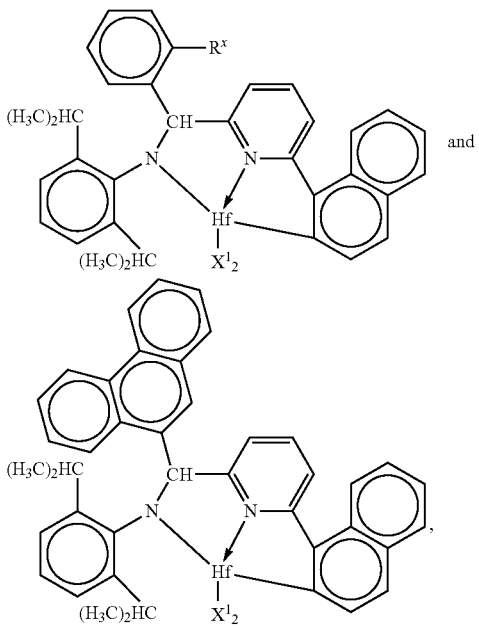

wherein Rx is $C_{1-4}$ alkyl or cycloalkyl, preferably methyl, isopropyl, t-butyl or cyclohexyl; and Examples of metal complexes usefully employed according to the present invention include:

[N-(2,6-di(1-methylethyl)phenyl)amido)(o-tolyl)(α-naphthalen-2-diyl(6-pyridin-2-diyl)methane)]hafnium dimethyl;

[N-(2,6-di(1-methylethyl)phenyl)amido)(o-tolyl)(α-naphthalen-2-diyl(6-pyridin-2-diyl)methane)]hafnium di(N,N-dimethylamido);

[N-(2,6-di(1-methylethyl)phenyl)amido)(o-tolyl)(α-naphthalen-2-diyl(6-pyridin-2-diyl)methane)]hafnium dichloride;

[N-(2,6-di(1-methylethyl)phenyl)amido)(2-isopropylphenyl)(α-naphthalen-2-diyl(6-pyridin-2-diyl)methane)]hafnium dimethyl;

[N-(2,6-di(1-methylethyl)phenyl)amido)(2-isopropylphenyl)(α-naphthalen-2-diyl(6-pyridin-2-diyl)methane)]hafnium di(N,N-dimethylamido);

[N-(2,6-di(1-methylethyl)phenyl)amido)(2-isopropylphenyl)(α-naphthalen-2-diyl(6-pyridin-2-diyl)methane)]hafnium dichloride;

[N-(2,6-di(1-methylethyl)phenyl)amido)(phenanthren-5-yl)(α-naphthalen-2-diyl(6-pyridin-2-diyl)methane)]hafnium dimethyl;

[N-(2,6-di(1-methylethyl)phenyl)amido)(phenanthren-5'-yl)(α-naphthalen-2-diyl(6-pyridin-2-diyl)methane)]hafnium di(N,N-dimethylamido); and

[N-(2,6-di(1-methylethyl)phenyl)amido)(phenanthren-5-yl)(α-naphthalen-2-diyl(6-pyridin-2-diyl)methane)]hafnium dichloride.

Under the reaction conditions used to prepare the metal complexes used in the present invention, the hydrogen of the 2-position of the α-naphthalene group substituted at the 6-position of the pyridin-2-yl group is subject to elimination, thereby uniquely forming metal complexes wherein the metal is covalently bonded to both the resulting amide group and to the 2-position of the α-naphthalenyl group, as well as stabilized by coordination to the pyridinyl nitrogen atom through the electron pair of the nitrogen atom.

Additional suitable metal complexes of polyvalent Lewis bases for use herein include compounds corresponding to the formula:

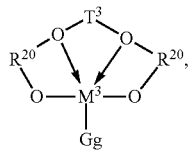

where:

$R^{20}$ is an aromatic or inertly substituted aromatic group containing from 5 to 20 atoms not $T^3$ is a hydrocarbylene or silane group having from 1 to 20 atoms not counting hydrogen, or an inertly substituted derivative thereof;

$M^3$ is a Group 4 metal, preferably zirconium or hafnium;

G is an anionic, neutral or dianionic ligand group; preferably a halide, hydrocarbyl or dihydrocarbylamide group having up to 20 atoms not counting hydrogen;

g is a number from 1 to 5 indicating the number of such G groups; and bonds and electron donative interactions are represented by lines and arrows respectively.

Preferably, such complexes correspond to the formula:

wherein:

$T^3$ is a divalent bridging group of from 2 to 20 atoms not counting hydrogen, preferably a substituted or unsubstituted, $C_{3-6}$ alkylene group; and $Ar^2$ independently each occurrence is an arylene or an alkyl- or aryl-substituted arylene group of from 6 to 20 atoms not counting hydrogen;

$M^3$ is a Group 4 metal, preferably hafnium or zirconium;

G independently each occurrence is an anionic, neutral or dianionic ligand group;

g is a number from 1 to 5 indicating the number of such X groups; and electron donative interactions are represented by arrows.

Preferred examples of metal complexes of foregoing formula include the following compounds:

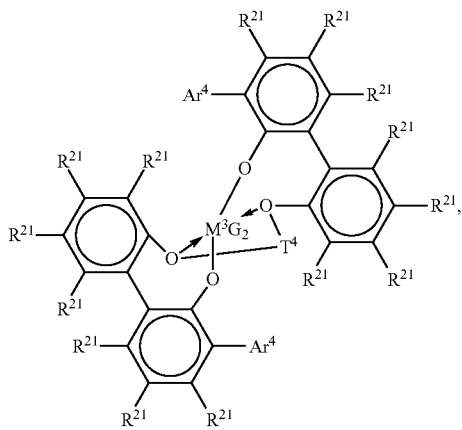

where $M^3$ is Hf or Zr;

$Ar^4$ is $C_{6-20}$ aryl or inertly substituted derivatives thereof, especially 3,5-di(isopropyl)phenyl, 3,5-di(isobutyl)phenyl, dibenzo-1H-pyrrole-1-yl, or anthracen-5-yl, and $T^4$ independently each occurrence comprises a $C_{3-6}$ alkylene group, a $C_{3-6}$ cycloalkylene group, or an inertly substituted derivative thereof;

$R^{21}$ independently each occurrence is hydrogen, halo, hydrocarbyl, trihydrocarbylsilyl, or trihydrocarbylsilylhydrocarbyl of up to 50 atoms not counting hydrogen; and G, independently each occurrence is halo or a hydrocarbyl or trihydrocarbylsilyl group of up to 20 atoms not counting hydrogen, or 2 G groups together are a divalent derivative of the foregoing hydrocarbyl or trihydrocarbylsilyl groups.

Especially preferred are compounds of the formula:

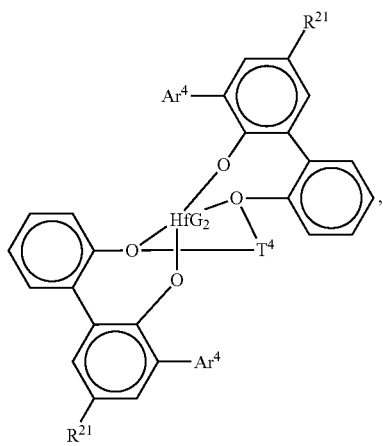

wherein $Ar^4$ is 3,5-di(isopropyl)phenyl, 3,5-di(isobutyl)phenyl, dibenzo-1H-pyrrole-1-yl, or anthracen-5-yl, $R^{21}$ is hydrogen, halo, or $C_{1-4}$ alkyl, especially methyl $T^4$ is propan-1,3-diyl or butan-1,4-diyl, and G is chloro, methyl or benzyl.

A most highly preferred metal complex of the foregoing formula is:

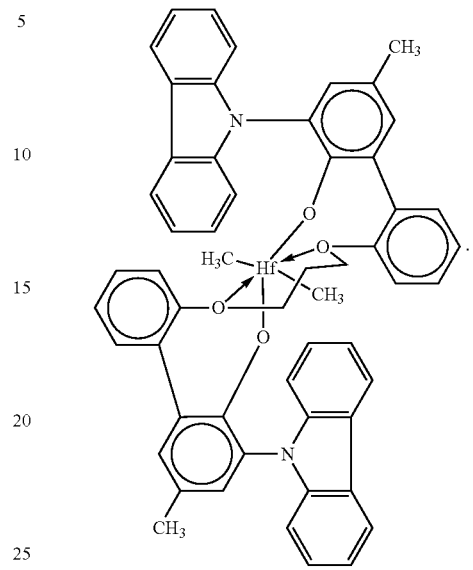

The foregoing polyvalent Lewis base complexes are conveniently prepared by standard metallation and ligand exchange procedures involving a source of the Group 4 metal and the neutral polyfunctional ligand source. In addition, the complexes may also be prepared by means of an amide elimination and hydrocarbylation process starting from the corresponding Group 4 metal tetraamide and a hydrocarbylating agent, such as trimethylaluminum. Other techniques may be used as well. These complexes are known from the disclosures of, among others, U.S. Pat. Nos. 6,320,005, 6,103,657, WO 02/38628, WO 03/40195, and US04/0220050.

Additional suitable metal compounds for use herein include Group 4-10 metal derivatives corresponding to the formula:

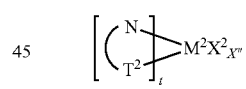

wherein $M^2$ is a metal of Groups 4-10 of the Periodic Table of the elements, preferably Group 4 metals, Ni(II) or Pd(II), most preferably zirconium;

$T^2$ is a nitrogen, oxygen or phosphorus containing group;

$X^2$ is halo, hydrocarbyl, or hydrocarbyloxy;

t is one or two;

x" is a number selected to provide charge balance;

and $T^2$ and N are linked by a bridging ligand.

Such catalysts have been previously disclosed in *J. Am. Chem. Soc.*, 118, 267-268 (1996), *J. Am. Chem. Soc.*, 117, 6414-6415 (1995), and *Organometallics*, 16, 1514-1516, (1997), among Preferred examples of the foregoing metal complexes are aromatic diimine or aromatic dioxyimine complexes of Group 4 metals, especially zirconium, corresponding to the formula:

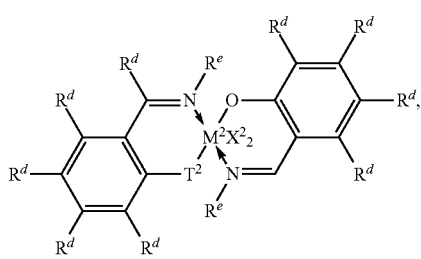

wherein;

$M^2$, $X^2$ and $T^2$ are as previously defined;

$R^d$ independently each occurrence is hydrogen, halogen, or $R^e$; and $R^e$ independently each occurrence is $C_{1-20}$ hydrocarbyl or a heteroatom-, especially a F, N, S or P-substituted derivative thereof, more preferably $C_{1-10}$ hydrocarbyl or a F or N substituted derivative thereof, most preferably alkyl, dialkylaminoalkyl, pyrrolyl, piperidenyl, perfluorophenyl, cycloalkyl, (poly)alkylaryl, or aralkyl.

Most preferred examples of the foregoing metal complexes are aromatic dioxyimine complexes of zirconium, corresponding to the formula:

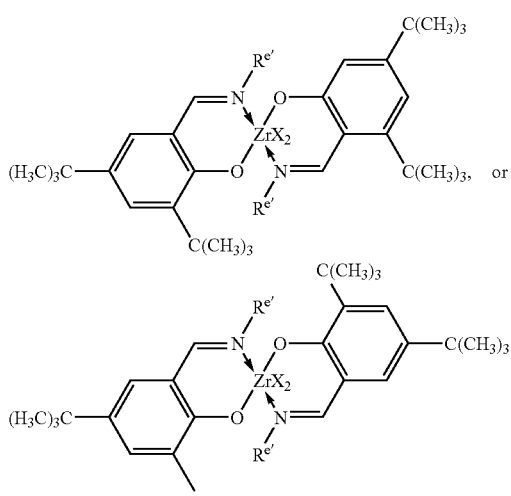

wherein;

$X^2$ is as previously defined, preferably $C_{1-10}$ hydrocarbyl, most preferably methyl or benzyl; and $R^{e'}$ is methyl, isopropyl, t-butyl, cyclopentyl, cyclohexyl, 2-methylcyclohexyl, 2,4-dimethylcyclohexyl, 2-pyrrolyl, N-methyl-2-pyrrolyl, 2-piperidenyl, N-methyl-2-piperidenyl, benzyl, o-tolyl, 2,6-dimethylphenyl, perfluorophenyl, 2,6-di(isopropyl)phenyl, or 2,4,6-trimethylphenyl.

The foregoing complexes also include certain phosphinimine complexes are disclosed in EP-A-890581. These complexes correspond to the formula: $[(R^f)_3—P=N]_fM(K^2)(R^f)_{3-f}$ wherein:

$R^f$ is a monovalent ligand or two $R^f$ groups together are a divalent ligand, preferably $R^f$ is hydrogen or $C_{1-4}$ alkyl;

M is a Group 4 metal, $K^2$ is a group containing delocalized π-electrons through which $K^2$ is bound to M, said $K^2$ group containing up to 50 atoms not counting hydrogen atoms, and f is 1 or 2.

Catalysts having high comonomer incorporation properties are also known to reincorporate in situ prepared long chain olefins resulting incidentally during the polymerization through β-hydride elimination and chain termination of growing polymer, or other process. The concentration of such long chain olefins is particularly enhanced by use of continuous solution polymerization conditions at high conversions, especially ethylene conversions of 95 percent or greater, more preferably at ethylene conversions of 97 percent or greater. Under such conditions a small but detectable quantity of vinyl group terminated polymer may be reincorporated into a growing polymer chain, resulting in the formation of long chain branches, that is, branches of a carbon length greater than would result from other deliberately added comonomer. Moreover, such chains reflect the presence of other comonomers present in the reaction mixture. That is, the chains may include short chain or long chain branching as well, depending on the comonomer composition of the reaction mixture. However, the presence of a CSA during polymerization can seriously limit the incidence of long chain branching since the vast majority of the polymer chains become attached to a CSA species and are prevented from undergoing α-hydride elimination.

In the present invention, the incidence of the foregoing long chain branched polymer containing segments or blocks may by enhanced by delaying the addition of the CSA to a point in the initial reactor or polymerization zone that is just prior to or even after the exit thereof. In this manner, full polymerization under conventional conditions is attained and CSA is contacted with preformed polymer segments formed under steady state polymerization conditions.

Cocatalysts

Each of the metal complexes (also interchangeably referred to herein as procatalysts) may be activated to form the active catalyst composition by combination with a cocatalyst, preferably a cation forming cocatalyst, a strong Lewis acid, or a combination thereof. In a preferred embodiment, the shuttling agent is employed both for purposes of chain transfer and as the optional cocatalyst component of the catalyst composition.

The metal complexes desirably are rendered catalytically active by combination with a cation forming cocatalyst, such as those previously known in the art for use with Group 4 metal olefin polymerization complexes. Suitable cation forming cocatalysts for use herein include neutral Lewis acids, such as $C_{1-30}$ hydrocarbyl substituted Group 13 compounds, especially tri(hydrocarbyl)aluminum- or tri(hydrocarbyl)boron compounds and halogenated (including perhalogenated) derivatives thereof, having from 1 to 10 carbons in each hydrocarbyl or halogenated hydrocarbyl group, more especially perfluorinated tri(aryl)boron compounds, and most especially tris(pentafluoro-phenyl)borane; nonpolymeric, compatible, noncoordinating, ion forming compounds (including the use of such compounds under oxidizing conditions), especially the use of ammonium-, phosphonium-, oxonium-, carbonium-, silylium- or sulfonium-salts of compatible, noncoordinating anions, or ferrocenium-, lead- or silver salts of compatible, noncoordinating anions; and combinations of the foregoing cation forming cocatalysts and techniques. The foregoing activating cocatalysts and activating techniques have been previously taught with respect to different metal complexes for olefin polymerizations in the following references: EP-A-277,003, U.S. Pat. Nos. 5,153, 157, 5,064,802, 5,321,106, 5,721,185, 5,350,723, 5,425,872, 5,625,087, 5,883,204, 5,919,983, 5,783,512, WO 99/15534, and WO99/42467.

Combinations of neutral Lewis acids, especially the combination of a trialkyl aluminum compound having from 1 to 4 carbons in each alkyl group and a halogenated tri(hydrocarbyl)boron compound having from 1 to 20 carbons in each hydrocarbyl group, especially tris(pentafluorophenyl)borane, further combinations of such neutral Lewis acid mixtures with a polymeric or oligomeric alumoxane, and combinations of a single neutral Lewis acid, especially tris (pentafluorophenyl)borane with a polymeric or oligomeric alumoxane may be used as activating cocatalysts. Preferred molar ratios of metal complex:tris(pentafluorophenyl-borane:alumoxane are from 1:1:1 to 1:5:20, more preferably from 1:1:1.5 to 1:5:10.

Suitable ion forming compounds useful as cocatalysts in one embodiment of the present invention comprise a cation which is a Bronsted acid capable of donating a proton, and a compatible, noncoordinating anion, $A^-$. As used herein, the term "noncoordinating" means an anion and the catalytic derivative derived there from, or which is only weakly coordinated to such complexes thereby remaining sufficiently labile to be displaced by a neutral Lewis base. A noncoordinating anion specifically refers to an anion which when functioning as a charge balancing anion in a cationic metal complex does not transfer an anionic substituent or fragment thereof to said cation thereby forming neutral complexes. "Compatible anions" are anions which are not degraded to neutrality when the initially formed complex decomposes and are noninterfering with desired subsequent polymerization or other uses of the complex.

Preferred anions are those containing a single coordination complex comprising a charge-bearing metal or metalloid core which anion is capable of balancing the charge of the active catalyst species (the metal cation) which may be formed when the two components are combined. Also, said anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

Preferably such cocatalysts may be represented by the following general formula:

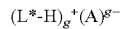

wherein:
L* is a neutral Lewis base;
(L*-H)+ is a conjugate Bronsted acid of L*;
$A^{g-}$ is a noncoordinating, compatible anion having a charge of g–, and
g is an integer from 1 to 3.

More preferably $A^{g-}$ corresponds to the formula: $[M'Q_4]^-$; wherein:
M' is boron or aluminum in the +3 formal oxidation state; and
Q independently each occurrence is selected from hydride, dialkylamido, halide, hydrocarbyl, hydrocarbyloxide, halo-substituted-hydrocarbyl, halosubstituted hydrocarbyloxy, and halo-substituted silylhydrocarbyl radicals (including perhalogenated hydrocarbyl-perhalogenated hydrocarbyloxy- and perhalogenated silylhydrocarbyl radicals), said Q having up to 20 carbons with the proviso that in not more than one occurrence is Q halide. Examples of suitable hydrocarbyloxide Q groups are disclosed in U.S. Pat. No. 5,296,433.

In a more preferred embodiment, d is one, that is, the counter ion has a single negative charge and is $A^-$. Activating cocatalysts comprising boron which are particularly useful in the preparation of catalysts of this invention may be represented by the following general formula:

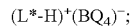

wherein:
L* is as previously defined;
B is boron in a formal oxidation state of 3; and
Q is a hydrocarbyl-, hydrocarbyloxy-, fluorinated hydrocarbyl-, fluorinated hydrocarbyloxy-, or fluorinated silylhydrocarbyl-group of up to 20 nonhydrogen atoms, with the proviso that in not more than one occasion is Q hydrocarbyl.

Preferred Lewis base salts are ammonium salts, more preferably trialkylammonium salts containing one or more $C_{12-40}$ alkyl groups. Most preferably, Q is each occurrence a fluorinated aryl group, especially, a pentafluorophenyl group.

Illustrative, but not limiting, examples of boron compounds which may be used as an activating cocatalyst in the preparation of the improved catalysts of this invention are tri-substituted ammonium salts such as:
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-dimethylanilinium n-butyltris(pentafluorophenyl)borate,
N,N-dimethylanilinium benzyltris(pentafluorophenyl)borate,
N,N-dimethylanilinium tetrakis(4-(t-butyldimethylsilyl)-2,3,5,6-tetrafluorophenyl)borate,
N,N-dimethylanilinium tetrakis(4-(triisopropylsilyl)-2,3,5,6-tetrafluorophenyl)borate,
N,N-dimethylanilinium pentafluorophenoxytris(pentafluorophenyl)borate,
N,N-diethylanilinium tetrakis(pentafluorophenyl)borate,
N,N-dimethyl-2,4,6-trimethylanilinium tetrakis(pentafluorophenyl)borate,
dimethyloctadecylammonium tetrakis(pentafluorophenyl)borate,
methyldioctadecylammonium tetrakis(pentafluorophenyl)borate,
dialkyl ammonium salts such as:
di-(i-propyl)ammonium tetrakis(pentafluorophenyl)borate,
methyloctadecylammonium tetrakis(pentafluorophenyl)borate,
methyloctadodecylammonium tetrakis(pentafluorophenyl)borate, and
dioctadecylammonium tetrakis(pentafluorophenyl)borate;
tri-substituted phosphonium salts such as:
triphenylphosphonium tetrakis(pentafluorophenyl)borate,
methyldioctadecylphosphonium tetrakis(pentafluorophenyl)borate, and
tri(2,6-dimethylphenyl)phosphonium tetrakis(pentafluorophenyl)borate;
di-substituted oxonium salts such as:
diphenyloxonium tetrakis(pentafluorophenyl)borate,
di(o-tolyl)oxonium tetrakis(pentafluorophenyl)borate, and
di(octadecyl)oxonium tetrakis(pentafluorophenyl)borate;
di-substituted sulfonium salts such as:
di(o-tolyl)sulfonium tetrakis(pentafluorophenyl)borate, and
methylcotadecylsulfonium tetrakis(pentafluorophenyl)borate.

Preferred (L*-H)+ cations are methyldioctadecylammonium cations, dimethyloctadecylammonium cations, and ammonium cations derived from mixtures of trialkyl amines containing one or 2 $C_{14-18}$ alkyl groups.

Another suitable ion forming, activating cocatalyst comprises a salt of a cationic oxidizing agent and a noncoordinating, compatible anion represented by the formula:

$$(Ox^{h+})_g(A^{g-})_h,$$

wherein:
$Ox^{h+}$ is a cationic oxidizing agent having a charge of $h^+$;
h is an integer from 1 to 3; and
$A^{g-}$ and g are as previously defined.

Examples of cationic oxidizing agents include: ferrocenium, hydrocarbyl-substituted ferrocenium, $Ag^+$ or $Pb^{+2}$. Preferred embodiments of $A^{g-}$ are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion and a noncoordinating, compatible anion represented by the formula:

$$[C]^+A^-$$

wherein:
$[C]^+$ is a $C_{1-20}$ carbenium ion; and
$A^-$ is a noncoordinating, compatible anion having a charge of −1. A preferred carbenium ion is the trityl cation, that is triphenylmethylium.

A further suitable ion forming, activating cocatalyst comprises a compound which is a salt of a silylium ion and a noncoordinating, compatible anion represented by the formula:

$$(Q^1{}_3Si)^+A^-$$

wherein:
$Q^1$ is $C_{1-10}$ hydrocarbyl, and $A^-$ is as previously defined.

Preferred silylium salt activating cocatalysts are trimethylsilylium tetrakispentafluorophenylborate, triethylsilylium tetrakispentafluorophenylborate and ether substituted adducts thereof. Silylium salts have been previously generically disclosed in *J. Chem. Soc. Chem. Comm.*, 1993, 383-384, as well as Lambert, J. B., et al., *Organometallics*, 1994, 13, 2430-2443. The use of the above silylium salts as activating cocatalysts for addition polymerization catalysts is disclosed in U.S. Pat. No. 5,625,087.

Certain complexes of alcohols, mercaptans, silanols, and oximes with tris(pentafluorophenyl)borane are also effective catalyst activators and may be used according to the present invention. Such cocatalysts are disclosed in U.S. Pat. No. 5,296,433.

Suitable activating cocatalysts for use herein also include polymeric or oligomeric alumoxanes, especially methylalumoxane (MAO), triisobutyl aluminum modified methylalumoxane (MMAO), or isobutylalumoxane; Lewis acid modified alumoxanes, especially perhalogenated tri(hydrocarbyl) aluminum- or perhalogenated tri(hydrocarbyl)boron modified alumoxanes, having from 1 to 10 carbons in each hydrocarbyl or halogenated hydrocarbyl group, and most especially tris(pentafluorophenyl)borane modified alumoxanes. Such cocatalysts are previously disclosed in U.S. Pat. Nos. 6,214,760, 6,160,146, 6,140,521, and 6,696,379.

A class of cocatalysts comprising non-coordinating anions generically referred to as expanded anions, further disclosed in U.S. Pat. No. 6,395,671, may be suitably employed to activate the metal complexes of the present invention for olefin polymerization. Generally, these cocatalysts (illustrated by those having imidazolide, substituted imidazolide, imidazolinide, substituted imidazolinide, benzimidazolide, or substituted benzimidazolide anions) may be depicted as follows:

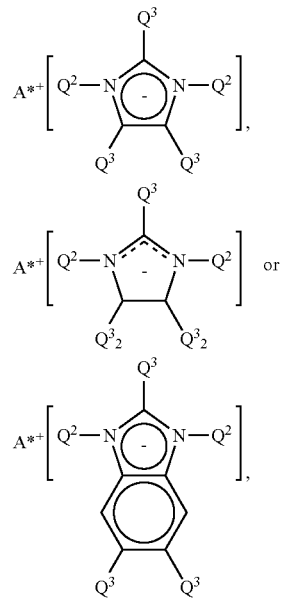

wherein:
$A^{*+}$ is a cation, especially a proton containing cation, and preferably is a trihydrocarbyl ammonium cation containing one or two $C_{10-40}$ alkyl groups, especially a methyldi ($C_{14-20}$ alkyl)ammonium cation, $Q^3$, independently each occurrence, is hydrogen or a halo, hydrocarbyl, halocarbyl, halohydrocarbyl, silylhydrocarbyl, or silyl, (including mono-, di- and tri(hydrocarbyl)silyl) group of up to 30 atoms not counting hydrogen, preferably $C_{1-20}$ alkyl, and $Q^2$ is tris(pentafluorophenyl)borane or tris(pentafluorophenyl)alumane).

Examples of these catalyst activators include trihydrocarbylammonium-salts, especially, methyldi($C_{14-20}$ alkyl)ammonium-salts of:
bis(tris(pentafluorophenyl)borane)imidazolide,
bis(tris(pentafluorophenyl)borane)-2-undecylimidazolide,
bis(tris(pentafluorophenyl)borane)-2-heptadecylimidazolide,
bis(tris(pentafluorophenyl)borane)-4,5-bis(undecyl)imidazolide,
bis(tris(pentafluorophenyl)borane)-4,5-bis(heptadecyl)imidazolide,
bis(tris(pentafluorophenyl)borane)imidazolinide,
bis(tris(pentafluorophenyl)borane)-2-undecylimidazolinide,
bis(tris(pentafluorophenyl)borane)-2-heptadecylimidazolinide,
bis(tris(pentafluorophenyl)borane)-4,5-bis(undecyl)imidazolinide,
bis(tris(pentafluorophenyl)borane)-4,5-bis(heptadecyl)imidazolinide,
bis(tris(pentafluorophenyl)borane)-5,6-dimethylbenzimidazolide,
bis(tris(pentafluorophenyl)borane)-5,6-bis(undecyl)benzimidazolide,
bis(tris(pentafluorophenyl)alumane)imidazolide,
bis(tris(pentafluorophenyl)alumane)-2-undecylimidazolide, bis(tris(pentafluorophenyl)alumane)-2-heptadecylimidazolide,
bis(tris(pentafluorophenyl)alumane)-4,5-bis(undecyl)imidazolide,
bis(tris(pentafluorophenyl)alumane)-4,5-bis(heptadecyl) imidazolide,
bis(tris(pentafluorophenyl)alumane)imidazolinide,
bis(tris(pentafluorophenyl)alumane)-2-undecylimidazolinide,
bis(tris(pentafluorophenyl)alumane)-2-heptadecylimidazolinide,
bis(tris(pentafluorophenyl)alumane)-4,5-bis(undecyl)imidazolinide,
bis(tris(pentafluorophenyl)alumane)-4,5-bis(heptadecyl) imidazolinide,
bis(tris(pentafluorophenyl)alumane)-5,6-dimethylbenzimidazolide, and
bis(tris(pentafluorophenyl)alumane)-5,6-bis(undecyl)benzimidazolide.

Other activators include those described in PCT publication WO 98/07515 such as tris (2, the invention, for example, alumoxanes and ionizing activators in combinations, see for example, EP-A-0 573120, PCT publications WO 94/07928 and WO 95/14044 and U.S. Pat. Nos. 5,153,157 and 5,453,410. WO 98/09996 describes activating catalyst compounds with perchlorates, periodates and iodates, including their hydrates. WO 99/18135 describes the use of organoboroaluminum activators. WO 03/10171 discloses catalyst activators that are adducts of Bronsted acids with Lewis acids. Other activators or methods for activating a catalyst compound are described in for example, U.S. Pat. Nos. 5,849,852, 5,859,653, 5,869,723, EP-A-615981, and PCT publication WO 98/32775. All of the foregoing catalyst activators as well as any other know activator for transition metal complex catalysts may be employed alone or in combination according to the present invention, however, for best results alumoxane containing cocatalysts are avoided.

The molar ratio of catalyst/cocatalyst employed preferably ranges from 1:10,000 to 100:1, more preferably from 1:5000 to 10:1, most preferably from 1:1000 to 1:1. Alumoxane, when used by itself as an activating cocatalyst, is employed in large quantity, generally at least 100 times the quantity of metal complex on a molar basis. Tris(pentafluorophenyl)borane, where used as an activating cocatalyst is employed in a molar ratio to the metal complex of from 0.5:1 to 10:1, more preferably from 1:1 to 6:1 most preferably from 1:1 to 5:1. The remaining activating cocatalysts are generally employed in approximately equimolar quantity with the metal complex.

During the polymerization, the reaction mixture is contacted with the activated catalyst composition according to any suitable polymerization conditions. The process is desirably characterized by use of elevated temperatures and pressures. Hydrogen may be employed as a chain transfer agent for molecular weight control according to known techniques, if desired. As in other similar polymerizations, it is highly desirable that the monomers and solvents employed be of sufficiently high purity that catalyst deactivation or premature chain termination does not occur, unless a block copolymer modified polymer product is desired. Any suitable technique for monomer purification such as devolatilization at reduced pressure, contacting with molecular sieves or high surface area alumina, or a combination of the foregoing processes may be employed.

Supports may be employed in the present invention, especially in slurry or gas-phase polymerizations. Suitable supports include solid, particulated, high surface area, metal oxides, metalloid oxides, or mixtures thereof (interchangeably referred to herein as an inorganic oxide). Examples include: talc, silica, alumina, magnesia, titania, zirconia, $Sn_2O_3$, aluminosilicates, borosilicates, clays, and mixtures thereof. Suitable supports preferably have a surface area as determined by nitrogen porosimetry using the B.E.T. method from 10 to 1000 $m^2/g$, and preferably from 100 to 600 $m^2/g$. The average particle size typically is from 0.1 to 500 µm, preferably from 1 to 200 µm, more preferably 10 to 100 µm.

In one embodiment of the invention the present catalyst composition and optional support may be spray dried or otherwise recovered in solid, particulated form to provide a composition that is readily transported and handled. Suitable methods for spray drying a liquid containing slurry are well known in the art and usefully employed herein. Preferred techniques for spray drying catalyst compositions for use herein are described in U.S. Pat. Nos. 5,648,310 and 5,672,669.

The polymerization is desirably carried out as a continuous polymerization, preferably a continuous, solution polymerization, in which catalyst components, monomers, and optionally solvent, adjuvants, scavengers, and polymerization aids are continuously supplied to one or more reactors or zones and polymer product continuously removed therefrom. Within the scope of the terms "continuous" and "continuously" as used in this context are those processes in which there are intermittent additions of reactants and removal of products at small regular or irregular intervals, so that, over time, the overall process is substantially continuous. Moreover, as previously explained, the chain shuttling agent(s) may be added at any point during the polymerization including in the first reactor or zone, at the exit or slightly before the exit of the first reactor, between the first reactor or zone and the second or any subsequent reactor or zone, or even solely to the second or any subsequent reactor or zone. Due to the difference in monomers, temperatures, pressures or other difference in polymerization conditions between at least two of the reactors or zones connected in series, polymer segments of differing composition such as comonomer content, crystallinity, density, tacticity, regio-regularity, or other chemical or physical difference, within the same molecule are formed in the different reactors or zones. The size of each segment or block is determined by continuous polymer reaction conditions, and preferably is a most probable distribution of polymer sizes.

Each reactor in the series can be operated under high pressure, solution, slurry, or gas phase polymerization conditions. In a multiple zone polymerization, all zones operate under the same type of polymerization, such as solution, slurry, or gas phase, but at different process conditions. For a solution polymerization process, it is desirable to employ homogeneous dispersions of the catalyst components in a liquid diluent in which the polymer is soluble under the polymerization conditions employed. One such process utilizing an extremely fine silica or similar dispersing agent to produce such a homogeneous catalyst dispersion wherein normally either the metal complex or the cocatalyst is only poorly soluble is disclosed in U.S. Pat. No. 5,783,512. A high pressure process is usually carried out at temperatures from 100° C. to 400° C. and at pressures above 500 bar (50 MPa). A slurry process typically uses an inert hydrocarbon diluent and temperatures of from 0° C. up to a temperature just below the temperature at which the resulting polymer becomes substantially soluble in the inert polymerization medium. Preferred temperatures in a slurry polymerization are from 30° C., preferably from 60° C. up to 115° C., preferably up to 100° C. Pressures typically range from atmospheric (100 kPa) to 500 psi (3.4 MPa).

In all of the foregoing processes, continuous or substantially continuous polymerization conditions are preferably employed. The use of such polymerization conditions, especially continuous, solution polymerization processes, allows the use of elevated reactor temperatures which results in the economical production of the present block copolymers in high yields and efficiencies.

The catalyst may be prepared as a homogeneous composition by addition of the requisite metal complex or multiple complexes to a solvent in which the polymerization will be conducted or in a diluent compatible with the ultimate reaction mixture. The desired cocatalyst or activator and, optionally, the shuttling agent may be combined with the catalyst composition either prior to, simultaneously with, or after combination of the catalyst with the monomers to be polymerized and any additional reaction diluent.

At all times, the individual ingredients as well as any active catalyst composition must be protected from oxygen, moisture and other catalyst poisons. Therefore, the catalyst components, shuttling agent and activated catalysts must be prepared and stored in an oxygen and moisture free atmosphere, preferably under a dry, inert gas such as nitrogen.

Without limiting in any way the scope of the invention, one means for carrying out such a polymerization process is as follows. In one or more well stirred tank or loop reactors operating under solution polymerization conditions, the monomers to be polymerized are introduced continuously together with any solvent or diluent at one part of the reactor. The reactor contains a relatively homogeneous liquid phase composed substantially of monomers together with any solvent or diluent and dissolved polymer. Preferred solvents include $C_{4-10}$ hydrocarbons or mixtures thereof, especially alkanes such as hexane or mixtures of alkanes, as well as one or more of the monomers employed in the polymerization. Examples of suitable loop reactors and a variety of suitable operating conditions for use therewith, including the use of multiple loop reactors, operating in series, are found in U.S. Pat. Nos. 5,977,251, 6,319,989 and 6,683,149.

Catalyst along with cocatalyst and optionally chain shuttling agent are continuously or intermittently introduced in the reactor liquid phase or any recycled portion thereof at a minimum of one location. The reactor temperature and pressure may be controlled by adjusting the solvent/monomer ratio, the catalyst addition rate, as well as by use of cooling or heating coils, jackets or both. The polymerization rate is controlled by the rate of catalyst addition. The content of a given monomer in the polymer product is influenced by the ratio of monomers in the reactor, which is controlled by manipulating the respective feed rates of these components to the reactor. variables such as the temperature, monomer concentration, or by the previously mentioned chain shuttling agent, or a chain terminating agent such as hydrogen, as is well known in the art. Connected to the discharge of the reactor, optionally by means of a conduit or other transfer means, is a second reactor, such that the reaction mixture prepared in the first reactor is discharged to the second reactor without substantially termination of polymer growth. Between the first and second reactors, a differential in at least one process condition is established. Preferably for use in formation of a copolymer of two or more monomers, the difference is the presence or absence of one or more comonomers or a difference in comonomer concentration. Additional reactors, each arranged in a manner similar to the second reactor in the series may be provided as well. Upon exiting the last reactor of the series, the effluent is contacted with a catalyst kill agent such as water, steam or an alcohol or with a coupling agent.

The resulting polymer product is recovered by flashing off volatile components of the reaction mixture such as residual monomers or diluent at reduced pressure, and, if necessary, conducting further devolatilization in equipment such as a devolatilizing extruder. In a continuous process the mean residence time of the catalyst and polymer in the reactor generally is from 5 minutes to 8 hours, and preferably from 10 minutes to 6 hours.

Alternatively, the foregoing polymerization may be carried out in a plug flow reactor with a monomer, catalyst, shuttling agent, temperature or other gradient established between differing zones or regions thereof, optionally accompanied by separated addition of catalysts and/or chain shuttling agent, and operating under adiabatic or non-adiabatic polymerization conditions.

The catalyst composition may also be prepared and employed as a heterogeneous catalyst by adsorbing the requisite components on an inert inorganic or organic particulated solid, as previously disclosed. In a preferred embodiment, a heterogeneous catalyst is prepared by co-precipitating the metal complex and the reaction product of an inert inorganic compound and an active hydrogen containing activator, especially the reaction product of a tri ($C_{1-4}$ alkyl) aluminum compound and an ammonium salt of a hydroxyaryltris(pentafluorophenyl)borate, such as an ammonium salt of (4-hydroxy-3,5-ditertiarybutylphenyl)tris(pentafluorophenyl)borate. When prepared in heterogeneous or supported form, the catalyst composition may be employed in a slurry or a gas phase polymerization. As a practical limitation, slurry polymerization takes place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. As with a solution polymerization, the α-olefin comonomer or a mixture of different α-olefin monomers may be used in whole or part as the diluent. Most preferably at least a major part of the Preferably for use in gas phase polymerization processes, the support material and resulting catalyst has a median particle diameter from 20 to 200 µm, more preferably from 30 µm to 150 µm, and most preferably from 50 µm to 100 µm. Preferably for use in slurry polymerization processes, the support has a median particle diameter from 1 µm to 200 µm, more preferably from 5 µm to 100 µm, and most preferably from 10 µm to 80 µm.

Suitable gas phase polymerization process for use herein are substantially similar to known processes used commercially on a large scale for the manufacture of polypropylene, ethylene/α-olefin copolymers, and other olefin polymers. The gas phase process employed can be, for example, of the type which employs a mechanically stirred bed or a gas fluidized bed as the polymerization reaction zone. Preferred is the process wherein the polymerization reaction is carried out in a vertical cylindrical polymerization reactor containing a fluidized bed of polymer particles supported or suspended above a perforated plate or fluidization grid, by a flow of fluidization gas.

The gas employed to fluidize the bed comprises the monomer or monomers to be polymerized, and also serves as a heat exchange medium to remove the heat of reaction from the bed. The hot gases emerge from the top of the reactor, normally via a tranquilization zone, also known as a velocity reduction zone, having a wider diameter than the fluidized bed and wherein fine particles entrained in the gas stream have an opportunity to gravitate back into the bed. It can also be advantageous to use a cyclone to remove ultra-fine particles from the hot gas stream. The gas is then normally recycled to the bed by means of a blower or compressor and one or more heat exchangers to strip the gas of the heat of polymerization.

A preferred method of cooling of the bed, in addition to the cooling provided by the cooled recycle gas, is to feed a volatile liquid to the bed to provide an evaporative cooling effect, often referred to as operation in the condensing mode. The volatile liquid employed in this case can be, for example, a volatile inert liquid, for example, a saturated hydrocarbon having 3 to 8, preferably 4 to 6, carbon atoms. In the case that the monomer or comonomer itself is a volatile liquid, or can be condensed to provide such a liquid, this can suitably be fed to the bed to provide an evaporative cooling effect. The volatile liquid evaporates in the hot fluidized bed to form gas which mixes with the fluidizing gas. If the volatile liquid is a monomer or comonomer, it will undergo some polymerization in the bed. The evaporated liquid then emerges from the reactor as part of the hot recycle gas, and enters the compression/heat exchange part of the recycle loop. The recycle gas is cooled in the heat exchanger and, if the temperature to which the gas is cooled is below the dew point, liquid will precipitate from the gas. This liquid is desirably recycled continuously to the fluidized bed. It is possible to recycle the precipitated liquid to the bed as liquid droplets carried in WO-94/25495 and U.S. Pat. No. 5,352,749. A particularly preferred method of recycling the liquid to the bed is to separate the liquid from the recycle gas stream and to reinject this liquid directly into the bed, preferably using a method which generates fine droplets of the liquid within the bed. This type of process is described in WO-94/28032.

The polymerization reaction occurring in the gas fluidized bed is catalyzed by the continuous or semi-continuous addition of catalyst composition according to the invention. The catalyst composition may be subjected to a prepolymerization step, for example, by polymerizing a small quantity of olefin monomer in a liquid inert diluent, to provide a catalyst composite comprising supported catalyst particles embedded in olefin polymer particles as well.

The polymer is produced directly in the fluidized bed by polymerization of the monomer or mixture of monomers on the fluidized particles of catalyst composition, supported catalyst composition or prepolymerized catalyst composition within the bed. Start-up of the polymerization reaction is achieved using a bed of preformed polymer particles, which are preferably similar to the desired polymer, and conditioning the bed by drying with inert gas or nitrogen prior to introducing the catalyst composition, the monomers and any other gases which it is desired to have in the recycle gas stream, such as a diluent gas, hydrogen chain transfer agent, or an inert condensable gas when operating in gas phase condensing mode. The produced polymer is discharged continuously or semi-continuously from the fluidized bed as desired.

The gas phase processes most suitable for the practice of this invention are continuous processes which provide for the continuous supply of reactants to the reaction zone of the reactor and the removal of products from the reaction zone of the reactor, thereby providing a steady-state environment on the macro scale in the reaction zone of the reactor. Products are readily recovered by exposure to reduced pressure and optionally elevated temperatures (devolatilization) according to known techniques. Typically, the fluidized bed of the gas phase process is operated at temperatures greater than 50° C., preferably from 60° C. to 110° C., more preferably from 70° C. to 110° C.

Suitable gas phase processes which are adaptable for use in the process of this invention are disclosed in U.S. Pat. Nos. 4,588,790; 4,543,399; 5,352,749; 5,436,304; 5,405,922; 5,462,999; 5,461,123; 5,453,471; 5,032,562; 5,028,670; 5,473,028; 5,106,804; 5,556,238; 5,541,270; 5,608,019; and 5,616,661.

As previously mentioned, functionalized derivatives of pseudo-block copolymers are also included within the present invention. Examples include metallated polymers wherein the metal is the remnant of the catalyst or chain shuttling agent employed, as well as further derivatives thereof. Because a substantial fraction of the polymeric product exiting the reactor is terminated with the can be utilized in well known chemical reactions such as those suitable for other alkyl-aluminum, alkyl-gallium, alkyl-zinc, or alkyl-Group 1 compounds to form amine-, hydroxy-, epoxy-, silane, vinylic, and other functionalized terminated polymer products. Examples of suitable reaction techniques that are adaptable for use here in are described in Negishi, "Organometallics in Organic Synthesis", Vol. 1 and 2, (1980), and other standard texts in organometallic and organic synthesis.

Polymer Products

Utilizing the present process, novel polymers, including pseudo-block copolymers of one or more olefin monomers, are readily prepared. Preferred polymers comprise in polymerized form at least one monomer selected from the group consisting of ethylene, propylene and 4-methyl-1-pentene. Highly desirably, the polymers are interpolymers comprising in polymerized form ethylene, propylene or 4-methyl-1-pentene and at least one different $C_{2-20}$ α-olefin comonomer, and optionally one or more additional copolymerizable comonomers. Suitable comonomers are selected from diolefins, cyclic olefins, and cyclic diolefins, halogenated vinyl compounds, and vinylidene aromatic compounds.

The polymers of the invention can have a melt index, I2, from 0.01 to 2000 g/10 minutes, preferably from 0.01 to 1000 g/10 minutes, more preferably from 0.01 to 500 g/10 minutes, and especially from 0.01 to 100 g/10 minutes. Desirably, the invented polymers can have molecular weights, $M_w$, from 1,000 g/mole to 5,000,000 g/mole, preferably from 1000 g/mole to 1,000,000, more preferably from 1000 g/mole to 500,000 g/mole, and especially from 1,000 g/mole to 300,000 g/mole. The density of the invented polymers can be from 0.80 to 0.99 g/cm$^3$ and preferably, for ethylene containing polymers, from 0.85 g/cm$^3$ to 0.97 g/cm$^3$.

The polymers of the invention may be differentiated from conventional, random copolymers, physical blends of polymers, and block copolymers prepared via sequential monomer addition, fluxional catalysts, or by anionic or cationic living polymerization techniques. The separate regions or blocks within each polymer are relatively uniform, depending on the uniformity of reactor conditions, and chemically distinct from each other. That is, the comonomer distribution, tacticity, or other property of segments within the polymer are relatively uniform within the same block or segment. However, the average block length is not a narrow distribution, but desirably is a most probable distribution. Because the polymer products have two or more blocks or segments having a broader size distribution than a conventional block copolymer prepared by anionic techniques, they are referred to as pseudo-block copolymers. The resulting polymers have properties approximating in many respects, those of pure block copolymers, and in some aspects exceeding the properties of pure block copolymers.

Compared to a random copolymer of the same monomers and monomer content at equivalent crystallinity or modulus, the polymers of the invention have one or more distinguishing features, including better (higher) heat resistance as measured by melting point, higher TMA penetration temperature, higher high-temperature tensile strength, and/or higher high-temperature torsion modulus as determined by dynamic mechanical analysis. Compared to a random copolymer comprising the same monomers and monomer content, the inventive polymers have one or more of the following: lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and/or filler acceptance.

Other highly desirable compositions according to the present invention are elastomeric interpolymers of ethylene, a $C_{3-20}$ α-olefin, especially propylene, and optionally one or more diene monomers. Preferred α-olefins for use in this embodiment of the present invention are designated by the formula $CH_2=CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers depending on whether a copolymerized diene is also present. Suitable dienes for use in preparing pseudo-block EPDM type polymers include conjugated or non-conjugated, straight or branched chain-, cyclic- or polycyclic-dienes containing from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers contain alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslinking efficiency of the polymer can be better controlled. Such crosslinkable elastomers and the cured products may have advantaged properties, including higher tensile strength and better elastic recovery.

Further preferably, the pseudo-block polymers of the invention have an ethylene content from 1 to 99 percent, a diene content from 0 to 10 percent, and a styrene and/or $C_{3-8}$ α-olefin content from 99 to 1 percent, based on the total weight of the polymer. Preferred polymers are invention have a weight average molecular weight (Mw) from 10,000 to about 2,500,000, a polydispersity less than 3.5, more preferably less than 3.0, and a Mooney viscosity (ML (1+4) 125° C.) from 1 to 250.

More preferably, such polymers have an ethylene content from 10 to 98 percent, a diene content from 0 to 6 percent, an α-olefin content from 2 to 90 percent, a Mw from 20,000 to 250,000, a polydispersity from 1.5 to 3.0, and a Mooney viscosity from 10 to 100. Especially preferred interpolymers are propylene/ethylene copolymers containing greater than 10 percent ethylene, preferably greater than 15 percent ethylene, and having a pellet blocking strength less than or equal to 3 kPa and or a compression set less than or equal to 50 percent at 23° C.

The polymer may be oil extended with from 5 to about 75 percent, preferably from 10 to 60 percent, more preferably from 20 to 50 percent, based on total composition weight, of a processing oil. Suitable oils include any oil that is conventionally used in manufacturing extended EPDM rubber formulations. Examples include both naphthenic- and paraffinic-oils, with paraffinic oils being preferred.

Highly desirably a curable EPDM rubber formulation is prepared by incorporation of one or more curing agents along with conventional accelerators or other adjuvants. Suitable curing agents are sulfur based. Examples of suitable sulfur based curing agents include, but are not limited to, sulfur, tetramethylthiuram disulfide (TMTD), dipentamethylenethiuram tetrasulfide (DPTT), 2-mercaptobenzothiazole (MBT), 2-mercaptobenzothiazolate disulfide (MBTS), zinc-2-mercaptobenozothiazolate (ZMBT), zinc diethyldithiocarbamatezinc (ZDEC), zinc dibutyldithiocarbamate (ZDBC), dipentamethylenethiuram tetrasulfide (DPTT), N-t-butylbenzothiazole-2-sulfanamide (TBBS), and mixtures thereof. A preferred cure system includes a combination of sulfur, MBT and TMTD. Desirably, the foregoing components are employed in amounts from 0.1 to 5 percent, based on total composition weight.

A preferred elastomer composition according to this embodiment of the invention may also include carbon black. Preferably, the carbon black is present in the amount of from 10 to 80 percent, more preferably from 20 to 60 percent, based on total composition weight.

Additional components of the present formulations usefully employed according to the present invention include various other ingredients in amounts that do not detract from the properties of the resultant composition. These ingredients include, but are not limited to, activators such as calcium or magnesium oxide; fatty acids such as stearic acid and salts thereof; fillers and reinforcers such as calcium or magnesium carbonate, silica, and aluminum silicates; plasticizers such as dialkyl esters of dicarboxylic acids; antidegradants; softeners; waxes; and pigments.

Applications and End Uses

The polymers of the invention can be employed in a variety of conventional thermoplastic fabrication processes to produce useful articles, including objects comprising at least one film layer, such as a monolayer film, or at least one layer in a multilayer film, prepared by cast, blown, calendered, or extrusion coating processes; molded articles, such as blow molded, injection molded, or rotomolded articles; extrusions; fibers; and woven or non-woven fabrics. Thermoplastic compositions comprising the present polymers, include blends with other natural or synthetic polymers, additives, reinforcing agents, ignition resistant additives, antioxidants, stabilizers, colorants, extenders, crosslinkers, blowing agents, and plasticizers. Of particular utility are multi-component fibers such as core/sheath fibers, having an outer surface layer, comprising at least in part, one or more polymers of the invention.

Fibers that may be prepared from the present polymers or blends include staple fibers, tow, multicomponent, sheath/core, twisted, and monofilament. Suitable fiber forming processes include spinbonded, melt blown techniques, as disclosed in U.S. Pat. Nos. 4,430,563, 4,663,220, 4,668,566, and 4,322,027, gel spun fibers as disclosed in U.S. Pat. No. 4,413,110, woven and nonwoven fabrics, as disclosed in U.S. Pat. No. 3,485,706, or structures made from such fibers, including blends with other fibers, such as polyester, nylon or cotton, thermoformed articles, extruded shapes, including profile extrusions and co-extrusions, calendared articles, and drawn, twisted, or crimped yarns or fibers. The new polymers described herein are also useful for wire and cable coating operations, as well as in sheet extrusion for vacuum forming operations, and forming molded articles, including the use of injection molding, blow molding process, or rotomolding processes. Compositions comprising the olefin polymers can also be formed into fabricated articles such as those previously mentioned using conventional polyolefin processing techniques which are well known to those skilled in the art of polyolefin processing.

Dispersions (both aqueous and non-aqueous) can also be formed using the present polymers or formulations comprising the same. Frothed foams comprising the invented polymers can also be formed, using for example the process disclosed in WO04/021622. The polymers may also be crosslinked by any known means, such as the use of peroxide, electron beam, silane, azide, or other cross-linking technique. The polymers can also be chemically modified, such as by grafting (for example by use of maleic anhydride (MAH), silanes, or other grafting agent), halogenation, amination, sulfonation, or other chemical modification.

Suitable polymers for blending with the polymers of the invention include thermoplastic and non-thermoplastic polymers including natural and synthetic polymers. Exemplary polymers for blending include polypropylene, (both impact modifying polypropylene, isotactic polypropylene, including high pressure, free-radical LDPE, Ziegler Natta LLDPE, metallocene PE, including multiple reactor PE ("in reactor" blends of Ziegler-Natta PE and metallocene PE, such as products disclosed in U.S. Pat. Nos. 6,545,088, 6,538,070, 6,566, 446, 5,844,045, 5,869,575, and 6,448,341, ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Homogeneous polymers such as olefin plastomers and elastomers, ethylene and propylene-based copolymers (for example polymers available under the trade designation VERSIFY™ available from The Dow Chemical Company and VISTAMAXX™ available from ExxonMobil can also be useful as components in blends comprising the present polymers.

Suitable end uses for the foregoing products include films and fibers; molded articles, such as tooth brush handles and appliance handles; gaskets and profiles; adhesives (including hot melt adhesives and pressure sensitive adhesives); footwear (including shoe soles and shoe liners); auto interior parts and profiles; foam goods (both open and closed cell); impact modifiers for other thermoplastic polymers such as EPDM, isotactic polypropylene, or other olefin polymers; coated fabrics; hoses; tubing; weather stripping; cap liners; flooring; and viscosity index modifiers, also known as pour point modifiers, for lubricants.

Particularly desirable blends are thermoplastic polyolefin blends (TPO), thermoplastic elastomer blends (TPE), thermoplastic vulcanisites (TPV), and styrenic polymer blends. TPE and TPV blends may be prepared by combining the invented pseudo-block polymers, including functionalized or unsaturated derivatives thereof with an optional rubber, including conventional block copolymers, especially an SBS block copolymer, and optionally a crosslinking or vulcanizing agent. TPO blends are generally prepared by blending the invented pseudo-block copolymers with a polyolefin, and optionally a crosslinking or vulcanizing agent. The foregoing blends may be used in forming a molded object, and optionally crosslinking the resulting molded article. A similar procedure using different components has been previously disclosed in U.S. Pat. No. 6,797,779.

The blends may be prepared by mixing or kneading the respective components at a temperature around or above the melt point temperature of one or both of the components. For most pseudo-block copolymers, this temperature may be above 130° C., most generally above 145° C., and most preferably above 150° C. Typical polymer mixing or kneading equipment that is capable of reaching the desired temperatures and melt plastifying the mixture may be employed. These include mills, kneaders, extruders (both single screw and twin-screw), Banbury mixers, calenders, and the like. The sequence of mixing and method may depend on the final composition. A combination of Banbury batch mixers and continuous mixers may also be employed, such as a composition will have a higher loading of cross-linkable polymer (typically the conventional block copolymer containing unsaturation) compared to TPO compositions. Generally, for TPE and TPV compositions, the weight ratio of block copolymer to pseudo-block copolymer should be from 90:10 to 10:90, more preferably from 80:20 to 20:80, and most preferably from 75:25 to 25:50. For TPO applications, the weight ratio of pseudo-block copolymer to polyolefin may be from about 49:51 to about 5:95, more preferably from 35:65 to about 10:90. For modified styrenic polymer applications, the weight ratio of pseudo-block copolymer to polyolefin may also be from about 49:51 to about 5:95, more preferably from 35:65 to about 10:90. The ratios may be changed by changing the viscosity ratios of the various components. There is considerable literature illustrating techniques for changing the phase continuity by changing the viscosity ratios of the constituents of a blend and a person skilled in this art may consult if necessary.

The blend compositions may contain processing oils, plasticizers, and processing aids. Rubber processing oils have a certain ASTM designations and paraffinic, napthenic or aromatic process oils are all suitable for use. Generally from 0 to 150 parts, more preferably 0 to 100 parts, and most preferably from 0 to 50 parts of oil per 100 parts of total polymer are employed. Higher amounts of oil may tend to improve the processing of the resulting product at the expense of some physical properties. Additional processing aids include conventional waxes, fatty acid salts, such as calcium stearate or zinc stearate, (poly)alcohols including glycols, (poly)alcohol ethers, including glycol ethers, (poly)esters, including (poly) glycol esters, and metal salt-, especially Group 1 or 2 metal or zinc-, salt derivatives thereof.

It is known that non-hydrogenated rubbers such as those comprising polymerized forms of butadiene or isoprene, including block copolymers (here-in-after diene rubbers), have lower resistance to UV, ozone, and oxidation, compared to mostly or highly saturated rubbers. In applications such as tires made from compositions containing higher concentrations of diene based rubbers, it is known to incorporate carbon black to improve rubber stability, along with anti-ozone additives or antioxidants. Pseudo-block copolymers according to the present invention possess extremely low levels of unsaturation making them particularly well suited for use in such applications. In addition, they may find use as a protective surface layer (coated, coextruded or laminated) or weather resistant film adhered to articles formed from conventional diene elastomer modified polymeric compositions.

For certain of the present TPO, TPV, and TPE applications, carbon black is the additive of choice for UV absorption and stabilization. Representative examples of carbon blacks include ASTM N110, N121, N220, N231, N234, N242, N293, N299, S315, N326, N330, M332, N339, N343, N347, N351, N358, N375, N539, N550, N582, N630, N642, N650, N683, N754, N762, ranging from 9 to 145 g/kg and average pore volumes ranging from 10 to 150 $cm^3/100$ g. Generally, smaller particle sized carbon blacks are employed, to the extent cost considerations permit. For many such applications the present pseudo-block copolymers and blends thereof require little or no carbon black, thereby allowing considerable design freedom to include alternative pigments or no pigments at all.

Compositions, including thermoplastic blends according to the invention may also contain anti-ozonants and anti-oxidants that are known to a rubber chemist of ordinary skill. The anti-ozonants may be physical protectants such as waxy materials that come to the surface and protect the part from oxygen or ozone or they may be chemical protectors that react with oxygen or ozone. Suitable chemical protectors include styrenated phenols, butylated octylated phenol, butylated di(dimethylbenzyl)phenol, p-phenylenediamines, butylated reaction products of p-cresol and dicyclopentadiene (DCPD), polyphenolic anitioxidants, hydroquinone derivatives, quinoline, diphenylene antioxidants, thioester antioxidants, and blends thereof. Some representative trade names of such products are Wingstay™ S antioxidant, Polystay™ 100 antioxidant, Polystay™ 100 AZ antioxidant, Polystay™ 200 antioxidant, Wingstay™ L antioxidant, Wingstay™ LHLS antioxidant, Wingstay™ K antioxidant, Wingstay™ 29 antioxidant, Wingstay™ SN-1 antioxidant, and Irganox™ antioxidants. In some applications, the antioxidants and antiozonants used will preferably be non-staining and non-migratory.

For providing additional stability against UV radiation, hindered amine light stabilizers (HALS) and UV absorbers may be also used. Suitable examples include Tinuvin™ 123, Tinuvin™ 144, Tinuvin™ 622, Tinuvin™ 765, Tinuvin™ 770, and Tinuvin™ 780, available from Ciba Specialty Chemicals, and Chemisorb™ T944, available from Cytex Plastics, Houston, Tex., USA. A Lewis acid may be additionally included with a HALS compound in order to achieve superior surface quality, as disclosed in U.S. Pat. No. 6,051,681.

For some compositions, additional mixing process may be employed to pre-disperse the anti-oxidants, anti-ozonants, carbon black, UV absorbers, and/or light stabilizers to form a masterbatch, and subsequently to form polymer blends there from.

Suitable crosslinking agents (also referred to as curing or vulcanizing agents) for use herein include sulfur based, peroxide based, or phenolic based compounds. Examples of the foregoing materials are found in the art, including in U.S. Pat. Nos. 3,758,643, 3,806,558, 5,051,478, 4,104,210, 4,130,535, 4,202,801, 4,271,049, 4,340,684, 4,250,273, 4,927,882, 4,311,628 and 5,248,729.

When sulfur based curing agents are employed, accelerators and cure activators may be used as well. Accelerators are used to control the time and/or temperature required for dynamic vulcanization and to improve the properties of the resulting cross-linked article. In one used m total amounts ranging from about 0.5 to about 4, preferably about 0.8 to about 1.5, phr, based on total composition weight. In another embodiment, combinations of a primary and a secondary accelerator might be used with the secondary accelerator being used in smaller amounts, such as from about 0.05 to about 3 phr, in order to activate and to improve the properties of the cured article. Combinations of accelerators generally produce articles having properties that are somewhat better than those produced by use of a single accelerator. In addition, delayed action accelerators may be used which are not affected by normal processing temperatures yet produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. Certain processing aids and cure activators such as stearic acid and ZnO may also be used. When peroxide based curing agents are used, co-activators or coagents may be used in combination therewith. Suitable coagents include trimethylolpropane triacrylate (TMPTA), trimethylolpropane trimethacrylate (TMPTMA), triallyl cyanurate (TAC), triallyl isocyanurate (TAIC), among others. Use of peroxide crosslinkers and optional coagents used for partial or complete dynamic vulcanization are known in the art and disclosed for example in the publication, "Peroxide Vulcanization of Elastomers", Vol. 74, No 3, July-August 2001.

When the pseudo-block copolymer containing composition is at least partially crosslinked, the degree of crosslinking may be measured by dissolving the composition in a solvent for specified duration, and calculating the percent gel or unextractable rubber. The percent gel normally increases with increasing crosslinking levels. For cured articles according to the invention, the percent gel content is desirably in the range from 5 to 100 percent.

The pseudo-block copolymers of the invention as well as blends thereof possess improved processability compared to prior art compositions, due, it is believed, to lower melt viscosity. Thus, the composition or blend demonstrates an improved surface appearance, especially when formed into a molded or extruded article. At the same time, the present compositions and blends thereof uniquely possess improved melt strength properties, thereby allowing the present pseudo-block copolymers and blends thereof, especially TPO blends, to be usefully employed in foam and in thermoforming applications where melt strength is currently inadequate.

Thermoplastic compositions according to the invention may also contain organic or inorganic fillers or other additives such as starch, talc, calcium carbonate, glass fibers, polymeric fibers (including nylon, rayon, cotton, polyester, and polyaramide), metal fibers, wire, mesh, flakes alumina, aluminosilicates or aluminophosphates, carbon whiskers, carbon fibers, nanoparticles including nanotubes and nonofibers, wollastonite, graphite, zeolites, and ceramics, such as silicon carbide, silicon nitride or titanias. Silane based or other coupling agents may also be employed for better filler bonding. Additional suitable additives include tackifiers; oils, including paraffinic or napthelenic oils; and other natural and synthetic polymers, including other polymers according to the invention.

The thermoplastic compositions of this invention, including the foregoing blends, may be processed by conventional molding techniques such as injection molding, extrusion molding, thermoforming, slush molding, over molding, insert molding, blow molding, and other techniques. Films, including multi-layer films, may be produced by cast or tentering processes, including blown film processes.

Testing Methods

In the foregoing characterizing disclosure and the examples that follow, the following analytical techniques may be employed:

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT and the area between the largest positive inflections on either side of the identified peak in the derivative curve.

DSC Standard Method

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). About 10 mg of material in the form of a 5-6 mm crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

Abrasion Resistance

Abrasion resistance is measured on compression molded plaques according to ISO 4649. The average value of 3 measurements is reported. Plaques of 6.4 mm thick are compression molded using a hot press (Carver Model #4095-4PR1001R). The pellets are placed between polytetrafluoroethylene sheets, heated at 190° C. at 55 psi (380 kPa) for 3 min, followed by 1.3 MPa for 3 min, and then 2.6 MPa for 3 min. Next the film is cooled in the press with running cold water at 1.3 MPa for 1 min.

GPC Method

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000 and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polyethylene}=0.431(M_{polystyrene})$.

Polyetheylene equivalent molecular weight calculations are performed using Viscotek TriSEC software Version 3.0.

Compression Set

Compression set is measured according to ASTM D 395. The sample is prepared by stacking 25.4 mm diameter round discs of 3.2 mm, 2.0 mm, and 0.25 mm thickness until a total thickness of 12.7 min is reached. The discs are cut from 12.7 cm×12.7 cm compression molded plaques molded with a hot press under the following conditions: zero pressure for 3 min at 190° C., followed by 86 MPa for 2 min at 190° C., followed by cooling inside the press with cold running water at 86 MPa.

Density

Density measurement are conducted according to ASTM D 1928. Measurements are made within one hour of sample pressing using ASTM D792, Method B.

Flexural/Secant Modulus

Samples are compression molded using ASTM D 1928. Flexural and 2 percent secant moduli are measured according to ASTM D-790.

Optical Properties, Tensile, Hysteresis, and Tear

Films of 0.4 mm thickness are compression molded using a hot press (Carver Model #4095-4PR1001R). The pellets are placed between polytetrafluoroethylene sheets, heated at 190° C. at 55 psi (380 kPa) for 3 min, followed by 1.3 MPa for 3 min, and then 2.6 MPa for 3 min. The film is then cooled in the press with running cold water at 1.3 MPa for 1 min. The compression molded films are used for optical measurements, tensile behavior, recovery, and stress relaxation.

Clarity is measured using BYK Gardner Haze-gard as specified in ASTM D 1746.

45° gloss is measured using BYK Gardner Glossmeter Microgloss 45° as specified in ASTM D-2457

Internal haze is measured using BYK Gardner Haze-gard based on ASTM D 1003 Procedure A. Mineral oil is applied to the film surface to remove surface scratches.

Stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains according to ASTM D 1708 with an Instron™ instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\epsilon^f$ is the strain taken for cyclic loading and $\epsilon^s$ is the strain where the load returns to the baseline during the 1$^{st}$ unloading cycle.

Stress relaxation is measured at 50 percent strain and 37° C. for 12 hours using an Instron™ instrument equipped with an environmental chamber. The gauge geometry was 76 mm×25 mm×0.4 mm. After equilibrating at 37° C. for 45 min in the environmental chamber, the sample was stretched to 50% strain at 333% min$^{-1}$. Stress was recorded as a function of time for 12 hours. The percent stress relaxation after 12 hours was calculated using the formula:

$$\% \text{ Stress Relaxation} = \frac{L_0 - L_{12}}{L_0} \times 100$$

where $L_0$ is the load at 50% strain at 0 time and $L_{12}$ is the load at 50 percent strain after 12 hours.

Tensile notched tear experiments are carried out on samples having a density of 0.88 g/cc or less using an Instron™ instrument. The geometry consists of a gauge section of 76 mm×13 mm×0.4 mm with a 2 mm notch cut into the sample at half the specimen length. The sample is stretched at 508 mm min$^{-1}$ at 21° C. until it breaks. The tear energy is calculated as the area under the stress-elongation curve up to strain at maximum load. An average of at least 3 specimens are reported.

TMA

Thermal Mechanical Analysis is conducted on 30 mm diameter×3.3 mm thick, compression molded discs, formed at 180° C. and 10 MPa molding pressure for 5 minutes and then air quenched. The instrument used is a TMA 7, brand available from Perkin-Elmer. In the test, a probe with 1.5 mm radius tip (P/N N519-0416) is applied to the surface of the sample disc with 1N force. The temperature is raised at 5° C./min from 25° C. The probe penetration distance is measured as a function of temperature. The experiment ends when the probe has penetrated 1 mm into the sample.

DMA

Dynamic Mechanical Analysis (DMA) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing.

A 1.5 mm plaque is pressed and cut in a bar of dimensions 32×12 mm. The sample is clamped at both ends between fixtures separated by 10 mm (grip separation ΔL) and subjected to successive temperature steps from −100° C. to 200° C. (5° C. per step). At each temperature the torsion between 0.1 percent and 4 percent to ensure that the torque is sufficient and that the measurement remains in the linear regime.

An initial static force of 10 g is maintained (auto-tension mode) to prevent slack in the sample when thermal expansion occurs. As a consequence, the grip separation ΔL increases with the temperature, particularly above the melting or softening point of the polymer sample. The test stops at the maximum temperature or when the gap between the fixtures reaches 65 mm.

Pellet Blocking Behavior

Pellets (150 g) are loaded into a 2 inch (5 cm) diameter hollow cylinder that is made of two halves held together by a hose clamp. A 2.75 lb (1.25 kg) load is applied to the pellets in the cylinder at 45° C. for 3 days. After 3 days, the pellets loosely consolidate into a cylindrical shaped plug. The plug is removed from the form and the pellet blocking force measured by loading the cylinder of blocked pellets in compression using an Instron™ instrument to measure the compressive force needed to break the cylinder into pellets.

Melt Properties

Melt Flow Rate (MFR) and Melt index, or I2, are measured in accordance with ASTM D1238, Condition 190° C./2.16 kg.

ATREF

Analytical temperature rising elution fractionation (ATREF) analysis is conducted according to the method described in U.S. Pat. No. 4,798,081. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

SPECIFIC EMBODIMENTS

The following specific embodiments of the invention and combinations thereof are especially desirable and hereby delineated in order to provide detailed disclosure for the appended claims.

1. A process for the polymerization of one or more addition polymerizable monomers, preferably of two or more addition polymerizable monomers, especially ethylene and at least one copolymerizable comonomer, propylene and at least one copolymerizable comonomer having from 4 to 20 carbons, or 4-methyl-1-pentene and at least one different copolymerizable comonomer having from 4 to 20 carbons, to form a copolymer comprising two regions or segments of differentiated polymer composition or properties, especially regions comprising differing comonomer incorporation index, said process comprising:

1) contacting an addition polymerizable monomer or mixture of monomers under addition polymerization conditions, preferably uniform or homogeneous polymerization conditions, in a reactor or reactor zone with a composition comprising at least one olefin polymerization catalyst and a cocatalyst and characterized by the formation of polymer segments from said monomer or monomers;

2) transferring the reaction mixture to a second reactor or reactor zone and optionally adding one or more additional reactants, catalysts, monomers or other compounds prior to, contemporaneously with, or after said transfer; and 3) causing polymerization to occur in said second reactor or reactor zone to form polymer segments that are differentiated from the polymer segments formed in step 1);

said process being characterized by addition of a chain shuttling agent to the reaction mixture prior to, during, or subsequent to step 1) such that at least some of the resulting polymer molecules from step 3) comprises two or more chemically or physically distinguishable blocks or segments.

2. A high molecular weight copolymer, especially such a copolymer comprising in polymerized form ethylene and a copolymerizable comonomer, propylene and at least one copolymerizable comonomer having from 4 to 20 carbons, or 4-methyl-1-pentene and at least one different copolymerizable comonomer having from 4 to 20 carbons, said copolymer comprising two or more substantially homogeneous intramolecular segments or blocks comprising differing chemical or physical properties, especially segments or blocks characterized by differentiated comonomer incorporation, and most especially two such segments or blocks. Highly preferably the copolymer possesses a molecular weight distribution, Mw/Mn, of less than 3.0, preferably less than 2.8. Further desirably, the individual blocks are characterized by possessing a most probable molecular weight distribution.

3. A polymer mixture comprising: (1) an organic or inorganic polymer, preferably a homopolymer of ethylene and/or a copolymer of ethylene and a copolymerizable comonomer, and (2) a copolymer according to the present invention or prepared according to the process of the present invention.

4. A process according to embodiment 1 wherein the catalyst comprises a metal complex corresponding to the formula:

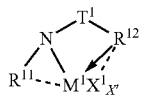

wherein:
$R^{11}$ is selected from alkyl, cycloalkyl, heteroalkyl, cycloheteroalkyl, aryl, and inertly substituted derivatives thereof containing from 1 to 30 atoms not counting hydrogen or a divalent derivative thereof;

$T^1$ is a divalent bridging group of from 1 to 41 atoms other than hydrogen, preferably 1 to 20 atoms other than hydrogen, and most preferably a mono- or di-$C_{1-20}$ hydrocarbyl substituted methylene or silane group; and $R^{12}$ is a $C_{5-20}$ heteroaryl group containing Lewis base functionality, especially a pyridin-2-yl- or substituted pyridin-2-yl group or a divalent derivative thereof;

$M^1$ is a Group 4 metal, preferably hafnium;

$X^1$ is an anionic, neutral or dianionic ligand group;

x' is a number from 0 to 5 indicating the number of such $X^1$ groups; and bonds, optional bonds and electron donative interactions are represented by lines, dotted lines and arrows respectively.

5. A process according to embodiment 1 wherein the catalyst comprises a metal complex corresponding to the formula:

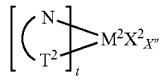

wherein
$M^2$ is a metal of Groups 4-10 of the Periodic Table of the elements;
$T^2$ is a nitrogen, oxygen or phosphorus containing group;
$X^2$ is halo, hydrocarbyl, or hydrocarbyloxy;
t is one or two;
x" is a number selected to provide charge balance;
and $T^2$ and N are linked by a bridging ligand.

6. A process according to any one of embodiments 1, 4 or 5 characterized by producing a polymer according to claim 2 or a polymer mixture according to claim 3.

The skilled artisan will appreciate that the invention disclosed herein may be practiced in the absence of any component which has not been specifically disclosed.

EXAMPLES

The following examples are provided as further illustration of the invention and are not to be construed as limiting. The term "overnight", if used, refers to a time of approximately 16-18 hours, the term "room temperature", refers to a temperature of 20-25° C., and the term "mixed alkanes" refers to a commercially obtained mixture of $C_{6-9}$ aliphatic hydrocarbons available under the trade designation Isopar E®, from Exxon Mobil Chemicals Inc. In the event the name of a compound herein does not conform to the structural representation thereof, the structural representation shall control. The synthesis of all metal complexes and the preparation of all screening experiments were carried out in a dry nitrogen atmosphere using dry box techniques. All solvents used were HPLC grade and were dried before their use.

MMAO refers to modified methylalumoxane, a triisobutylaluminum modified methylalumoxane available commercially from Akzo-Noble Corporation.

Catalyst (A1) is [N-(2,6-di(1-methylethyl)phenyl)amido)(2-isopropylphenyl)(α-naphthalen-2-diyl(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

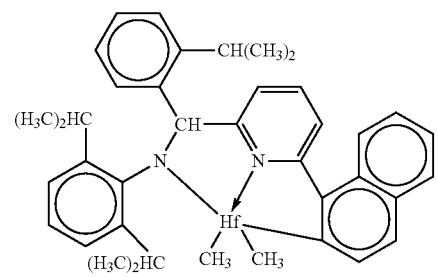

Catalyst (A2) is [N-(2,6-di(1-methylethyl)phenyl)amido)(2-methylphenyl)(1,2-phenylene-(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

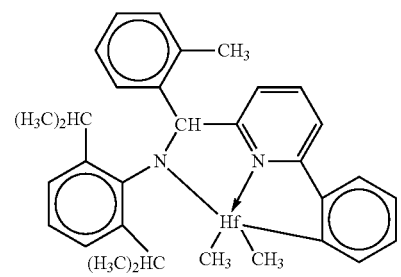

Catalyst (A3) is bis[N,N'''-(2,4,6-tri(methylphenyl)amido)ethylenediamine]hafnium dibenzyl.

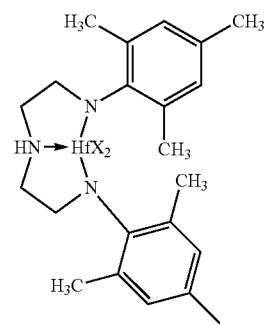

$X = CH_2C_6H_5$

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of US-A-2004/0010103.

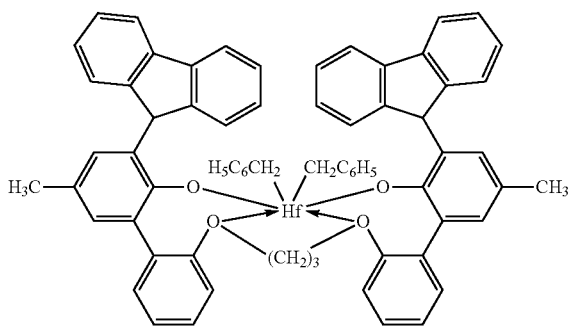

Catalyst (A5) is (bis-(1-methylethyl)(2-oxoyl-3,5-di(t-butyl)phenyl)immino)zirconium dibenzyl.

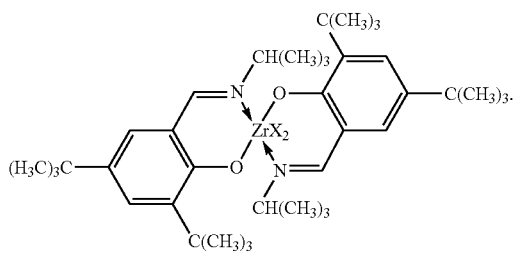

X = CH$_2$C$_6$H$_5$

The preparation of catalyst (A5) is conducted as follows.

a) Preparation of (1-methylethyl)(2-hydroxy-3,5-di(t-butyl)phenyl)imine 3,5-Di-t-butylsalicylaldehyde (3.00 g) is added to 10 mL of isopropylamine. The solution rapidly turns bright yellow. After stirring at ambient temperature for 3 hours, volatiles are removed under vacuum to yield a bright yellow, crystalline solid (97 percent yield).

b) Preparation of (bis-(1-methylethyl)(2-oxoyl-3,5-di(t-butyl)phenyl)immino)zirconium dibenzyl A solution of (1-methylethyl)(2-hydroxy-3,5-di(t-butyl)phenyl)imine (605 mg, 2.2 mmol) in 5 mL toluene is slowly added to a solution of Zr(CH$_2$Ph)$_4$ (500 mg, 1.1 mmol) in 50 mL toluene. The resulting dark yellow solution is stirred for 30 min. Solvent is removed under reduced pressure to yield the desired product as a reddish-brown solid.

Catalyst (A6) is bis-(1-(2-methylcyclohexyl)ethyl)(2-oxoyl-3,5-di(t-butyl)phenyl)immino) zirconium dibenzyl

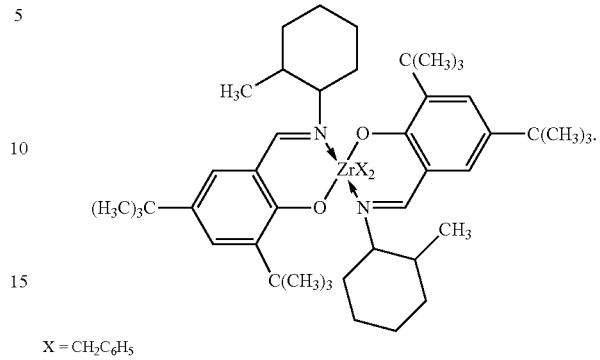

X = CH$_2$C$_6$H$_5$

The preparation of catalyst (A6) is conducted as follows.

a) Preparation of (1-(2-methylcyclohexyl)ethyl)(2-oxoyl-3,5-di(t-butyl)phenyl)imine 2-Methylcyclohexylamine (8.44 mL, 64.0 mmol) is dissolved in methanol (90 mL), and di-t-butylsalicaldehyde (10.00 g, 42.67 mmol) is added. The reaction mixture is stirred for three hours and then cooled to −25° C. for 12 hrs. The resulting yellow solid precipitate is collected by filtration and washed with cold methanol (2×15 μL), and then dried under reduced pressure. The yield is 11.17 g of a yellow solid. $^1$H NMR is consistent with the desired product as a mixture of isomers.

b) Preparation of bis-(1-(2-methylcyclohexyl)ethyl) (2-oxoyl-3,5-di(t-butyl)phenyl immino)zirconium dibenzyl A solution of (1-(2-methylcyclohexyl)ethyl)(2-oxoyl-3,5-di(t-butyl)phenyl)imine (7.63 g, 23.2 mmol) in 200 mL toluene is slowly added to a solution of Zr(CH$_2$Ph)$_4$ (5.28 g, 11.6 mmol) in 600 mL toluene. The resulting dark yellow solution is stirred for 1 hour at 25° C. The solution is diluted further with 680 mL toluene to give a solution having a concentration of 0.00783 M.

Catalyst (A7) is (t-butylamido)dimethyl(3-N-pyrrolyl-1,2,3,3a,7a-η-inden-1-yl)silanetitanium dimethyl prepared substantially according to the techniques of U.S. Pat. No. 6,268,444:

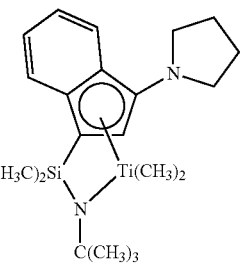

Catalyst (A8) is (t-butylamido)di(4-methylphenyl)(2-methyl-1,2,3,3a,7a-η-inden-1-yl)silanetitanium dimethyl prepared substantially according to the teachings of US-A-2003/004286:

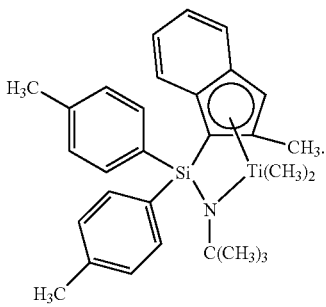

Catalyst (A9) is (t-butylamido)di(4-methylphenyl)(2-methyl-1,2,3,3a,8a-η-s-indacen-1-yl)silanetitanium dimethyl prepared substantially according to the teachings of US-A-2003/004286:

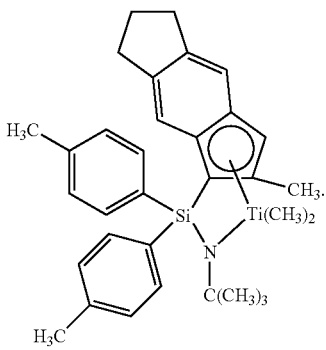

Catalyst (A10) is bis(dimethyldisiloxane)(indene-1-yl)zirconium dichloride available from Sigma-Aldrich:

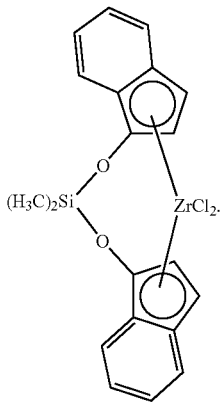

Cocatalyst 1 A mixture of methyldi($C_{14-18}$ alkyl)ammonium salts of tetrakis(pentafluorophenyl)borate (here-in-after armeenium borate), prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,9883, Ex. 2.

Cocatalyst 2 Mixed $C_{14-18}$ alkyldimethylammonium salt of bis(tris(pentafluorophenyl)-alumane)-2-undecylimidazolide, prepared according to U.S. Pat. No. 6,395,671, Ex. 16.

Shuttling Agents The shuttling agents employed include diethylzinc (DEZ, SA1), di(i-butyl)zinc (SA2), di(n-hexyl)zinc (SA3), triethylaluminum (TEA, SA4), trioctylaluminum (SA5), bis(di(trimethylsilyl)amido)isobutylaluminum (SA8), di(2-pyrridylmethoxy)n-octylaluminum (SA9), bis(n-octadecyl)i-butylaluminum (SA 10), bis(di(n-pentyl)amido)isobutylaluminum (SA11), bis(2,6-di-t-butylphenoxy)n-octylaluminum (SA12), di(1-naphthyl)ethylamido) n-octylaluminum (SA13), bis(t-butyldimethylsiloxy)ethylaluminum (SA14), bis(di(trimethylsilyl)amido)ethylaluminum (SA 15), bis(2,3,6,7-dibenzoazacyclohexan-1-yl)ethylaluminum (SA16), bis(2,3,6,7-dibenzoazacyclohexan-1-yl)n-octylaluminum (SA17), bis(dimethyl(t-butyl)siloxyl)n-octyl-aluminum (SA18), ethyl(2,6-diphenylphenoxy)zinc (SA19), and ethyl(t-butoxy)zinc (SA20).

General High Throughput Parallel Polymerization Conditions

Polymerizations are conducted using a high throughput, parallel polymerization reactor (PPR) available from Symyx technologies, Inc. and operated substantially according to U.S. Pat. Nos. 6,248,540, 6,030,917, 6,362,309, 6,306,658, and 6,316,663. Ethylene copolymerizations are conducted at 130° C. and 80 psi (550 kPa) with ethylene on demand using 1.2 equivalents of cocatalyst 2 based on total catalyst used. A series of polymerizations are conducted in a parallel pressure reactor (PPR) comprised of 48 individual reactor cells in a 6×8 array that are fitted with a pre-weighed glass tube. The working volume in each reactor cell is 6000 μL. Each cell is temperature and pressure controlled with stirring provided by individual stirring paddles. The monomer gas and quench gas (air) are plumbed directly into the PPR unit and controlled by automatic valves. Liquid reagents are robotically added to each reactor cell by syringes and the reservoir solvent is mixed alkanes. The order of addition is mixed alkanes solvent (4 ml), ethylene, 1-octene comonomer (143 mg), 0.419 μmol cocatalyst, shuttling agent in the indicated amounts, and finally, 0.3495 μmol catalyst A3. After quenching, the reactors are cooled and the glass tubes are unloaded. The tubes are transferred to a centrifuge/vacuum drying unit, and dried for 12 hours at 60° C. The tubes containing dried polymer are weighed and the difference between this weight and the tare weight gives the net yield of polymer. Results are contained in Table 1.

Catalyst/Shuttling Agent Selection Method 1

A series of ethylene/1-octene polymerizations are conducted using differing monomer conversions and one of two potential chain shuttling agents, t-butyldimethylsiloxydi(isopropyl)aluminum (TSA, Runs A-F) and diethylzinc (DEZ, Runs 1-6), using the foregoing high-throughput polymerization technique. The resulting polymers are measured for molecular weight (Mw and Mn) using GPC. Polydispersity Index (PDI=Mw/Mn) is calculated for each polymer. Results are tabulated in Table 1

TABLE 1

| Run | Conversion (%) | Yield | Mw (g/mol) | Mn (g/mol) | Mw/Mn |
|---|---|---|---|---|---|
| A | 25 | 0.052 | 495,202 | 159,079 | 3.11 |
| B | 51 | 0.086 | 455,178 | 103,781 | 4.39 |
| C | 75 | 0.102 | 490,448 | 210,174 | 2.33 |
| D | 100 | 0.131 | 510,722 | 260,894 | 1.96 |
| E | 150 | 0.194 | 871,458 | 194,801 | 4.47 |
| F | 184 | 0.235 | 605,453 | 137,957 | 4.39 |
| 1 | 26 | 0.0589 | 8,908 | 6,477 | 1.38 |
| 2 | 52 | 0.0852 | 12,393 | 9,592 | 1.29 |
| 3 | 77 | 0.1173 | 16,570 | 13,176 | 1.26 |
| 4 | 101 | 0.1416 | 21,387 | 17,397 | 1.23 |
| 5 | 151 | 0.1923 | 29,187 | 23,715 | 1.23 |
| 6 | 200 | 0.2752 | 41,043 | 32,203 | 1.27 |

It may be seen the polymers produced in Runs 1-6 have a relatively narrow polydispersity (Mw/Mn) compared to polymers in the series A-F. This indicates that DEZ is an effective chain shuttling agent under the conditions of the polymerization, whereas TSA is not. Polymers prepared in a reactor, especially a loop, semi-batch, or plug flow type reactor, in a manner to expose an active catalyst site to at least two different sets of reaction conditions, especially conditions encompassing differences in monomer/comonomer ratio, would therefore generate polymer products having multiple blocks or segments (pseudo-block copolymers). These polymers would be expected to possess properties resembling pure block copolymers and distinguishable from those of random copolymers of similar gross comonomer content.

Catalyst/Shuttling Agent Selection Method 2

The previously disclosed high throughput polymerization conditions are substantially repeated using various catalysts, cocatalyst 1, and potential shuttling agents. Ethylene pressure is increased to 200 psi (1.4 MPa). Over 500 reactions are performed. The resulting ethylene/1-octene copolymers are tested for Mn and PDI and polymer production rate compared to rates obtained from a control using MMAO in place of the shuttling agent. The best compositions are then selected based on a combination of greatest molecular weight (Mn) reduction, greatest reduction in PDI, and least reduction (or actual increase) in polymerization rate. Selected combinations showing the best results (ranked by Mn reduction) are presented in Table 2.

TABLE 2

| Run | Catalyst | Shuttling Agent | Relative Mn | Relative PDI | Relative rate |
|---|---|---|---|---|---|
| 7 | A1 | SA7 | 0.07 | 0.88 | 1.33 |
| 8 | " | SA5 | 0.18 | 0.85 | 0.57 |
| 9 | " | SA15 | 0.19 | 0.93 | 6.29 |
| 10 | A2 | SA19 | 0.27 | 0.73 | 0.18 |
| 11 | A3 | SA2 | 0.29 | 0.80 | 9.74 |
| 12 | " | SA8 | 0.38 | 1.01 | 1.15 |
| 13 | " | SA7 | 0.60 | 1.06 | 1.38 |
| 14 | " | SA11 | 0.65 | 1.04 | 1.43 |
| 15 | " | SA3 | 0.65 | 0.86 | 4.61 |
| 16 | " | SA17 | 0.66 | 0.95 | 6.36 |
| 17 | " | SA20 | 0.68 | 0.82 | 4.37 |
| 18 | A4 | SA9 | 0.52 | 1.12 | 2.32 |
| 19 | " | SA7 | 0.53 | 1.07 | 0.91 |
| 20 | " | SA11 | 0.59 | 1.11 | 2.47 |
| 21 | " | SA14 | 0.69 | 1.07 | 2.12 |
| 22 | " | SA18 | 0.69 | 1.10 | 3.16 |
| 23 | " | SA12 | 0.70 | 1.07 | 0.97 |
| 24 | " | SA5 | 0.93 | 0.95 | 0.81 |
| 25 | A5 | SA2 | 0.29 | 0.92 | 0.71 |
| 26 | " | SA13 | 0.59 | 0.97 | 0.93 |
| 27 | " | SA3 | 0.63 | 0.95 | 0.93 |
| 28 | " | SA5 | 0.79 | 1.10 | 1.19 |
| 29 | A6 | SA13 | 0.83 | 0.92 | 0.67 |
| 30 | A7 | SA6 | 0.63 | 0.96 | 0.66 |
| 31 | " | SA7 | 0.74 | 1.15 | 0.96 |
| 32 | D1 | SA14 | 0.54 | 1.10 | 1.14 |
| 33 | " | SA10 | 0.59 | 1.10 | 0.77 |
| 34 | " | SA5 | 0.74 | 1.01 | 0.72 |
| 35 | " | SA16 | 0.82 | 1.05 | 2.62 |

By reference to Table 2, suitable combinations of catalyst and shuttling agent may be selected. It is to be emphasized that preferred catalyst/shuttling agent combinations may in different embodiments be selected based on a desired objective, such as maximum reduction in Mn or improvement in production rate coupled with more modest Mn reduction. Additionally, the above results are based on a batch reactor, whereas, in practice, the effect, if any, of using continuous polymerization conditions must also be considered in selecting the final combination of catalysts and shuttling agent(s).

Example 1

Continuous Solution Polymerization Reactions

Polymer samples according to the invention and comparative polymer example are prepared in two well mixed, solution reactors, connected in series. The reactors are loop reactors providing reagents (Catalyst A-1, Cocatalyst 1, and shuttling agent SA1), as well as polymer are dissolved in the solvent during the polymerization process in the first reactor and continuously transferred to the second reactor for continued polymerization. Product is continuously removed from the second reactor, the catalyst system deactivated, and the polymer recovered by devolatilization. Recovered solvent/monomer mixture is condensed, purified, and recycled to both reactors. Suitable reactors and operating conditions for use herein are disclosed in U.S. Pat. No. 6,355,741, 5,977,251 or 5,684,097.

For the comparative examples, no chain shuttling agent (SA) is employed resulting in the formation of blends of polymers having differing levels of crystallinity but no evidence of block copolymer formation. For the examples according to the invention, a chain shuttling agent such as diethylzinc is added to the first reactor or in the conduit connecting the first and second reactors, thereby resulting in the generation of a high concentration of polymer that is attached to chain shuttling agent. In the second reactor, these polymer chains are transferred to active catalyst sites and polymerization is commenced under process conditions that differ from the conditions employed in the first reactor.

During operation in one embodiment of the invention, monomers for forming a highly tactic (isotactic or syndiotactic) olefin homopolymer are added to the first reactor which is operated so as to prepare a high molecular weight polymer segment. A preferred polymer segment is isotactic polypropylene with a tacticity of 95 percent or higher. In the second reactor, an elastomeric copolymer of propylene and ethylene is formed. The quantity of ethylene employed in the second reactor is small relative to the quantity of propylene (ethylene/comonomer molar feed ratio about 1/10) to form an elastomeric propylene/ethylene copolymer segment containing a minor quantity (1-10 percent) of ethylene. The polymer exits the reactor as diblock copolymer chains attached via the elastomeric polymer segment to a chain shuttling agent, which is removed by exposure to a proton source or reacted with a difunctional coupling agent, such as dimethyldichlorosilane, to form a coupled, triblock copolymer uniquely possessing terminal highly isotactic polypropylene blocks and a central elastomeric P/E block, with the molecular weight distributions of the blocks being a most probable distribution. Representative process conditions are illustrated in Tables 3 and 4.

TABLE 3

Process Conditions First Loop Reactor

| Fresh propylene feed (kg/h) | Fresh ethylene feed (kg/h) | Total propylene feed (kg/h) | Split feed[1] (top/bottom) | Fresh H$_2$ flow (kg/h) | Log viscosity (logCp) | Catalyst concentration (ppm Hf)) | Catalyst flow (kg/h) | Cocat. conc. (ppm) | Cocat. flow (kg/h) | SA conc. (ppm Zn) | SA flow (kg/h) | Recycle ratio |
|---|---|---|---|---|---|---|---|---|---|---|---|---|
| 91.3 | 7.53 | 129 | 85/25 | 936 | 2.79 | 521 | 0.64 | 8598 | 0.29 | 0 | 0 | 9.90 |
| " | 7.93 | 130 | " | 0 | 2.82 | " | 1.13 | " | 0.50 | 5500 | 0.91 | 9.75 |
| " | 7.95 | 128 | " | " | 3.02 | " | 1.14 | " | 0.51 | " | 0.80 | 9.80 |
| " | 7.94 | 129 | " | " | 3.27 | " | 1.02 | " | 0.45 | " | 0.71 | 7.80 |
| " | " | 128 | " | " | 3.02 | 490 | 1.06 | " | 0.44 | 5000 | 0.87 | " |
| 80.8 | 13.7 | 118 | 72/28 | 455 | 3.01 | " | 0.73 | 8598 | 0.31 | " | 0.60 | 7.70 |
| 73.5 | 18.3 | 111 | 62/38 | 1004 | 2.90 | " | 0.60 | 7659 | 0.28 | " | 0.49 | " |
| " | 18.3 | 109 | " | 2024 | 2.85 | " | 0.43 | " | 0.20 | 0 | 0 | 7.60 |

Feed split top/bottom, refers to the percentage of propylene injected in the form of recycled solvent/propylene mixture (bottom number).

TABLE 4

Process Conditions Second Loop Reactor

| Run | propylene feed (kg/h) | H$_2$ flow (kg/h) | Log viscosity (logCp) | Cat. A-1 concentration (ppm Hf)) | Cat. A-1 flow (kg/h) | Cocatalyst conc. (ppm) | Cocatalyst flow (kg/h) | Recycle ratio |
|---|---|---|---|---|---|---|---|---|
| A* | 91.3 | 936 | 2.79 | 521 | 0.64 | 8598 | 0.29 | 9.90 |
| 1 | " | 0 | 2.82 | " | 1.13 | " | 0.50 | 9.75 |
| 2 | " | " | 3.02 | " | 1.14 | " | 0.51 | 9.80 |
| 3 | " | " | 3.27 | " | 1.02 | " | 0.45 | 7.80 |
| 4 | " | " | 3.02 | 490 | 1.06 | " | 0.44 | " |
| 5 | 80.8 | 455 | 3.01 | " | 0.73 | 8598 | 0.31 | 7.70 |
| 6 | 73.5 | 1004 | 2.90 | " | 0.59 | 7659 | 0.28 | " |
| B* | " | 2024 | 2.85 | " | 0.43 | " | 0.20 | 7.60 |

Example 2

Continuous Solution Polymerization Reactions

Ethylene/1-octene copolymers are prepared using two continuous stirred tank reactors (CSTR) connected in series. Each reactor is hydraulically full and set to operate at steady state conditions. The shuttling agent (SA1) is added to the first reactor along with catalyst A-1, Cocatalyst 1, a scavenger (triisobutylaluminum modified methylalumoxane MMAO, available from Akzo-Noble, Inc.), and solvent (mixed alkanes (Isopar™ E, available from ExxonMobil Chemicals, Inc.). Operating conditions for the two reactors are provided in Tables 5 and 6. Polymer properties are provided in Table 7 and in FIGS. 2-9.

TABLE 5

Process Conditions First CSTR Reactor.

| Run | Solv. kg/hr | C$_2$H$_4$ kg/hr | C$_8$H$_{16}$ kg/hr | H$_2$ Sccm[1] | T °C. | Cat. A-1 Conc. ppm Hf | Cat. A-1 Flow kg/hr | Cocat. Conc. ppm | Cocat Flow kg/hr | MMAO Conc ppm Al | MMAO Flow kg/hr | SA1[2] Conc ppm Zn | SA1 Flow kg/hr | Conv.[4] | R-1 Split[5] |
|---|---|---|---|---|---|---|---|---|---|---|---|---|---|---|---|
| A* | 12.0 | 1.42 | 0.03 | 150 | 130 | 932 | 0.26 | 1709 | 0.31 | 123 | 0.275 | 0 | 0 | 88.7 | 32 |
| 1 | 11.5 | " | 0.05 | 0 | 125 | " | 0.08 | " | 0.09 | " | 0 | 13500 | 0.141 | 91.0 | " |

*comparative, not an example of the invention
[1]standard cm$^3$/min
[2]The DEZ solution also contained 1-3 mol percent MMAO.
[3]percent ethylene conversion in reactor
[4]percent of polymer produced in Reactor 1

TABLE 6

Process Conditions Second CSTR Reactor.

| Ex. | Solv. kg/hr | C$_2$H$_4$ kg/hr | C$_8$H$_{16}$ kg/hr | H$_2$ sccm[1] | T °C. | Cat. A-1 Conc. ppm Hf | Cat. A-1 Flow kg/hr | Cocat. Conc. ppm | Cocat. Flow kg/hr | MMAO Conc ppm Al | MMAO Flow kg/hr | Conv.[2] | R-2 Split[3] | Rate kg/hr |
|---|---|---|---|---|---|---|---|---|---|---|---|---|---|---|
| A* | 13.0 | 1.47 | 1.8 | 120 | 130 | 932 | 0.34 | 1709 | 0.30 | 123 | 0.05 | 89 | 68 | 3.9 |
| 1 | 12.0 | " | 2.2 | 0 | 125 | " | 0.07 | " | 0.10 | " | 0.05 | 91 | " | " |

*comparative, not an example of the invention
[1]standard cm$^3$/min
[2]percent ethylene conversion in reactor
[3]percent of polymer produced in Reactor 2

TABLE 7

| | Reactor 1[1] | | Dual reactor products | | | | | | | | | | |
|---|---|---|---|---|---|---|---|---|---|---|---|---|---|
| Run | Density (g/cm³) | I₂[2] | Density (g/cm³) | I₂[2] (dg/min) | I₁₀/I₂ | Mw (g/mol) | Mn (g/mol) | Mw/Mn | Tm (° C.) | Tc (° C.) | ΔH (J/g) | ATREF peak (° C.) | Solubles (percent) |
| A* | 0.937 | 1.1 | 0.8993 | 1.0 | 7.1 | 114,400 | 25900 | 4.42 | 125.85 | 110.7 | 103.8 | 96.4 | 55.9 |
| 1 | 0.948 | 20 | 0.8986 | 3.9 | 5.7 | 74,200 | 44500 | 1.67 | 121.89 | 103.2 | 104.1 | 93.3 | 13.2 |

*comparative, not an example of the invention
[1]product isolated from first reactor before production was begun in the second reactor
[2]dg/min The polymer analytical results for Example 2, Comparative A are contained in FIGS. 2-5. The DSC curve (FIG. 2) shows a 125.85° C. melting point (Tm) with a heat of fusion of 103.8 J/g. The corresponding CRYSTAF curve (FIG. 3) shows a peak at 80.5° C. with a peak area of 35.0 percent, while 59.9 percent of the sample is soluble. Similarly the ATREF curve (FIG. 4) shows a peak at 96.4 with an area of 38.7 percent and a soluble fraction of 55.9 percent. The GPC trace (FIG. 5) reveals a broad molecular weight distribution, Mw/Mn, of 4.42 for this comparative polymer sample. These results are consistent with the properties expected of a physical blend of two polymers having differing densities.

The polymer analytical results for Example 2, Run 1 are contained in FIGS. 6-9. The DSC curve (FIG. 6) shows a 121.89° C. melting point (Tm) with a heat of fusion of 104.1 J/g. The corresponding CRYSTAF curve (FIG. 7) shows the largest peak at 75.6° C. with a peak area of 36.5 percent, while 46.3 percent of the sample is soluble. Similarly the ATREF curve (FIG. 8) shows a peak at 93.3 with an area of 84.1 percent and a soluble fraction of 13.2 percent. The GPC trace (FIG. 9) reveals a very narrow molecular weight distribution, Mw/Mn, of 1.67 for this polymer sample. These results are consistent with the properties expected of a block copolymer, specifically a polydispersity less than 2.0 is unique to the present invented polymers.

The polymers prepared according to the present invented process are uniquely suited for applications requiring narrow molecular weight distribution and multi-block polymer architecture. Examples where particular utility is found include adhesives and compatiblized blends employing thermoplastic polyolefins (TPO), elastomers, and as viscosity modifiers for lubricants.

The invention claimed is:

1. A process for the polymerization of one or more addition polymerizable monomers to form a copolymer comprising two regions or segments of differentiated polymer composition or properties, said process comprising:
   1) contacting an addition polymerizable monomer or mixture of monomers under addition polymerization conditions in a reactor or reactor zone with a composition comprising at least one olefin polymerization catalyst and a cocatalyst and characterized by the formation of polymer chains from said monomer or monomers;
   2) transferring the reaction mixture to a second reactor or reactor zone and optionally adding one or more additional reactants, catalysts, monomers or other compounds prior to, commensurate with, or after said transfer; and
   3) causing polymerization to occur in said second reactor or reactor zone to form polymer chains that are differentiated from the polymer chains formed in step 1); said process being characterized by addition of a chain shuttling agent to the reaction mixture prior to or during, step 2 such that at least some of the resulting polymer molecules from step 3) comprise two or more chemically or physically distinguishable blocks or segments.

2. A copolymer comprising two or more substantially homogeneous intramolecular segments or blocks comprising differing chemical or physical properties, said intramolecular segments characterized by possessing a most probable molecular weight distribution, a most probable distribution of block lengths and a Polydispersity Index from 1.7 to 15.

3. A polymer mixture comprising: (1) an organic or inorganic polymer and (2) a copolymer according to claim 2 or prepared according to claim 1.

4. A process according to claim 1 wherein the catalyst comprises a metal complex corresponding to the formula:

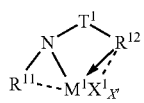

wherein:
$R^{11}$ is selected from alkyl, cycloalkyl, heteroalkyl, cycloheteroalkyl, aryl, and inertly substituted derivatives thereof containing from 1 to 30 atoms not counting hydrogen or a divalent derivative thereof;
$T^1$ is a divalent bridging group of from 1 to 41 atoms other than hydrogen; and
$R^{12}$ is a $C_{5-20}$ heteroaryl group containing Lewis base functionality;
$M^1$ is a Group 4 metal;
$X^1$ is an anionic, neutral or dianionic ligand group;
x' is a number from 0 to 5 indicating the number of such $X^1$ groups; and
bonds, optional bonds and electron donative interactions are represented by lines, dotted lines and arrows respectively.

5. A process for the polymerization of one or more addition polymerizable monomers to form a copolymer comprising two regions or segments of differentiated polymer composition or properties, said process comprising:
   1) contacting an addition polymerizable monomer or mixture of monomers under addition polymerization conditions in a reactor or reactor zone with a composition comprising at least one olefin polymerization catalyst and a cocatalyst and characterized by the formation of polymer chains from said monomer or monomers;
   2) transferring the reaction mixture to a second reactor or reactor zone and optionally adding one or more additional reactants, catalysts, monomers or other compounds prior to, commensurate with, or after said transfer; and 3) causing polymerization to occur in said second reactor or reactor zone to form polymer chains that are differentiated from the polymer chains formed in step 1);

said process being characterized by addition of a chain shuttling agent to the reaction mixture prior to, during, or subsequent to step 1) such that at least some of the resulting polymer molecules from step 3) comprise two or more chemically or physically distinguishable blocks or segments wherein the catalyst comprises a metal complex corresponding to the formula:

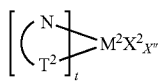

wherein $M^2$ is a metal of Groups 4-10 of the Periodic Table of the elements;

$T^2$ is a nitrogen, oxygen or phosphorus containing group;

$X^2$ is halo, hydrocarbyl, or hydrocarbyloxy;

t is one or two;

x" is a number selected to provide charge balance;

and $T^2$ and N are linked by a bridging ligand.

6. A process according to claim 5 characterized by producing a copolymer comprising two or more substantially homogeneous intramolecular segments or blocks comprising differing chemical or physical properties, said intramolecular segments characterized by possessing a most probable molecular weight distribution, a most probable distribution of block lengths and a Polydispersity Index from 1.7 to 15.

7. A process according to claim 5 wherein the chemically or physically distinguishable blocks or segments have different comonomer incorporation indices.

8. A process according to claim 5 characterized by producing a polymer mixture comprising: (1) an organic or inorganic polymer and (2) a copolymer comprising two or more substantially homogeneous intramolecular segments or blocks comprising differing chemical or physical properties, said intramolecular segments characterized by possessing a most probable molecular weight distribution and a most probable distribution of block lengths.

9. A process according to claim 4 wherein the catalyst comprises a metal complex corresponding to the formula:

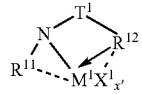

wherein:

$R^{11}$ is selected from alkyl, cycloalkyl, heteroalkyl, cycloheteroalkyl, aryl, and inertly substituted derivatives thereof containing from 1 to 30 atoms not counting hydrogen or a divalent derivative thereof;

$T^1$ is a divalent bridging group of 1 to 20 atoms other than hydrogen; and $R^{12}$ is a $C_5$-$_{20}$ heteroaryl group containing Lewis base functionality;

$M^1$ is a Group 4 metal;

$X^1$ is an anionic, neutral or dianionic ligand group;

x' is a number from 0 to 5 indicating the number of such $X^1$ groups; and bonds, optional bonds and electron donative interactions are represented by lines, dotted lines and arrows respectively.

10. A process according to claim 4 wherein the catalyst comprises a metal complex corresponding to the formula:

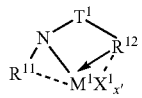

wherein:

$R^{11}$ is selected from alkyl, cycloalkyl, heteroalkyl, cycloheteroalkyl, aryl, and inertly substituted derivatives thereof containing from 1 to 30 atoms not counting hydrogen or a divalent derivative thereof;

$T^1$ is a mono- or di- $C_{1-20}$ hydrocarbyl substituted methylene or silane group; and $R^{12}$ is a $C_5$-$_{20}$ heteroaryl group containing Lewis base functionality;

$M^1$ is a Group 4 metal;

$X^1$ is an anionic, neutral or dianionic ligand group;

x' is a number from 0 to 5 indicating the number of such $X^1$ groups; and bonds, optional bonds and electron donative interactions are represented by lines, dotted lines and arrows respectively.

11. A process according to for the polymerization of one or more addition polymerizable monomers to form a copolymer comprising two regions or segments of differentiated polymer composition or properties, said process comprising:

1) contacting an addition polymerizable monomer or mixture of monomers under addition polymerization conditions in a reactor or reactor zone with a composition comprising at least one olefin polymerization catalyst and a cocatalyst and characterized by the formation of polymer chains from said monomer or monomers;

2) transferring the reaction mixture to a second reactor or reactor zone and optionally adding one or more additional reactants, catalysts, monomers or other compounds prior to, commensurate with, or after said transfer; and 3) causing polymerization to occur in said second reactor or reactor zone to form polymer chains that are differentiated from the polymer chains formed in step 1);

said process being characterized by addition of a chain shuttling agent to the reaction mixture prior to, during, or subsequent to step 1) such that at least some of the resulting polymer molecules from step 3) comprise two or more chemically or physically distinguishable blocks or segments wherein the catalyst comprises a metal complex corresponding to the formula:

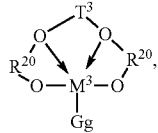

where:

$R^{20}$ is an aromatic or inertly substituted aromatic group containing from 5 to 20 atoms not counting hydrogen, or a polyvalent derivative thereof;

$T^3$ is a hydrocarbylene or silane group having from 1 to 20 atoms not counting hydrogen, or an inertly substituted derivative thereof;

$M^3$ is a Group 4 metal;

G is an anionic, neutral or dianionic ligand group;

g is a number from 1 to 5 indicating the number of such G groups; and bonds and electron donative interactions are represented by lines and arrows respectively.

* * * * *